United States Patent
Sukman et al.

(10) Patent No.: US 9,959,582 B2
(45) Date of Patent: May 1, 2018

(54) INTELLECTUAL PROPERTY INFORMATION RETRIEVAL

(71) Applicant: ClearstoneIP LLC, Palo Alto, CA (US)

(72) Inventors: Jesse D. Sukman, Long Beach, CA (US); Joseph R. Aliperti, Silver Lake, NH (US); Gabriel S. Sukman, Redwood City, CA (US)

(73) Assignee: ClearstoneIP, Palo Alto, CA (US)

( * ) Notice: Subject to any disclaimer, the term of this patent is extended or adjusted under 35 U.S.C. 154(b) by 268 days.

(21) Appl. No.: 14/522,241

(22) Filed: Oct. 23, 2014

(65) Prior Publication Data
US 2015/0187033 A1 Jul. 2, 2015

Related U.S. Application Data

(60) Provisional application No. 61/894,665, filed on Oct. 23, 2013.

(51) Int. Cl.
| | | |
|---|---|---|
| *G06F 17/30* | (2006.01) | |
| *G06Q 50/18* | (2012.01) | |
| *G06F 17/24* | (2006.01) | |
| *G06F 17/22* | (2006.01) | |

(52) U.S. Cl.
CPC ....... *G06Q 50/184* (2013.01); *G06F 17/2241* (2013.01); *G06F 17/241* (2013.01)

(58) Field of Classification Search
CPC .................................................. G06F 2216/11
See application file for complete search history.

(56) References Cited

U.S. PATENT DOCUMENTS

| | | | |
|---|---|---|---|
| 5,754,840 | A | 5/1998 | Rivette |
| 5,991,751 | A | 11/1999 | Rivette |
| 6,014,663 | A | 1/2000 | Rivette |
| 6,038,561 | A | 3/2000 | Snyder |
| 6,263,335 | B1 | 7/2001 | Paik |
| 6,339,767 | B1 | 1/2002 | Rlvette |
| 6,360,215 | B1 | 5/2002 | Judd |
| 6,499,026 | B1 | 12/2002 | Rlvetta |
| 6,665,656 | B1 | 12/2003 | Carter |
| 6,665,670 | B2 | 12/2003 | Winer |
| 7,117,198 | B1 | 10/2006 | Cronin |
| 7,703,040 | B2 | 4/2010 | Cutrell |
| 7,984,047 | B2 | 7/2011 | Sukman |
| 8,161,025 | B2 | 4/2012 | Lundberg |

(Continued)

*Primary Examiner* — Hung Q Pham

(57) ABSTRACT

According to aspects of the present invention, methods, systems, and media are provided for creating, storing, and using an interactive hierarchical arrangement of technical elements useful for conducting efficient patent infringement and similar analysis. The hierarchical arrangement of technical elements is adapted to be displayed on a user-engageable computer display in a manner that allows a user to select and de-select particular technical elements. Methods and systems include storing records of technical elements in hierarchical relationships, which elements are correlated to specific patent claims during an annotation process. The hierarchical arrangement of technical elements is displayed so as to indicate genus-species relationships among the technical elements, while the stored correlations are used as a basis to perform highly efficient claims-based patent analysis.

19 Claims, 55 Drawing Sheets

(56) References Cited

U.S. PATENT DOCUMENTS

| | | |
|---|---|---|
| 2002/0042784 A1 | 4/2002 | Kerven |
| 2002/0138297 A1 | 9/2002 | Lee |
| 2002/0174131 A1 | 11/2002 | Wlner |
| 2003/0033295 A1 | 2/2003 | Adler |
| 2004/0006457 A1 | 1/2004 | Dehlinger |
| 2004/0006459 A1 | 1/2004 | Dehlinger |
| 2004/0006558 A1 | 1/2004 | Dehlinger |
| 2004/0073443 A1 | 4/2004 | Gabrlck |
| 2004/0088332 A1 | 5/2004 | Lee |
| 2004/0103112 A1 | 5/2004 | Colson |
| 2004/0133555 A1 | 7/2004 | Toong |
| 2004/0158559 A1 | 8/2004 | Poltorak |
| 2004/0230568 A1 | 11/2004 | Budzyn |
| 2004/0268399 A1 | 12/2004 | Asakawa |
| 2005/0038770 A1 | 2/2005 | Kuchinsky |
| 2005/0108172 A1 | 5/2005 | Pet |
| 2005/0120011 A1 | 6/2005 | Dehlinger |
| 2005/0144177 A1 | 6/2005 | Hodes |
| 2005/0198026 A1 | 9/2005 | Dehlinger |
| 2005/0210009 A1 | 9/2005 | Tran |
| 2005/0216828 A1 | 9/2005 | Brindisi |
| 2005/0234738 A1 | 10/2005 | Hodes |
| 2005/0256399 A1 | 11/2005 | Sirohey |
| 2006/0026174 A1 | 2/2006 | Lundberg |
| 2006/0036451 A1 | 2/2006 | Lundberg |
| 2006/0117252 A1 | 6/2006 | Du |
| 2006/0195433 A1 | 8/2006 | Klm |
| 2006/0248120 A1* | 11/2006 | Sukman ............ G06F 17/30011 |
| 2007/0198578 A1 | 8/2007 | Lundberg |
| 2010/0131513 A1 | 5/2010 | Lundberg |
| 2011/0072014 A1 | 3/2011 | Lundberg |
| 2012/0066580 A1 | 3/2012 | Sukman |

\* cited by examiner

INTELLECTUAL PROPERTY INFORMATION RETRIEVAL

CROSS-REFERENCE TO RELATED APPLICATIONS

This application claims priority to U.S. Provisional Application No. 61/894,665, filed Oct. 23, 2013, which is hereby incorporated by reference in its entirety. This application is related to U.S. application Ser. No. 11/401,903, filed Apr. 12, 2006, titled "System for Extracting Relevant Data from an Intellectual Property Database," now U.S. Pat. No. 7,984, 047, and U.S. application Ser. No. 13/135,138, filed Jun. 27, 2011, both of which are hereby incorporated by reference in their entirety.

TECHNICAL FIELD OF THE INVENTION

This invention pertains to the field of data management, retrieval, and analysis, and more particularly, management, retrieval, and analysis of intellectual property information using an electronic intellectual property database.

BACKGROUND

The universe of patents and patent-related documents is becoming increasingly large and complex. The rate of patent application filings has generally increased over the last few years. Filing patent applications across borders has become easier and, as a result, more popular. Also, technology has become increasingly fragmented among different entities.

Because of such increasing complexity, providers of products and services have had increasing difficulty in interfacing with the patent universe to accomplish various tasks. For example, determining whether an innovator's product or service encroaches on another's intellectual property rights typically involves significant financial cost, time, and manpower. These types of inquiries require actual human analysis of hundreds or often thousands of patent references. Other tasks such as determining whether an invention is patentable, an issued patent is valid, a patent portfolio is infringed by others, or a product should be marked with a specific patent number also require increasingly greater resources. In many cases, the costs of carrying out these tasks in an effective manner are preclusive. For product and service providers with lesser means, carrying out such tasks is simply not possible.

Software-based tools have been developed to simplify intellectual property information searching, but with limited success. Some software programs enable users to text-search patent references, optionally limited to specific fields of the patent document (e.g. specification or claims). Some software programs rank retrieved patent references based on a weighting system using factors such as keyword frequency. Some software programs link one or more keywords with a set of synonyms, e.g. a lookup table, for yielding a greater number of references. These and other conventional systems may marginally increase the probability that a specific search pool includes all relevant references. However, such software tools are generally inadequate to reduce a pool of patent references to a practical amount in a manner in which a user could reasonably rely.

U.S. Pat. No. 7,984,047 teaches an improved system for organizing and retrieving intellectual property information by annotating patents based on elements required for infringement. Embodiments of the present invention provide further improvements including, among many other things, the ability to receive and store correlations of individual claims of patents with one or more elements to generate a hierarchical arrangement of elements.

BRIEF SUMMARY

According to one aspect of the present invention, a method is provided for creating an interactive hierarchical arrangement of technical elements useful for conducting efficient patent infringement analysis. The hierarchical arrangement of technical elements is adapted to be displayed on a user-engageable computer display in a manner that allows a user to select and de-select particular technical elements. The method includes creating several stored records of technical elements, at least one technical element being a species of another technical element. The method further includes annotating at least two patent documents, wherein annotating includes correlating claims of the patent documents to the stored records of technical elements. The hierarchical arrangement of technical elements is displayed so as to indicate genus-species relationships among the technical elements.

According to a further aspect of the present invention, a machine-readable medium is provided with instructions recorded therein that cause a data processing system to perform a method. The method caused to be performed by the data processing system includes storing several records of technical elements, at least one technical element being a species of another technical element. The method further includes receiving user inputs for annotating at least two patent documents, as well as storing correlations that associate claims of the patent documents to the stored records of technical elements. A hierarchical arrangement of technical elements is displayed so as to indicate genus-species relationships among the technical elements.

According to yet a further aspect of the present invention, a system is provided that includes a memory storing one or more routines and a processing component configured to execute the one or more routines to cause acts to be performed. Performed acts include receiving first user inputs for annotating a first patent document, storing correlations associating patent claims with stored elements, and displaying a hierarchical arrangement of representations of stored elements. The one or more routines also act to display a results indication, receive second user inputs representing a user's selection of stored element representations and excluding, from the results indication, patent documents that are correlated to stored elements represented by selected representations.

BRIEF DESCRIPTION OF THE DRAWINGS

The drawings described below are for illustrative purposes only and are not intended to limit the scope of the present invention in any way. Exemplary implementations will now be described with reference to the accompanying drawings, wherein.

DETAILED DESCRIPTION

Figure 1:
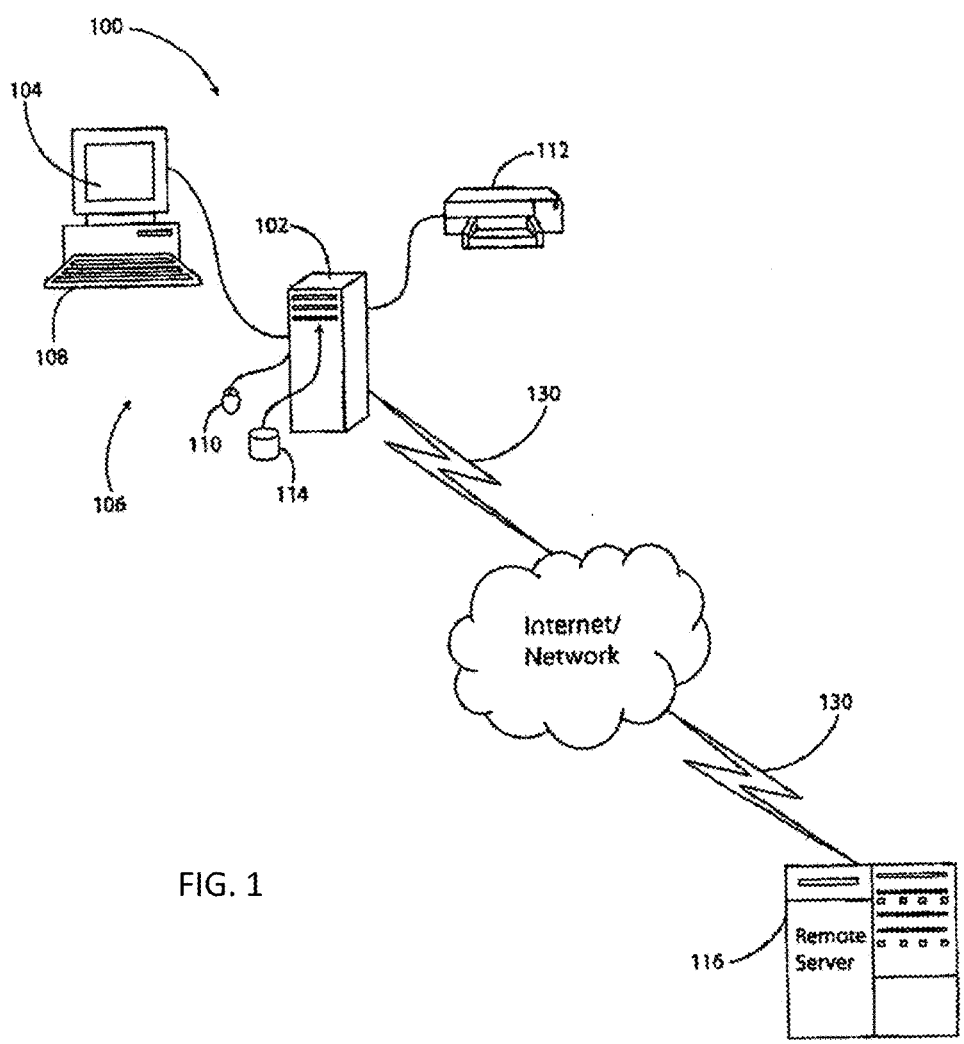
FIG. 1 is a diagram of an information system according to the present invention.
Figure 1A:
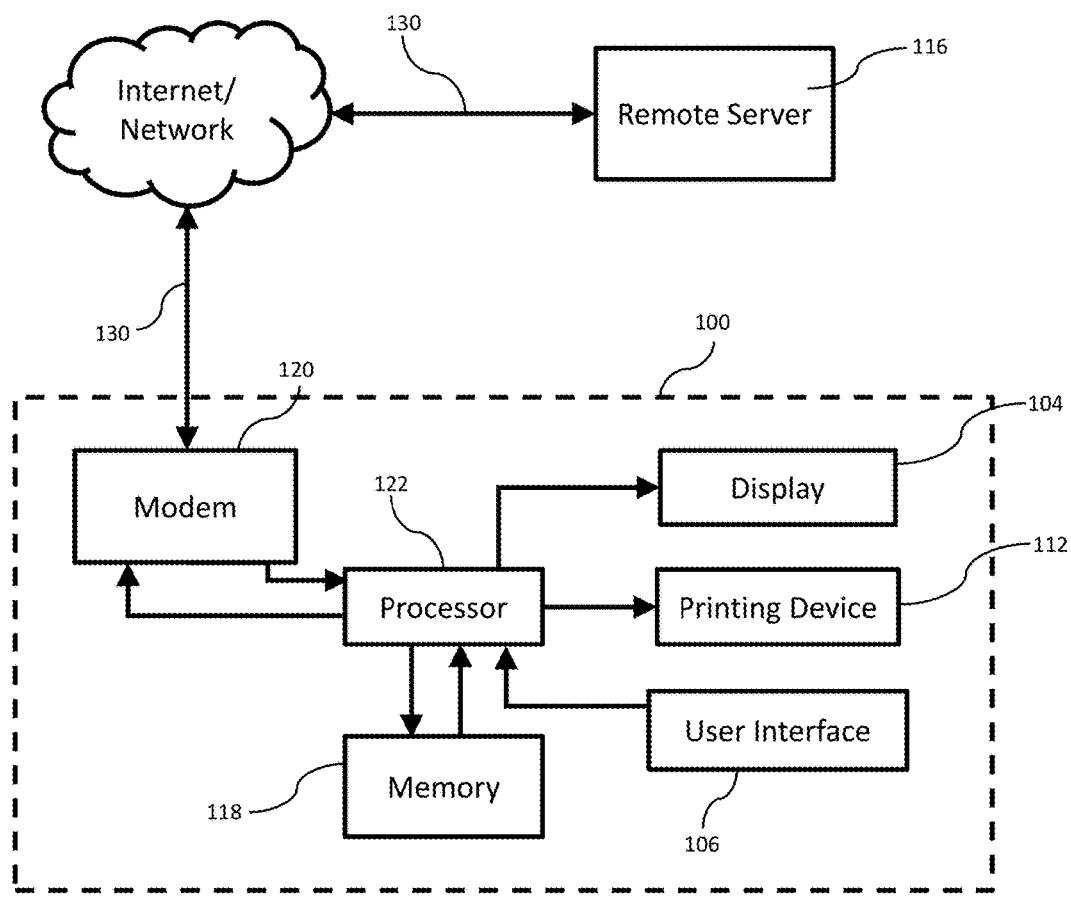
FIG. 1(a) is a schematic diagram of the system of FIG. 1.

Referring to FIGS. 1 and 1(a), in one or more embodiments, a computing device 100 (e.g. a personal computer) is shown. The computing device 100 includes a central processing unit (CPU) 102, an electronic display 104, and a user interface 106. The user interface 106, in some embodiments, includes a keyboard 108 and a mouse 110. The electronic display 104 may comprise a liquid crystal display (LCD), a plasma display, a dot matrix display, a transreflective backlit display, or any other display technology that enables viewing of textual, graphical, and/or video information. In some embodiments, a printing device 112 communicates with the central processing unit 102. Alternatively, or in addition, a removable storage device 114 is associated as shown. The removable storage device 114 may compromise a CD-ROM type storage medium or other removable storage device known in the art. The computing device may take the form of a desktop personal computer, laptop, handheld device, tablet, mobile telephone ("smartphone), or similar electronic device.

Referring again to FIG. 1, in one or more embodiments, the computing device 100 is connected to the Internet and/or local network via a communication link 130, whereupon information may be transmitted to, and/or received from, one or more remote servers, e.g. remote server 116, or other networked computers. In one or more embodiments, the communication link 130 comprises a conventional wireless communication link. In alternative embodiments, the communication link 130 comprises cabling, wireless, satellite, or fiber-optic transmission lines or the like.

Referring to FIG. 1(a), in one or more embodiments, the computing machine 100 includes a hardware processor 122. The processor 122 communicates with the display 104, the user interface 106, a modem 120 (or other network communication device or protocol stack) for transmitting data to, and receiving data from, the Internet or other network of remote computers. The processor 122 further communicates with a memory device 118, i.e. a storage medium, which includes a volatile memory device, a non-volatile memory device, or both. One having ordinary skill in the art would appreciate that a software program, such as any of the software programs described below, may be stored on the memory device 118 to be executed by the processor 122. Alternatively, or in addition, software programs, such as any of the software programs described below, may be stored on the removable storage device 114 (see FIG. 1) to be executed by the processor 122. Alternatively, or in addition, software programs, such as any of the software programs described below, may be stored on a memory device (not shown) associated with the remote server 116 to be executed by the processor 122 by the transfer of data to and from the modem 120. In some embodiments, data pertaining to the operation of software programs, e.g. any of the software programs described below, is stored in apportionment in any combination of the aforementioned memory devices.

Figure 2:
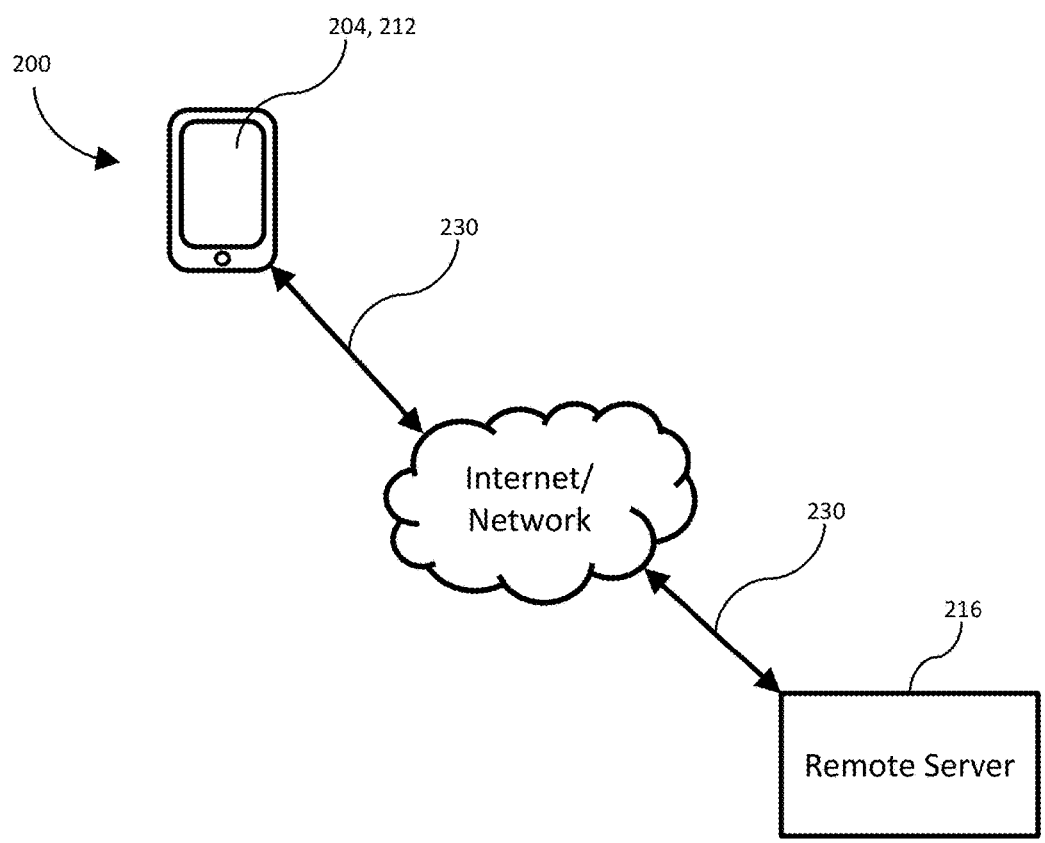
FIG. 2 is a diagram of an information system according to the present invention.
Figure 2A:
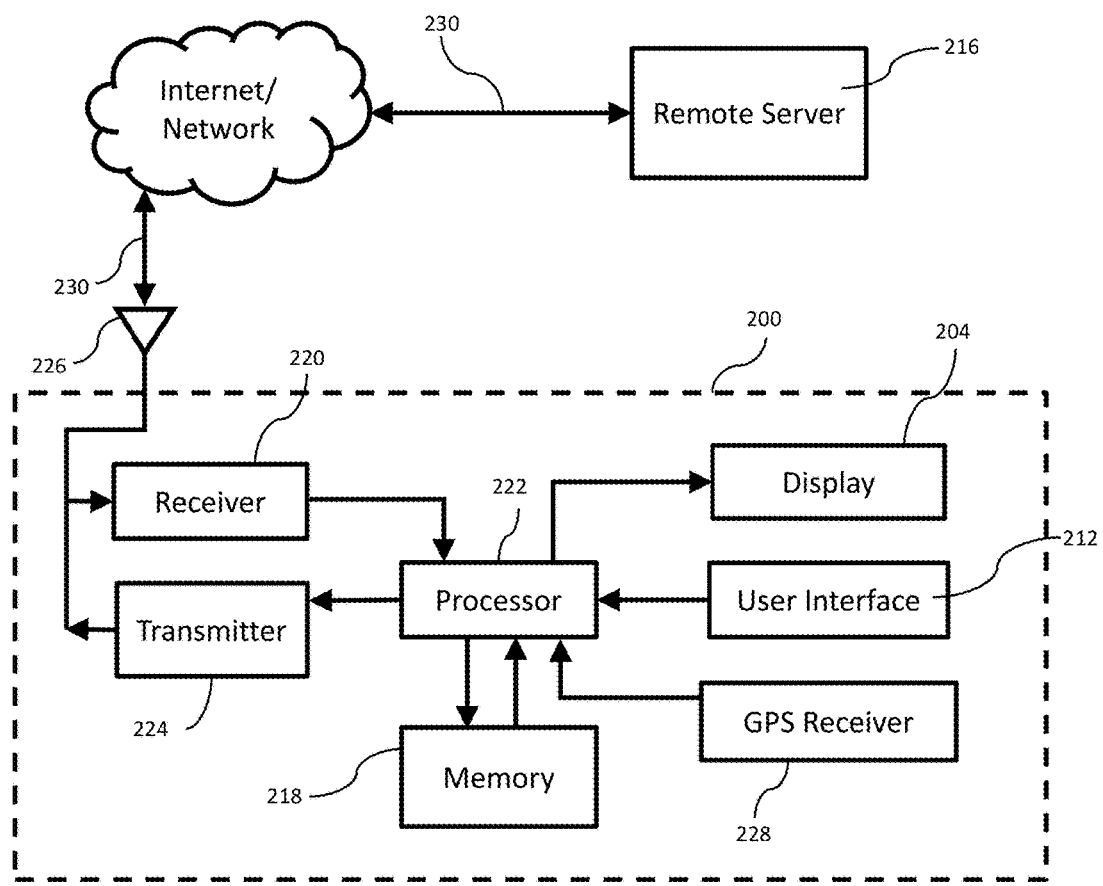
FIG. 2(a) is a schematic diagram of the system of FIG. 2.

Alternatively, in some embodiments, any of the software programs described below are configured to be executed by a processor associated with a mobile communication terminal (e.g. a cell phone, PDA, electronic reader, laptop, netbook, or tablet-style computer). Referring to FIGS. 2 and 2(a), an exemplary mobile communication terminal 200 is shown. The mobile communication terminal 200 includes a hardware processor 222. The hardware processor 222 communicates with an electronic display 204, a user interface 212, and a memory device 218. The electronic display 204 may comprise a liquid crystal display (LCD), a plasma display, a dot matrix display, a transreflective backlit display, or any other display technology that enables viewing of textual, graphical, and/or video information. The user interface 212 may comprise a touch screen interface overlaying, or incorporated into, the display 204 to allow the user to simply select displayed information by pressing on appropriate areas of the display 204 with a finger or stylus. Alternatively, or in addition, the user interface 212 may include a keyboard, keypad, click-wheel, touchpad, speech-to-text converter in combination with a microphone, and/or any other means for selecting items or information displayed on the display 204 or entering information into the mobile communication terminal 200.

The processor 222 further communicates with a transmitter 224 and a receiver 220. The transmitter 224 and receiver 220 communicate with an antenna 226 for wirelessly transmitting data to, and receiving data from, the Internet and/or network of computing devices and/or other mobile communication terminals. Alternatively, the mobile communication device 200 may communicate with the Internet or other network through cabling, wireless, satellite, or fiber-optic transmission lines or other connection device known in the art. The memory 218 includes a volatile memory device, a non-volatile memory device, or both. The memory device 218 may store software programs, such as any of the software programs described below, to be executed by the processor 222. Alternatively, software programs, such as any of the software programs described below, may be stored on a storage device associated with the remote server 216, to be executed by the processor 222 via a wireless communication link 230 and data communication by the transmitter 224 and the receiver 220.

Processor 222 utilizes conventional signal and data processing techniques to, inter alia, process signals received by the receiver 220 via a wireless communication link 230, generate signals to be transmitted by the transmitter 224 via the communication link 230, receive and process data, video and other information received from the user interface 212, the GPS receiver 228, and control the display of data, graphics, and video on the electronic display 204. Either of processors 122 and 222 comprises a microprocessor, a microcontroller, a digital signal processor (DSP), a state machine, logic circuitry, and/or any other device, or combination of devices, that processes information based on operational or programming instructions stored in a memory device, such as either of memory devices 118 and 218, respectively. One of ordinary skill in the art will appreciate that either of processors 122 and 222 may comprise multiple processors as may be required to handle the processing requirements of the present invention.

The present invention may be embodied in an apparatus or system comprising the components and features described herein. The present invention may also be carried out by a method comprising steps described herein. In some embodiments a user-interactive software program is embodied on computer-readable medium for assisting a user in performing tasks related to intellectual property information retrieval. A software program in accordance with embodiments of the present invention may be stored in nontransitory form in, for example, memory 118, 218, or may be stored at a server remote from the user that is accessible via a network. For conciseness, software programs, related processes, and systems will be described with regard to the computing device 100 of FIGS. 1 and 1(a). However, one of ordinary skill in the art would appreciate that such software programs, processes, methods, apparatuses and systems may also be carried out by like features of the mobile computing device 200, as shown for example in FIGS. 2 and 2(a). In addition, software programs, processes, methods, apparatuses and systems may be provided by and/or stored at a remote network node such that they are accessible by a user over the Internet (or other network) as a "web application" using a conventional Internet browser (e.g., Microsoft Internet Explorer, Mozilla Firefox, Google Chrome, Apple Safari, or the like). In this manner, a user may access and utilize the systems, apparatuses, and methods described herein using any mobile communications device with network access regardless of whether any particular software has been previously stored on the device.

In one or more embodiments, a software program is embodied on computer-readable medium associated with the remote server 116. The software program is adapted to be remotely accessed by a user using the personal computer 100 having a data communication link 130. The software program comprises instructions to be carried out by the processor 122. In some embodiments, the software program is accessible by navigating to a specified Uniform Resource Locator (URL). In other embodiments, the user must complete a registration process optionally including a flat fee payment and/or periodic subscription and/or maintenance fees. In some embodiments, the user is prompted to log in.

Once correctly providing log-in information, the user is presented with a first graphical user interface (GUI) 300 (shown in FIG. 3) customizable to the user's needs. In other embodiments, a remote server 116 may provide access to the software program free of charge and without any requirement for registration, enabling collaborative use and creation of databases and workspaces by a plurality of users.

Although specific labels, names, and indicia will be referred to herein by the terms as used in an exemplary embodiment, one of skill in the art will recognize that such labels, names, and indicia are not limiting in form or function and that suitably equivalent and similar actions are contemplated as being within the scope of the present invention without regard to particular characterizations used herein.

Figure 3:
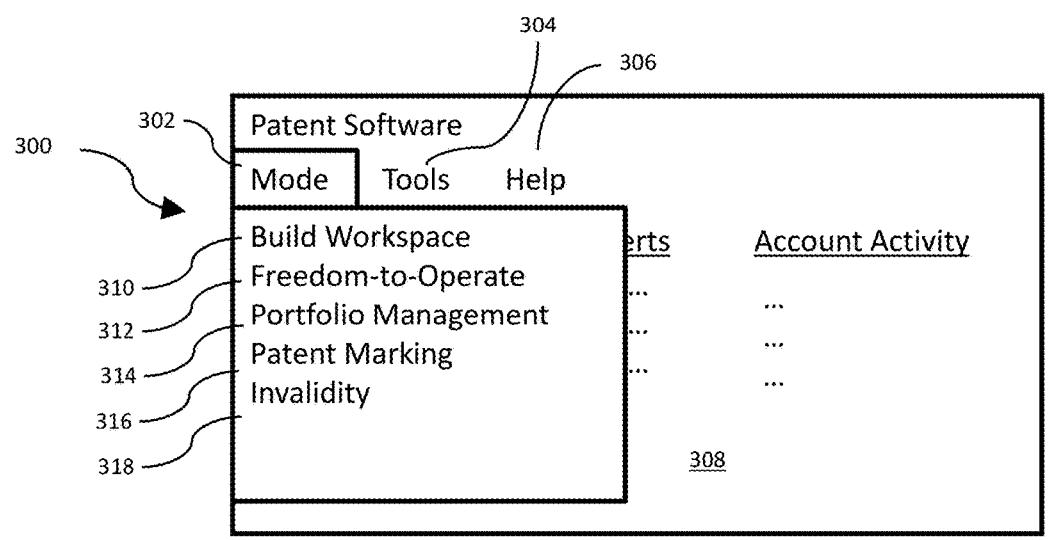
FIG. 3 is a view of a graphical user interface ("GUI") in which a "Home" module is active, according to the present invention.

As shown in FIG. 3, the first GUI 300 displays to the user a menu that includes a "Mode" or "Module" tab 302 of operating modules from which the user may select. As shown, a base "Home" operating module 308 is active. This module 308 optionally is a default operating module at the time of startup. In some embodiments, the program enables the user to select other modules to serve as a default operating module at startup. Such other modules may, e.g., be selected from a drop-down menu that is displayed based on a user's selection of the "Mode" tab 302. As shown in FIG. 3, other modules, which the user is enabled to select, include a "Build Workspace" module 310, a "Freedom-to-operate" module 312, a "Portfolio Management" module 314, a "Patent Marking" module 316, and an "Invalidity" module 318. In some embodiments, fewer than all aforementioned modules are displayed. In other embodiments, additional modules are presented.

Additionally, or alternatively, the user is enabled to modify or select which modules are displayed in the first GUI 300, either from a drop-down menu, or, alternatively, as a set of tabs that are simultaneously visible when the "Home" module 308 is active. In some embodiments, the program enables the user to set preferences as to which modules will be displayed, and thus selectable, in the first GUI 300. For example, a user may opt to display the "Freedom-to-operate" module 312 and the "Portfolio Management" module 314, but not the "Patent Marking" module 316 or the "Invalidity" Module 318. This user selection may reflect the specific needs of the user. In some embodiments, the displayed titles of these modules, in the first GUI 300 (and optionally in any subsequent GUI), is customizable by a user.

Figure 3A:
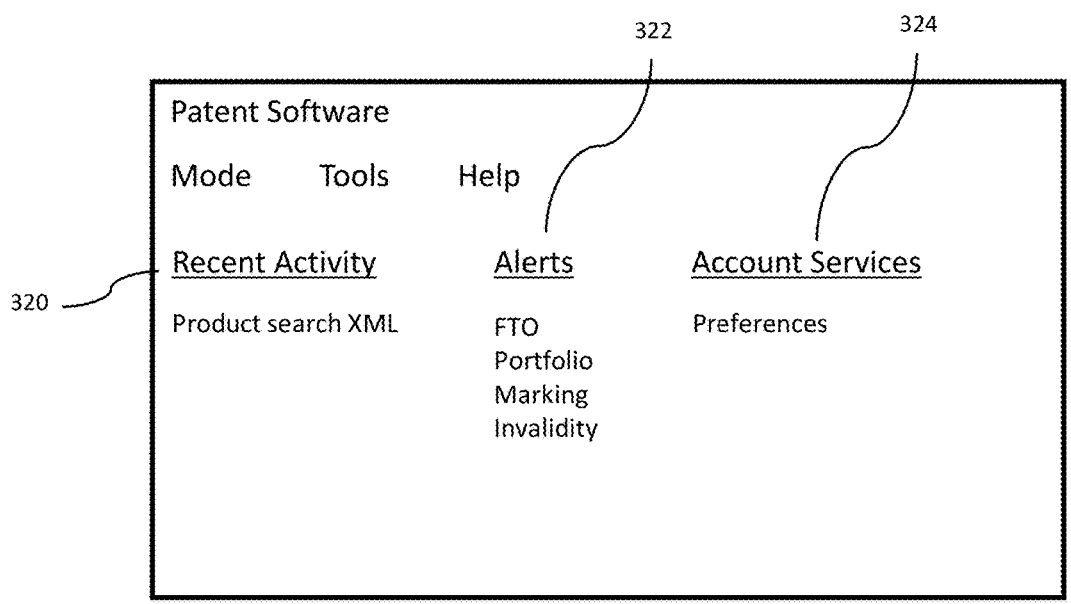
FIG. 3(a) is another view of the GUI of FIG. 3.

In some embodiments, with reference to FIG. 3(a), the "Home" module includes three sub-modules: a "Recent Activity" sub-module 320; an "Alerts" sub-module 322; and an "Account Services" sub-module 324. The "Recent Activity" sub-module 320 retrieves stored information related to past projects saved by the user in correlation with a time stamp. A specified number of recent projects are displayed under the "Recent Activity" heading and can be individually selected by the user. The "Alerts" sub-module 322 provides a display of information to the user that is automatically updated at periodic intervals and deemed useful to the user by quick reference. The "Account Services" sub-module 324 enables the user to access various member services, set preferences, and/or provide feedback to an administrating entity.

By selecting the "Build Workspace" tab, as shown in FIG. 3, the user accesses the "Build Workspace" module 310 of the software program. Once selected, in some embodiments, a second GUI 326 is displayed (shown in FIG. 4).

The second GUI 326 serves as the platform for enabling a user to access the "Build Workspace" module 310. The "Build Workspace" module 310, in general, enables a user to memorialize patent analysis in a reliable and reusable manner, so that such analysis need not be duplicated in the future. This is accomplished by associating a patent reference identification (of a patent reference) with one or more annotations, in a manner that preserves each annotation's relationship to one or more claims of the patent reference. An exemplary process 328 of associating annotations with a patent references is described below.

Figure 5:
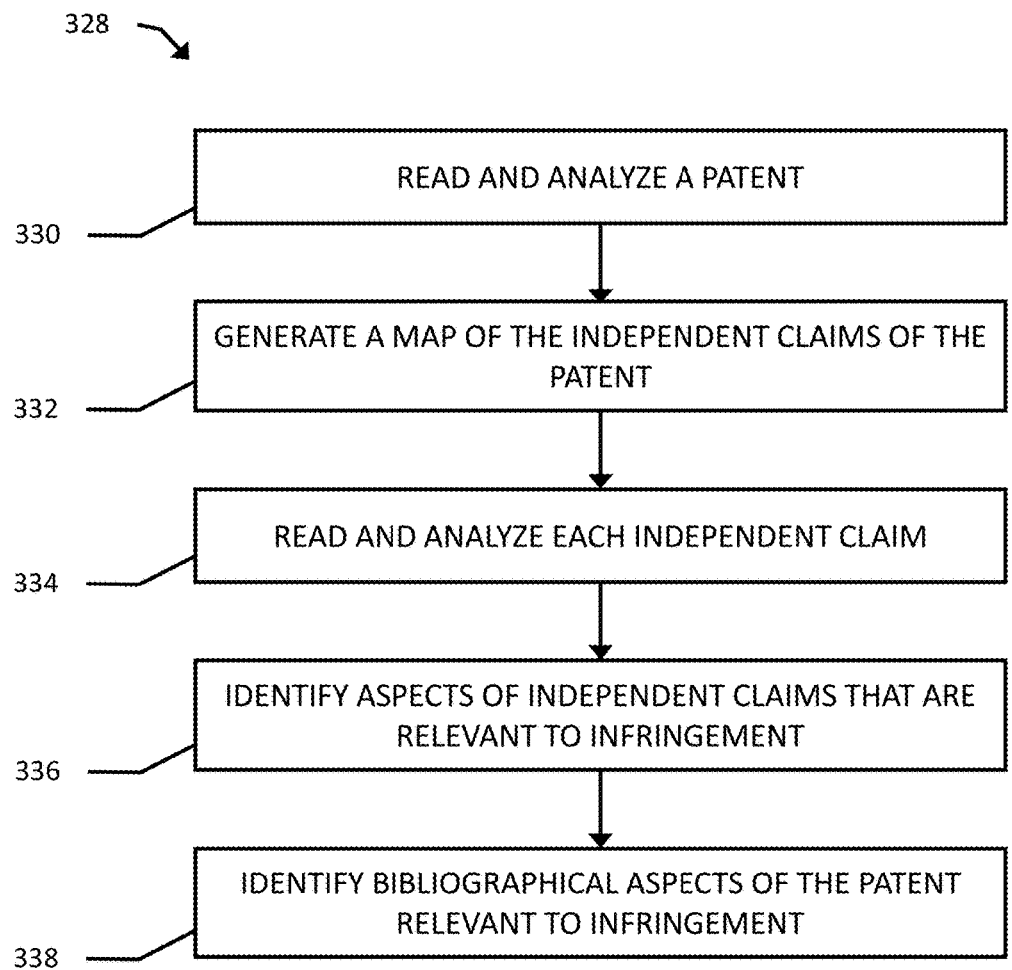
FIG. 5 is a flow chart of a process for reviewing a patent according to the present invention.

Prior to any memorialization using the software program, a user may optionally carry out the process 328 shown in FIG. 5. First, in step 330, the user reads and analyzes a target patent reference with a view toward determining aspects (i.e., elements, steps, features or conditions) that are necessary to infringe the patent. Second, in step 332, the user generates a map of the independent claims of the patent reference. The user may generally disregard any dependent claims as it is understood by those having ordinary skill in the art that dependent claims (including multiple dependent claims) can only be infringed if any independent claims from which they depend are also infringed, although exceptions may exist. Third, in step 334, the user reads and analyzes each independent claim, taking into account any necessary and reasonable supporting information. Fourth, in step 336, the user identifies aspects of each independent claim that are deemed necessary for a product or process to embody in order to infringe such claim. Any of these steps may be omitted, narrowed, expanded upon, or rearranged as deemed appropriate in particular situations by a user.

In some embodiments, the process 328 further includes a step 338 of identifying bibliographic aspects of the patent reference that may be relevant to infringement thereof. For example, the user may identify that the term of the patent has expired, any required maintenance fees or other annuities have not been timely paid, and/or being within a specific jurisdiction is required for a product or service to infringe. Additionally, or alternatively, as described further below, such information is automatically identified, and optionally periodically monitored at regular intervals, by the software program or a supporting service. Bibliographic information may alternatively or additionally include filing information, issue information, inventor and/or assignee information, classification information, or the like.

Specifically, in carrying out the step 336, the user refers to the claims portion of a patent reference to identify explicit or implicit elements thereof that are necessary for an article or process to embody in order for such article or process to infringe the patent. In a sense, a claim of a patent reference could be considered to constitute an aggregate of individual elements (or concepts) that each represent a boundary of the invention subject to the claim. With regard to design-type patent references, claimed elements constitute the aggregated design features of any claimed ornamental design. In making these determinations, preferably, the user determines which explicit or implicit elements of the independent claims are sufficiently clear and unambiguous from the language of the claims in view of any necessary supporting materials (e.g., patent specification and drawings, prosecution history, related art, and technical publications).

As an example, a patent publication may comprise a set of claims 1 through 20. Of claims 1 through 20, claims 1 and 10 are the only independent claims. Both claims 1 and 20 recite "a composition comprising the element argon." Thus, "comprising the element argon" may be considered to be an identifiable element. In addition, a user may also identify the implicit element of "comprising an inert gas." The element of "comprising the element argon" may be considered a species of the element "comprising an inert gas" because argon is a specific element that is essentially within the scope of the genus of inert gases.

Generally, the user is incentivized to identify as many such elements as possible. However, the failure of the user to identify elements that may reasonably be identified is acceptable. As will be described in more detail below, operations of the software program and associated methods use correlations formed on the basis of the analysis in step 336 only in a deductive manner. In other words, the software program is adapted such that associations generated by the user will only serve as a basis for eliminating a reference from an initial set of patent references. The software program is preferably not adapted to use such associations for purpose of actual inclusion of a patent reference in any outputted patent identification list in a freedom-to-operate (FTO) analysis. Although the specific identification of elements may be carried out differently from user to user, the standard governing analysis remains consistent.

Once the user has identified elements according to the standard of analysis described above, the software program is adapted to enable the user to store such information in an efficient manner, providing a unique technological advantage that is unattainable by mere manual labor. Referring again to FIG. 3, the "Build Workspace" module 310 enables the user to memorialize elements (and their associations with their respective patent reference), as identified above, in a workspace that includes information capable of later displaying an interactive hierarchical arrangement, e.g. in a freedom-to-operate analysis. As an aside, the elements chosen by a user to represent concepts in a claim are preferably defined independently of any specific reference, i.e., elements may be defined universally regardless of any specific patent reference with which it is associated. Normalizing element definitions in this way solves nomenclature and terminology problems in conventional searching methods that require users to account for all of the different ways that different authors refer to similar concepts.

Figure 4:
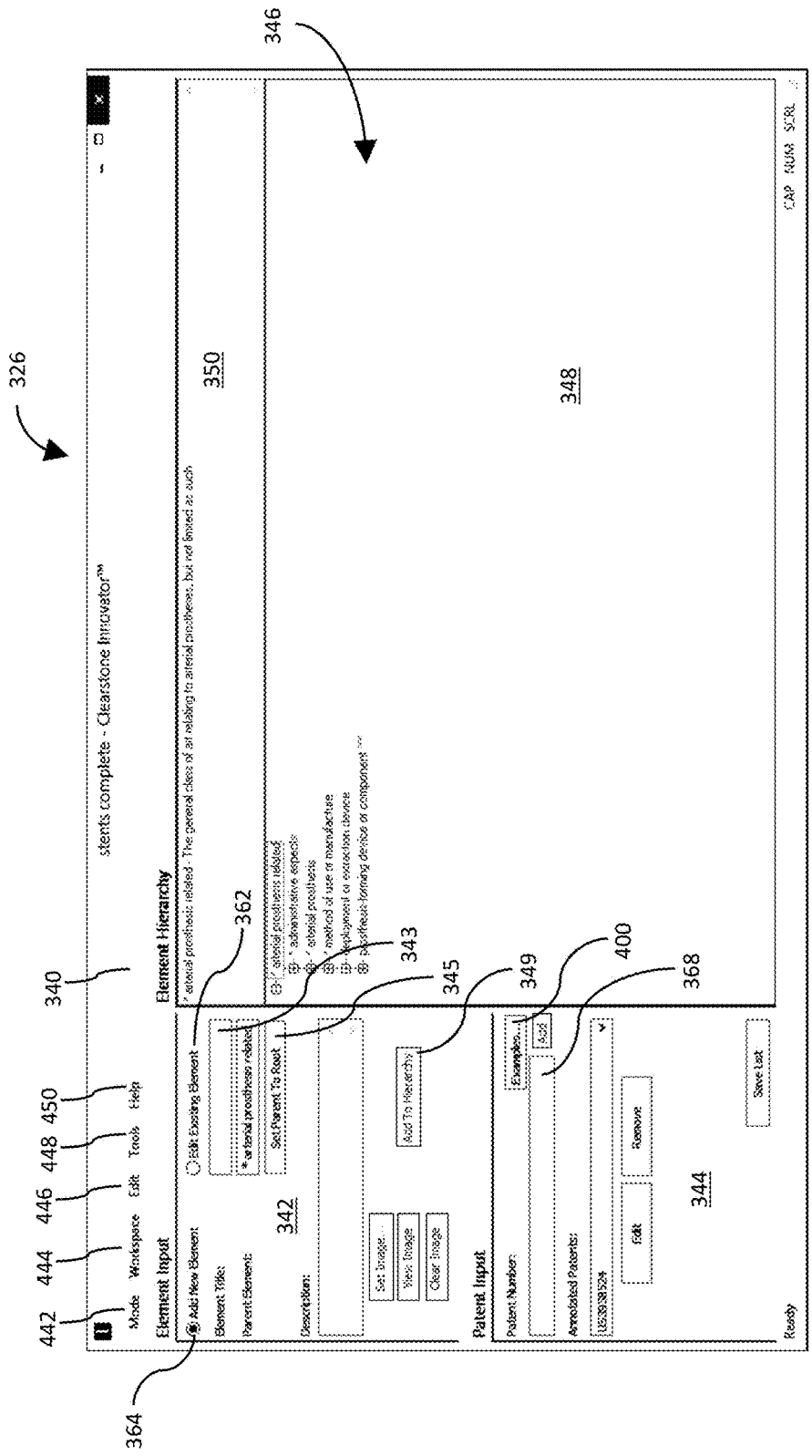
FIG. 4 is a view of a GUI in a first state according to the present invention.

The memorialization of such elements is enabled by the second GUI 326 shown in FIG. 4. The second GUI 326 includes the display of a menu bar 340 for enabling access to basic operations. The second GUI 326 further includes an "Element Input" portion 342 for adding new elements or modifying existing elements in a workspace. The second GUI 326 further includes a "Patent Input" portion 344 for adding information to the workspace comprising correlations between patent reference identification numbers and elements of the workspace with which they are associated. The second GUI 326 further includes an "Element Hierarchy" portion 346 for interactively displaying the hierarchical architecture of elements in a workspace, as described in further detail below.

The "Element Hierarchy" portion 346 preferably includes a first sub-portion 348 for displaying the hierarchical arrangement of elements of a loaded workspace. The "Element Hierarchy" portion 346 preferably further includes a second sub-portion 350 for displaying a description of an element that had been selected by the user by interface with the first sub-window 348. In some embodiments, the second sub-portion 350 further includes a portion for displaying one or more images associated with a user-selected element. The first sub-window 348 enables the user to variously select elements. In some embodiments, where the elements include genera and species thereof, the hierarchical display is interactive such that elements having species are expandable and collapsible to respectively reveal and hide such species.

Figure 6:
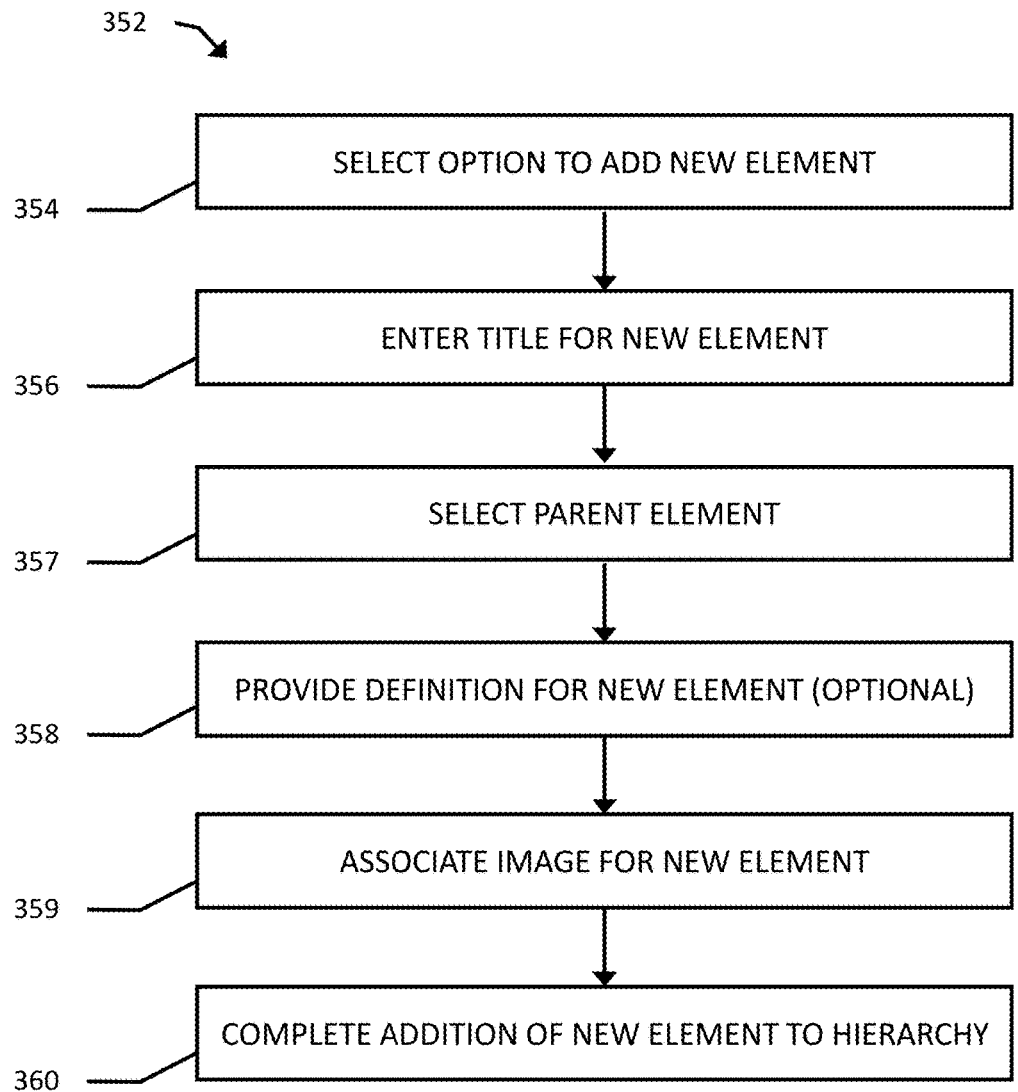
FIG. 6 is a flow chart of a process for adding an element in a hierarchy according to the present invention.

The "Element Input" portion 342 enables a user to add an element to the hierarchical structure of a workspace. Referring to FIG. 6, to add a new element to the workspace, the user may perform the following program-enabled process 352. First, the user selects "Add New Element" from among selections of "Add New Element" and "Edit Existing Element" as shown, as in step 354. Next, the user enters a title for the element that will be ultimately displayed in the "Element Hierarchy" portion 346, in step 356. Next, in step 357, the user selects an existing element of the workspace to correspond to a parent element (i.e. the genus of the added element to which the user believes the added element belongs). Preferably, the software program enables the user to select a parent element of the added element by selection of an element from the "Element Hierarchy" portion 346. In this case, selection of an element of the "Element Hierarchy" portion results in the display of the selected element in the corresponding "Parent Element" text box 343 in the "Element Input" portion 342. If, on the other hand, the user desires for the added element to function as a root element (i.e. not belonging to any previously-established genus), the user may select the "Set Parent to Root" tab 345 below the "Parent Element" text box 343. Any of these steps may be omitted or rearranged as deemed appropriate to a particular situation at hand. In addition, any of the aforementioned steps or functions may be adapted to different interactive environments. For example, the option to add a new element as a species of a particular element may be configured as part of a "right-click menu" or similar menu that is displayed when a user right-clicks or otherwise selects the particular element in the element hierarchy.

As a matter of strategy, a user may embed into parent elements, as species, elements that logically constitute species of the parent element within which they are embedded. For example, an element "comprises neon" may logically constitute a species of "comprises an inert gas." Thus, a user preferably may embed the element "comprises neon" within "comprises an inert gas." Also, as a matter of strategy, the user may add elements that serve only as placeholders, i.e. are not intended to be associated with patent references. Such placeholders may assist the user in organizing elements. For example, a placeholder "volume" may be used to have embedded therein the elements "volume less than 50 cubic centimeters" and "volume greater than 150 cubic centimeters." In derivative operations (e.g. a freedom-to-operate search in view of a reference entity), a user would likely not select such placeholders (e.g., "volume") as a characteristic not embodied by a product or service undergoing search. In some embodiments, the user is enabled to use text-based or graphical indicators to signify that an element serves only as a placeholder. In other words, the software program, in some embodiments, enables the user to use asterisks or other symbols in combination with an element title to signify a placeholder. For example, in the case described above, the user may entitle "volume" as "* volume." Alternatively, or in addition, a user is enabled to assign placeholder elements a different font style, color, or size. Additionally, or alternatively, the software program enables the user to indicate that an element is a placeholder such that a user is disabled or prevented from selecting such element in a derivative operation, e.g. a clearance or freedom-to-operate search for a reference entity.

Next, in some embodiments, in step 358, the software program enables the user to associate a description or definition to the added element. Providing this function, the user may further define the element and/or provide examples of the element. Storing and displaying such a description or definition separate from the hierarchical display of element titles avoids a cluttered, and thus difficult to read, hierarchical arrangement display. Preferably, the association of a description or definition with an added element is an optional function.

Next, in some embodiments, the software program enables the user to associate an image with the added element. This function is particularly helpful in the case of an element that is best understood visually. Preferably, the software program enables the user to load images of a variety of conventional image file types (e.g. .bmp, .gif, .jpg, and/or .tiff). Also, preferably, in step 359, the function of associating an image with an added element is an optional function. Next, in step 360, the user may click on the "Add to Hierarchy" button 349, which results in adding the element to the workspace and thus to the hierarchical arrangement display in the "Element Hierarchy" portion 346.

Figure 4A:
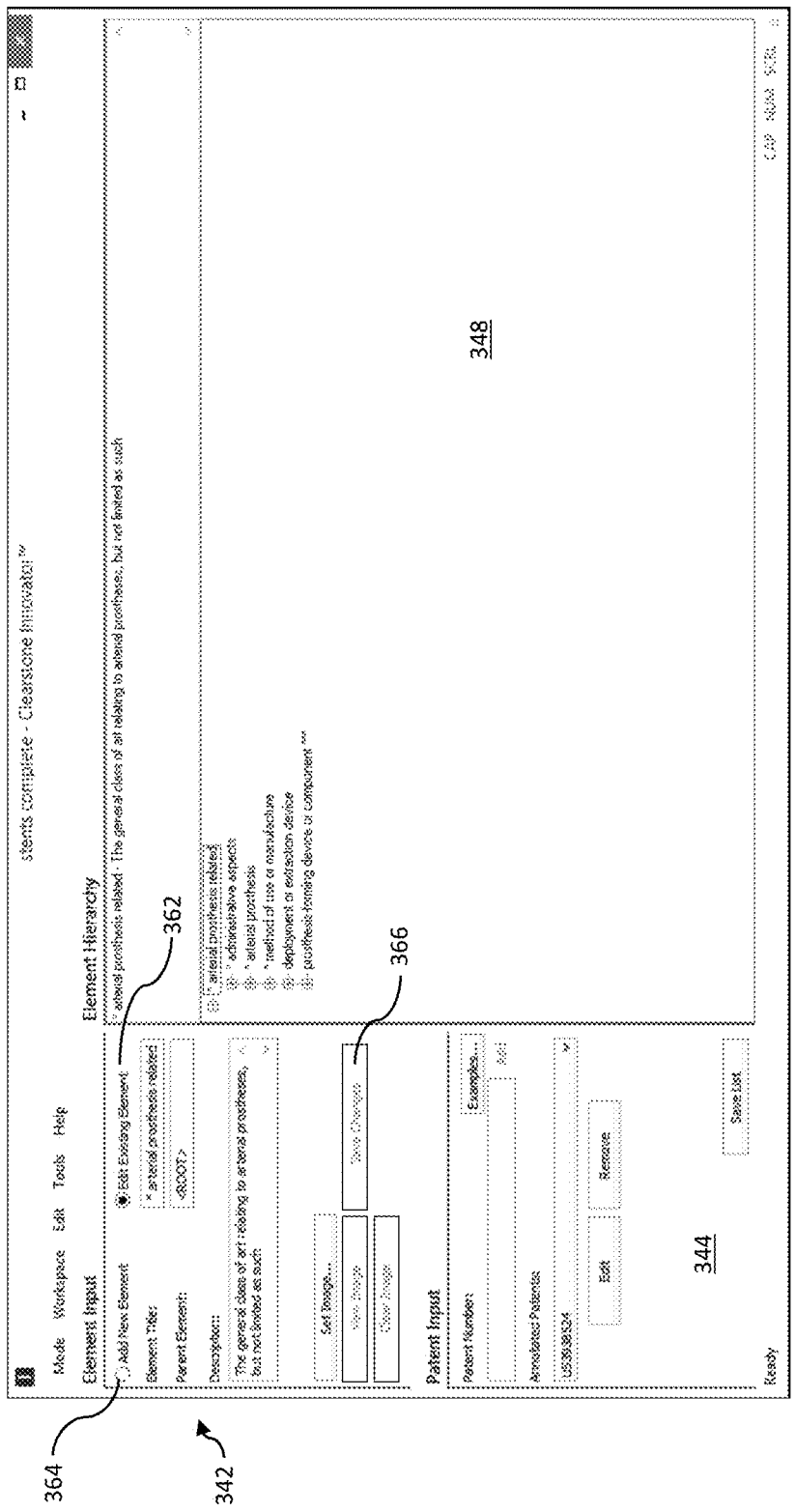
FIG. 4(a) is a view of the GUI of FIG. 4 in a second state according to the present invention.

The "Element Input" portion 342 also enables the user to edit an element selected from a workspace. A user may edit an element by first selecting the element in the hierarchy display sub-portion 348 using, e.g., a mouse. Once an element is selected, the user may select the "Edit existing element" button 362 from among options of "Edit existing element" 362 and "Add new element" 364. In some embodiments, displayed prompts in the "Element Input" window 342 change based on such user selection, as shown in FIG. 4(a). Next, the user may edit the title of the element. Next, the user may edit, add, and/or remove a description to be associated with the element. Next, the user may edit, add, and/or remove an image to be associated with the element. Next, the user may click on a "Save changes" button 366, which action stores and updates the changes to the workspace. The editing function may alternatively be accessed from a different menu, depending upon the particular interactive environment in use. For example, the editing function may be accessed from a "right-click menu" or similar menu that is displayed when a user right-clicks or otherwise selects an element desired to be modified.

Referring again to FIG. 4, using the "Patent Input" portion 344, the software program enables the user to add and/or edit patent references in a workspace in association with one or more elements of the workspace.

Figure 7:
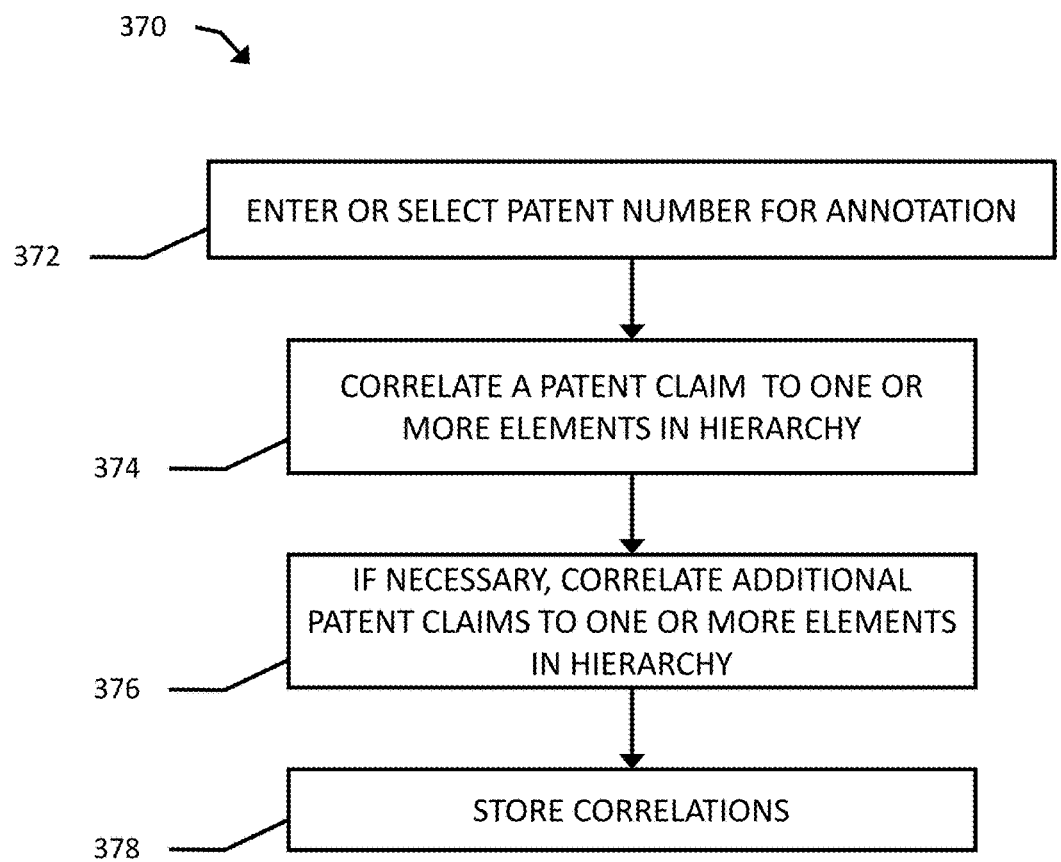
FIG. 7 is a flowchart of a process for annotating a patent according to the present invention.

In some embodiments, referring to FIGS. 4 and 7, a user may carry out a first process 370 for associating elements with patent references. First, in step 372, the user may enter into the text box 368 a patent reference identification (e.g. a patent number, a serial number, a publication number, or the like). In some embodiments, a list of patents to be annotated is already provided, and a user can simply select a patent number of a patent he wishes to annotate. Next, in step 374, the user may correlate a patent claim to one or more elements of the workspace shown in the "Hierarchy display" window 348. In step 376, additional patent claims are correlated to elements in the hierarchy. Generally, a user separately correlates each of the independent claims of the patent to elements in the hierarchy, although in some embodiments a user may also wish to correlate dependent claims. If a second claim contains no additional elements that a user wishes to select for that claim beyond elements already entered for a first correlated claim, a GUI button or other selector may be provided to indicate and register with the software program that no further elements will be associated with the second independent claim.

The process of associating elements with patent references may be based on a previously completed patent analysis, as described above, in which each independent claim of the patent reference is appropriately associated with one or more elements, although in some embodiments no such analysis need be performed ahead of time. In some embodiments, the user may add to the workspace any elements that may be associated with the added patent reference that have not been previously added to the workspace. This step may be carried out prior to or during the process 370.

Next, in step 378, the software stores the correlations between patent claims and elements in a manner that preserves the specific relationship of such elements with the annotated claims. For each patent, each of the claim correlations may be stored in association with an identifier for the patent document itself so as to create a patent record that contains all of the correlations associated with the patent's claims.

In some embodiments, for elements that are common to all independent claims, the user may directly associate the element with the patent reference. The software program may display such elements as being associated in "or" relationship. This signifies that any such element, alone, suffices to cause elimination of the patent reference from consideration if a product under such does not embody such element. Alternatively, the software program may simply list elements selected for each independent claim without indicating the particular logical relations used (for purposes of simplicity of presentation).

Figure 8:
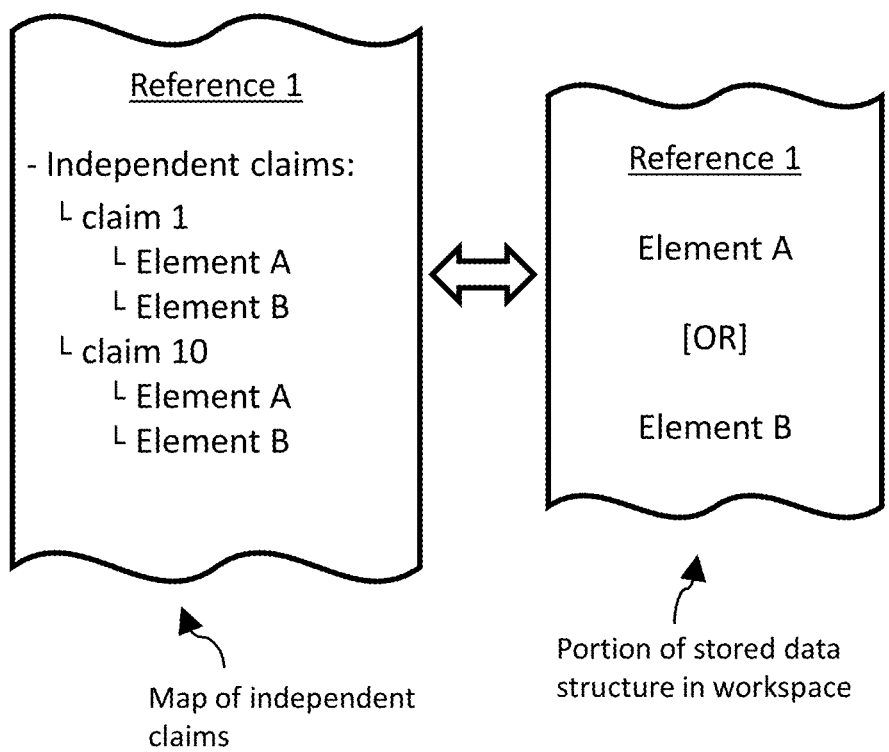
FIG. 8 is an illustration comparing a first logic structure of a patent reference to a corresponding first data structure in accordance with the present invention.

For example, as shown in FIG. 8, Reference1 only includes independent claims claim1 and claim10. Each of claim1 and claim10 have been determined by a user to correspond to element A and element B (see FIG. 8). Accordingly, a user may correlate reference) to element A and element B, which results in the displayed "element A OR element B." FIG. 8 is exemplary of a logical relationship that may be stored in a data structure, but numerous other methods of storing information inputted by a user may be utilized. For example, in some embodiments the software program may automatically generate these logical relationships upon a user correlating claim1 to each of element A and element B and, separately, correlating claim10 to element A and element B. In one variation, a user need not enter the elements for claim10 and may simply select a button that indicates that claim10 has the same elements as another claim or claim1 specifically. In other embodiments, the information supplied by a user to correlate claims to elements is stored in its raw form and a subsequent routine may be executed to act on the data using a desired logical algorithm. Therefore, the logical relationships shown on the right-hand side of FIG. 8 (and all other examples of stored data structures described herein) may or may not ever be recorded in permanent form.

In some cases, the independent claims of a patent reference may be determined to be associated with elements that are different from each other. For example, referring to FIG. 9, in a second example, reference2 only includes two independent claims, claim 1 and claim 10. Claim 1 has been determined to correspond only to element A and claim10 has been determined to correspond only to element B. In this case, element A and element B should not be independently associated with reference2 because neither element alone suffices to cause elimination of reference2 if a product does not embody such element. However, if a product does not embody both element A and element B, reference2 should be eliminated from consideration. Preferably, the software program is enabled to memorialize this form of association. Accordingly, to handle this case, the software program may be configured to automatically establish a logical relationship similar to that shown in FIG. 9 when, for example, a user simply correlates claim 1 to element A and, separately, correlates claim10 to element B. In other embodiments, the user may directly indicate that element A and element B are to be stored in "and" relationship.

In some cases, the independent claims of a patent reference may be determined to be associated with some elements that are common to all independent claims and some elements that are not. For example, in FIG. 10, a patent reference, reference3, includes only independent claims claim 1 and claim 10. Claim 1 has been determined to be associated only with element A and element B. Claim 10 has been determined to be associated only with element A and element C. In this case, the user may correlate claim 1 to element A and element B and, separately, correlate claim 10 to element A and element C. The software program may then automatically generate and store the logical relationships shown on the right-hand side of FIG. 10. Alternatively, the raw data entered by the user, or some manipulation thereof, may be stored and a subsequently running routine may act upon the data to cause the logical relationships shown in FIG. 10 to effectively be applied while the logical relationships themselves are not permanently stored. Logical corollaries and derivative permutations of these concepts, whether performed by a user and entered into a computer, or performed by a computer program configured to execute such derivations, are all within the scope of the present invention.

In alternative embodiments, the user may use a reference input window to directly associate reference3 with elements of the hierarchy as follows: A OR (B AND C). The software program may then interpret this statement as indicating that: (1) embodying element A, alone, suffices to cause elimination of reference3 from consideration; and (2) embodying either element B or element C, alone, does not suffice to cause elimination of reference3 from consideration, but embodying element B and element C, in combination, so suffices.

Figure 9:
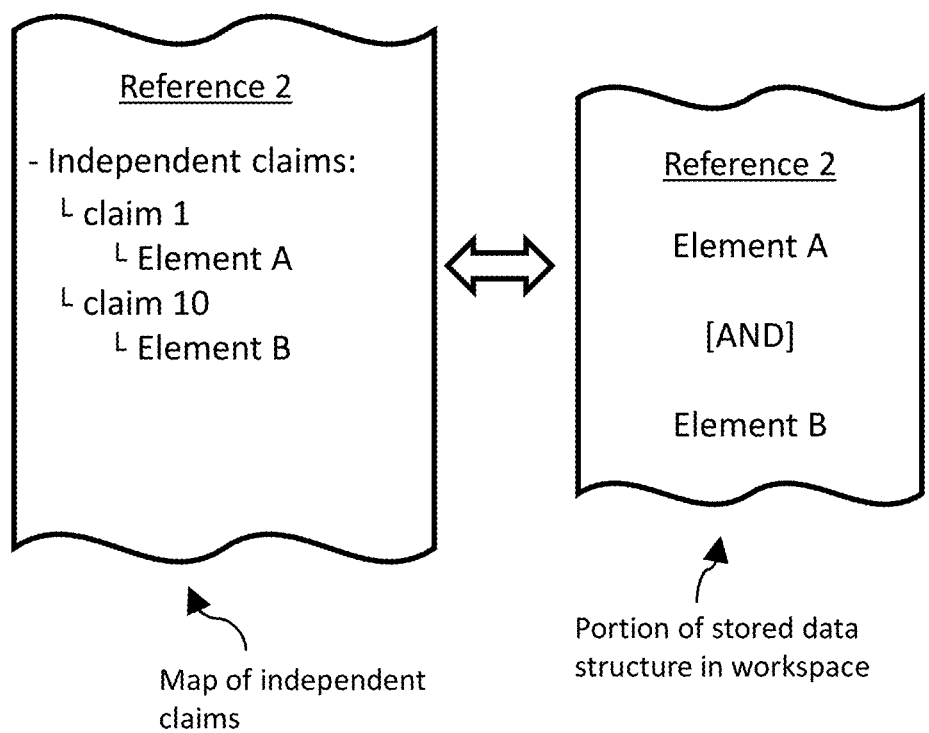
FIG. 9 is an illustration comparing a second logic structure of a patent reference to a corresponding second data structure in accordance with the present invention.
Figure 10:
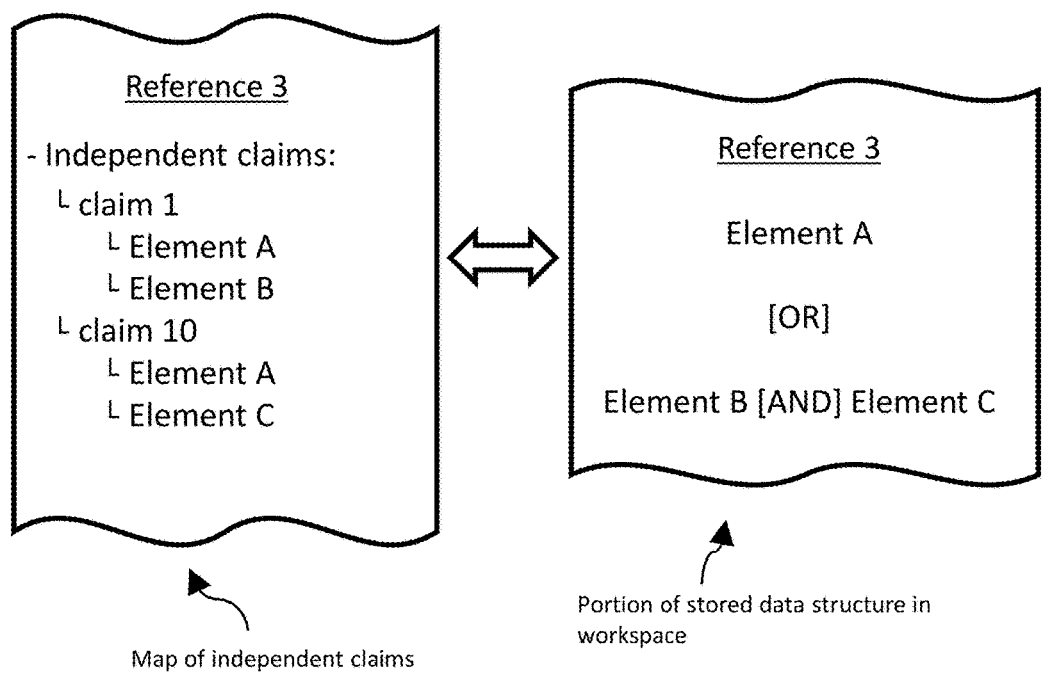
FIG. 10 is an illustration comparing a third logic structure of a patent reference to a corresponding third data structure in accordance with the present invention.

The stored data structures shown in FIGS. 8-10 are only exemplary and do not necessarily represent the actual content of such data structures. Numerous formulations of data storage and logical relationships are within the scope of the invention without the intent to limit the data structures to those shown. For example, the methods of the present invention may implement data structures that do not generate the logical relationships shown in FIGS. 8-10 but instead include the stored correlations between patent claims and hierarchical elements, organized by claim and/or patent identifier record. Program routines may then act on such data structures to generate the proper logical relationships without having to store such relationships in the data structure itself. The specific manner in which the correlation and logical data is stored and acted upon may vary so long as the objectives of the present invention are met, which include, among other things and without the intent to limit the scope of the invention, the ability to receive and generate correlations of specific patent claims to hierarchical elements using an interactive graphical interface.

Figure 11:
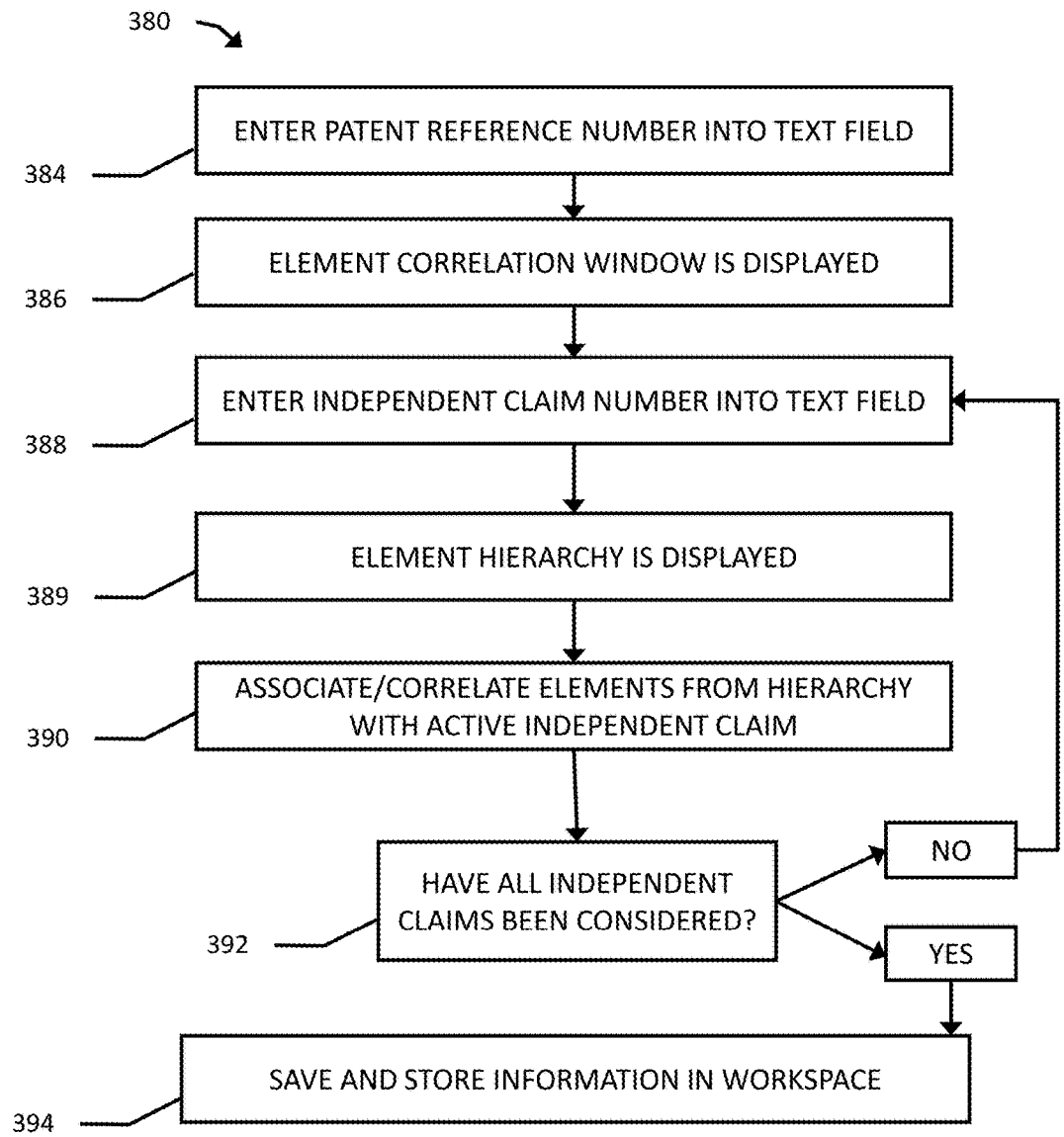
FIG. 11 is a flowchart of a process according to the present invention.

FIG. 11 depicts an exemplary process 380 for creating, receiving and storing correlations of patent claims with elements in a hierarchical arrangement. In some embodiments, the software program automatically generates one or more logical relationships between elements of different claims of a patent reference based on this claim-by-claim user input of elements. The process 380 may be implemented using a GUI 326, such as that shown in FIG. 12.

Figure 12:
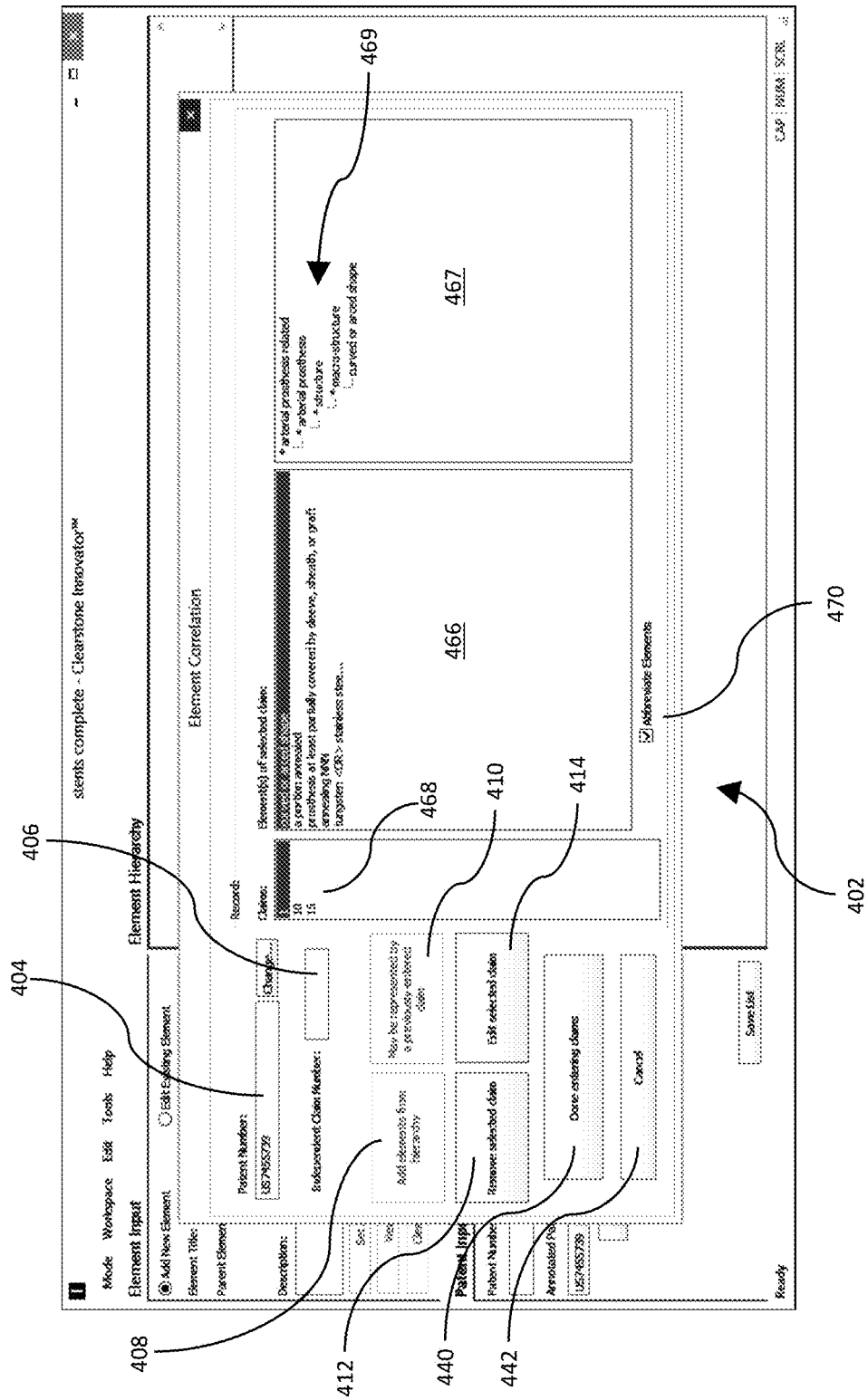
FIG. 12 is a view of a GUI according to the present invention.

With reference to the process 380 shown in FIG. 11, first, in step 384, a user enters a reference identification into the text box 368 (or select from pre-existing list of reference numbers). When the user clicks the "Add" button 400, a supplementary "Element correlation" window 402 is caused to be displayed, step 386, as shown in FIG. 12. Preferably, the display of the "Element correlation" window 402 causes all other program functionality to be locked, until the "Element correlation" window is exited.

Next, in step 388, the user may enter into the text box 406 a first independent claim number of the reference whose identification is shown in text box 404. Generally, when a user enters a claim number into the text box 406, the software program enables selection of options including "Add elements from hierarchy" 408, and "May be represented by a previously entered claim" 410. Preferably, in some embodiments, the program enables determination of whether a claim number entered into the text box 406 is a first claim number associated with a reference and, if so, the option of selecting "May be represented by a previously entered claim" 410 is not available to the user.

Figure 12A:
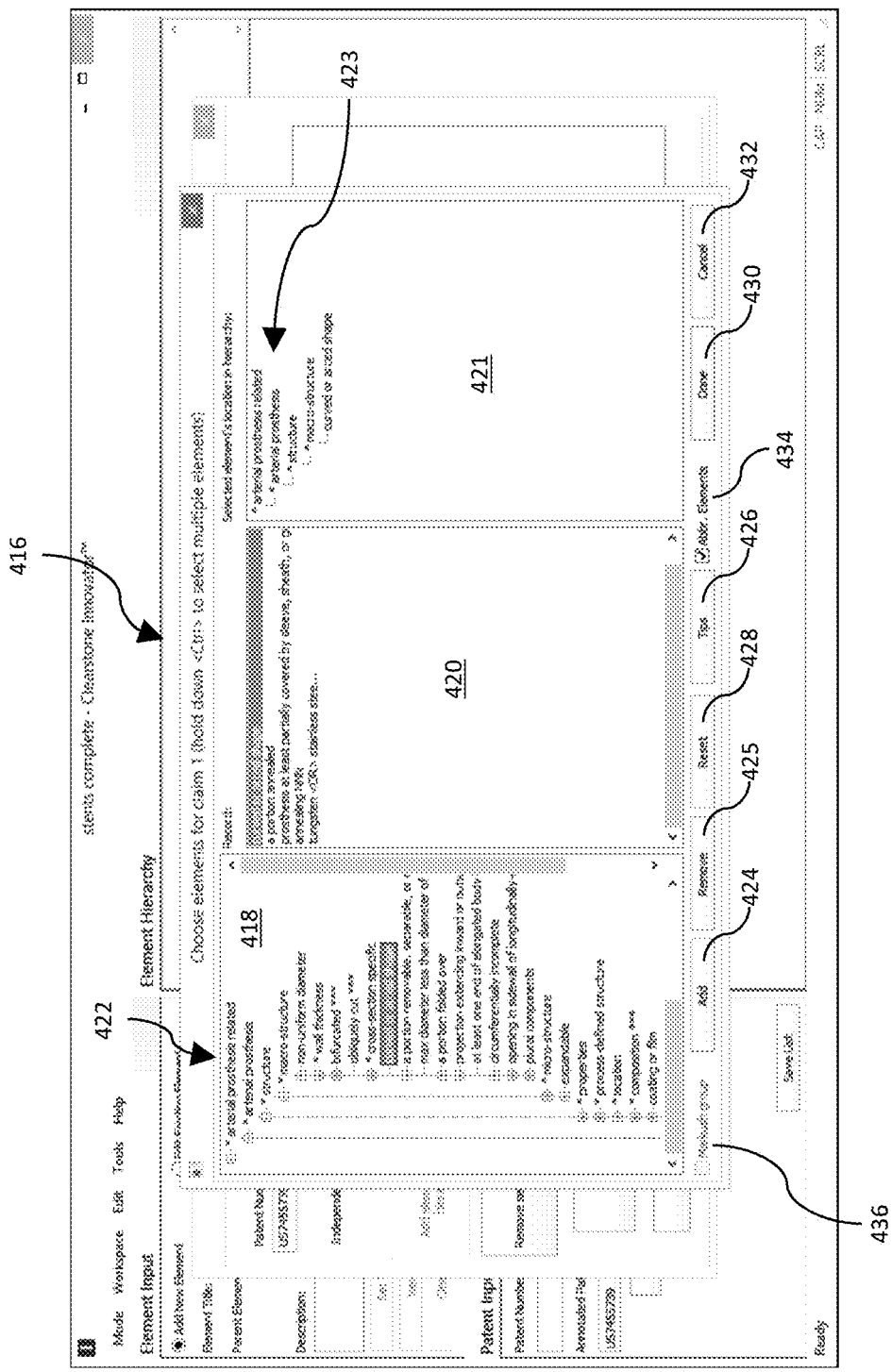
FIG. 12(a) is a view of the GUI of FIG. 12 in a second state, according to the present invention.

In step 389, if the user enters a claim number and selects the "Add elements from hierarchy" button 408, a second supplementary window, a "Choose elements" window 416, may be displayed as shown in FIG. 12(a). In some embodiments, the "Choose elements" window 416 includes a first sub-window 418 that includes a redundant display of the element hierarchy of "Element hierarchy" window 346 (FIG. 4). The "Choose elements" window 416 also includes a second sub-window 420 that includes a display of elements selected to be associated or correlated with the added claim, once selected by the user. Then, in step 390, the user may interact with the element hierarchy display 422 to select one or more elements to correlate or associate with previously-designated claim. Once an element is selected in the display 418, the user may select the "Add" button 424 to enable storing of such element in association with the added claim. A "Remove" button 425 may also be provided so that elements in second sub-window 420 may be selectively removed from association with a claim. Multiple elements may be selected at once, e.g. by the user holding down the Control button of a conventional keyboard. Preferably, in some embodiments, multiple entered elements are assumed to be related such that a product or service embodying any of such elements suffices to eliminate such claim from consideration.

The "Choose elements" window may include a third sub-window 421 that is configured to display an abridged hierarchy showing the ancestral lineage or family tree 423 of the element selected in sub-window 420. This mini hierarchy 423 is helpful for a user to quickly determine the location of the selected element in the full hierarchy when, for example, previously-made annotations are being checked for propriety. The "Element Correlation" window 402 (FIG. 12) may provide a similar mini-hierarchy 469 in a sub-window 467 to likewise provide the ability to quickly determine the ancestral lineage or family tree of an element that is selected in sub-window 466. In both cases, the mini hierarchies 469 and 423 are preferably truncated versions of the full element hierarchy that show only direct relatives of a selected element. In some embodiments, both children and ancestors of the selected element may be shown, while in other embodiments only the ancestors are shown.

Preferably, in some embodiments, additional functions are enabled to handle claim elements that are determined to be requisite elements, but only in the alternative. For example, a claim may explicitly recite a "composition comprising carbon or nitrogen." In this case, a product that does not embody only one of "carbon" or "nitrogen" is not sufficient to eliminate the claim from consideration in an infringement-based analysis. However, not embodying both carbon and nitrogen should suffice to eliminate of the claim from consideration. Another example may be a recitation of what is commonly known in the art as a "Markush group." A user may enter such alternatively-related elements by selecting all alternatively-related elements, e.g. by holding down the CONTROL button of a convention keyboard. Once all such elements are selected, the user may check the "Markush group" box 436 or otherwise select an indicator to register that the selected elements are claimed in the alternative. Then, by the user selecting the "Add" button 424, such information will be caused to be stored in the workspace with the appropriate logical relationships. Further, preferably, such information is displayed in the second sub-window 420, in the manner shown in FIG. 12(a) or in an equivalent manner. As shown in FIG. 12(a), such "Markush" or alternatively recited elements are denoted in the second sub-window by an "<OR>" signal to visually indicate to the user that the selected elements are entered as alternatively claimed concepts. In some embodiments, at any point when the "Choose elements" window 416 is active, the user may select any previously entered element (or elements), and remove such specific element from the total list of elements associated with the current claim 438, as shown in the window 420.

In some embodiments, functionality may be provided to allow a user to associate elements with patent claims directly from the element hierarchy window 346 (without the need for a redundant element hierarchy window 418).

In some embodiments, functionality may be provided to create or edit elements in the element hierarchy directly through the "Choose Elements" window 416 in a similar manner as described above regarding the "Element Input" portion 342.

Additionally, or alternatively, the "Choose elements" window 416 includes a "Tips" button 426. By user selection of the "Tips" button 426, the user may access text-based reference documents for assistance in how to carry out the above operations. Additionally, or alternatively, the "Choose elements" window 416 includes a checkable "Abbreviate elements" box 434. By selecting the "Abbreviate elements" box 434, the element titles, as displayed in the second sub-window 420 are abbreviated for ease of viewing. In some embodiments, preferably, the "Choose elements" window 416 further includes a "Reset" button 428. By the user selecting the "Reset" button 428, the software program is configured to remove all associations of elements with the active claim from the workspace and reflect such removal in the "Record" sub-window 420. Once the user has completed entry of elements for a specified claim, the user may select the "Done" button 430, whereupon all submitted element relationships are stored, or caused to be stored in the future, in the workspace.

In step 392, an optional verification process may be programmed into the software to ensure that all independent claims have been considered and appropriately correlated to elements. It is preferable that the user, in some manner, account for all independent claims of the patent reference. If less than all independent claims are accounted for, the integrity of derivative functions may be compromised. Thus, preferably, the software program causes a warning message to be displayed based on the user selecting the button 440.

The warning message may remind the user to ensure that all independent claims of the active patent reference have been accounted for. The "Element correlation" window 402 also includes a "Cancel" button 442. At any point, the user may click this button 442 to exit out of the "Element correlation" window 402 without having stored any entered information. If there are additional claims to enter and correlate, the user may return to step 388 to enter additional claims. The user performs the correlation process for the additional claims to associate the claims with elements from the hierarchy as described above. In some cases, subsequent independent claims may include similar elements as previously-entered independent claims. In such a case, preferably, the user may select the "May be represented by a previously entered claim" button 410. Selection of this button 410 stores information indicating that the requirements to cause elimination of the subsequently-entered claim are redundant with a previously-entered claim of the same patent reference. The user may also correlate dependent claims of the patent reference, if desired.

Once the user completes entering element relationship information for all independent claims of a reference, the user may select the "Done entering claims" button 440 (FIG. 12). In step 394, the correlation information is stored.

In some embodiments, the "Element correlation" window 402 further includes an "Element accuracy" text box (not shown). Preferably, this text box enables the user to associate a rank with the patent reference. The rank preferably signifies the degree to which the user believes that the applied elements accurate portray the scope of the independent claims in their totality. Preferably, the software program enables the user to select a ranking from a range of integers, for example the range of 0 to 5. In some alternative embodiments, the selections may include integers ranking from 1 to 10. In some alternative embodiments, the ranking selection is a simple, binary set of options, for example 1 and 2. In some alternative embodiments, the ranking selection is a set of qualitative options. For example, the selection may include: (a) "Element selection closely resembles the scopes of the independent claims; (b) "Element selection moderately resembles the scopes of the independent claims; and (c) "Element selection little resembles the scopes of the independent claims." In some embodiments, the single ranking score is correlated with the patent reference and stored accordingly for use in derivative functions. In alternative embodiments, a display button for selection of an accuracy ranking, in like manner as described above, is presented for each independent claim and, thus, a distinct accuracy score is associated with each independent claim of the patent reference.

Referring again to FIG. 4, the GUI 326 includes the menu bar 340 which includes a "Workspace" tab 444, an "Edit" tab 446, a "Tools" tab 448, and a "Help" tab 450. When a user selects any of such tabs, a drop-down menu is displayed that includes further operations.

Preferably, in some embodiments, the "Workspace" tab 444 enables a user to open a previously-saved workspace, open a new workspace, and save an active workspace as a new workspace or an update to an existing workspace. The "Workspace" tab 444 may also contain a list of recently used workspaces for convenience. The "Edit" tab 446 enables a user to perform various operations that modify the existing arrangement of elements. In some embodiments, the "Edit" tab 446 drop-down displays, for selection by a user, operations including any or all of: (1) rename an element; (2) delete an element; (3) redefine an element; (4) copy (or duplicate) an element; (5) cut an element; (6) paste an element; (7) merge an element into another element; (8) undo a previous operation; and (9) redo a previously undone operation. These functions will be described in further detail below.

The "Tools" tab 448, when selected, displays a drop-down menu including operations related to configurations, settings and preferences of the software program. Such operations will be described below in further detail.

As described above, from time to time, a user may desire to modify a workspace. For example, a user may determine that an element title is inaccurate, too narrow, or too broad. Further, a user may determine that an element is incorrectly positioned as a species of a specific genus. Even further, the user may have introduced unnecessary redundancies in the hierarchical organization of elements. Further yet, an element may have been created that has failed to be associated with many, or any, patent references. Finally, an element may more effectively be split into plural, distinct elements.

These tools and options for modification are preferable for many reasons. A user may simply desire to re-organize the hierarchy at some point as it becomes evident that focus or attention should be paid to different areas, or a user may discover a more efficient structure for the hierarchy or that an error has been made. These editing and modification functions are important in order to allow for adaptability of workspaces.

Figure 4B:
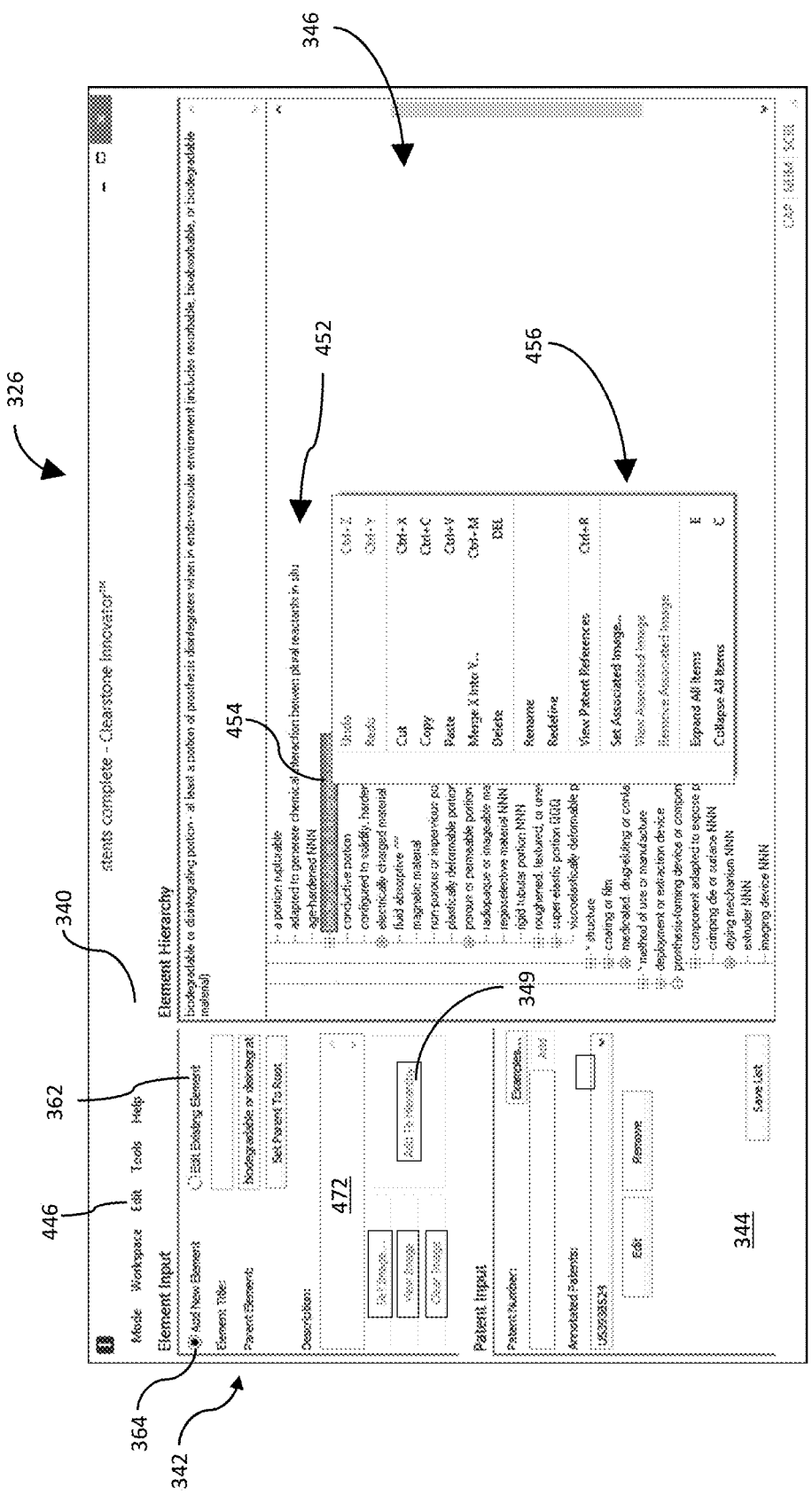
FIG. 4(b) is a view of the GUI of FIG. 4 in a third state according to the present invention.
Figure 4C:
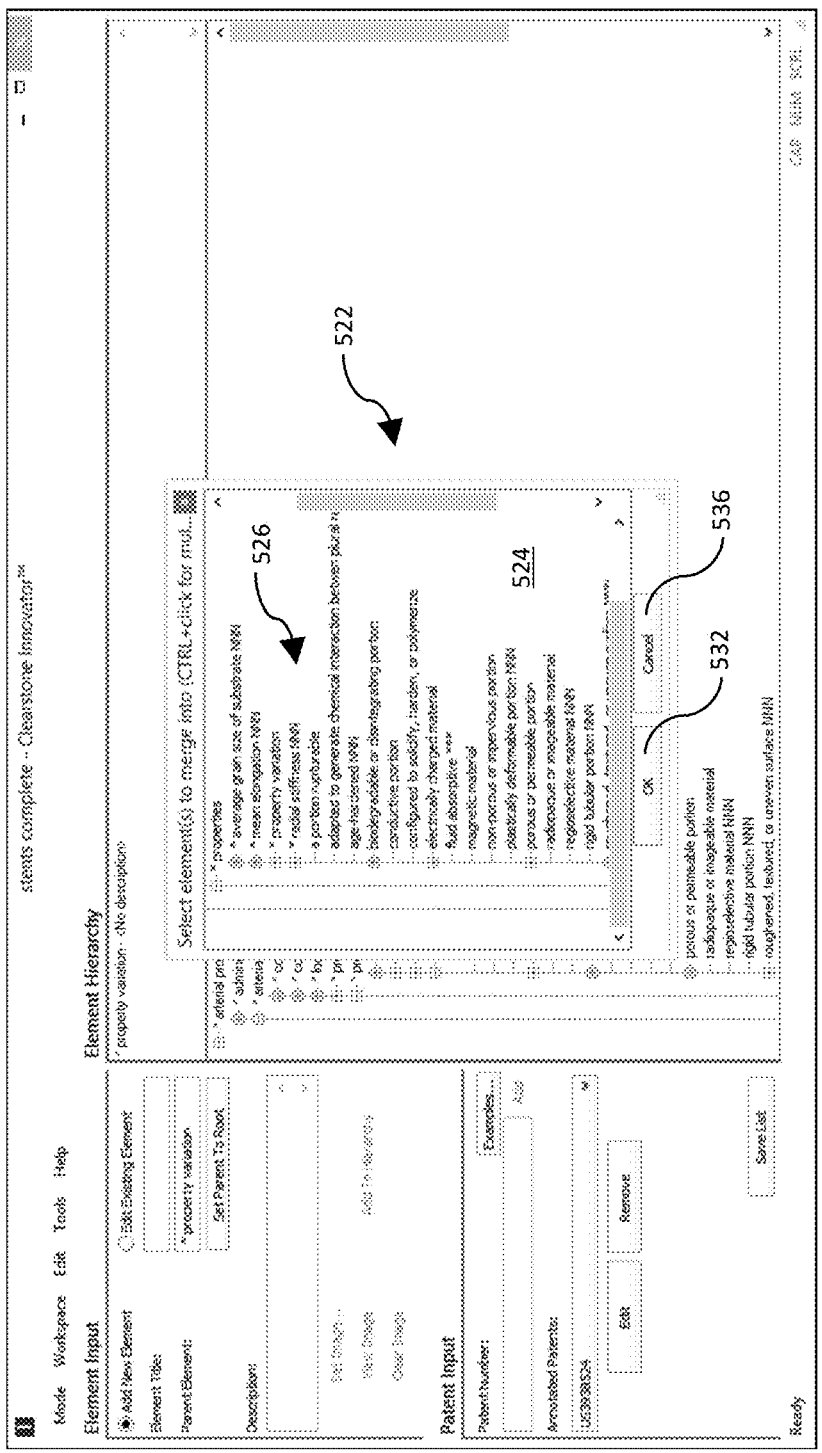
FIG. 4(c) is a view of the GUI of FIG. 4 in a fourth state according to the present invention.

FIG. 4(b) shows a state of the GUI 326 of FIG. 4 in which the user has expanded the hierarchical arrangement of element 452, selected one element (i.e. element 454), and "right-clicked" a conventional mouse to reveal the drop-down menu 456. In some embodiments, the title of an element may be modified by a user. For example, in the "Element Hierarchy" window 346 a user may select an annotation. Then, by "right-clicking" using a conventional mouse or a conventional touchpad optionally integrated into a keypad, e.g., of a laptop type computer (or alternatively by accessing the "Edit" tab 446 in the Menu bar 340), the user may select the "Rename" tab in the drop-down menu 456. Once "Rename" is selected, the user may change the title of the element, as it is displayed by the software program.

Preferably, the software program is configured such that a modification of a title of an element, in the "Element Hierarchy" window 346 automatically results in modifications of displayed element title in all instances in which it will be displayed. For example, if a user desires to edit element associations using the "Element correlation" window 402, the displayed element titles in the "Elements of selected claims" window 466 (see FIG. 12) reflects any changes to element titles made by the user in using the "Element Hierarchy" window 346. Preferably, the software program is configured such that any modification of the title of an element bears no effect on any relationships between the element and variously stored patent references or their claims.

A user may desire to change the title of an element for various reasons. First, in the course of applying elements to patent references, the user may discover that an element title is unnecessarily narrow. For example, a user may have created an element entitled "nylon." Subsequently, the user may have discovered that an element of "polyamide" is also necessary. Because it could be argued that "polyamide" is a broader term than "nylon," patent references that only require "polyamide," and not "nylon," may not properly be associated with the "nylon" element of the workspace. A simple remedy in this case is for the user to broaden the title of the "nylon" element to "nylon or polyamide."

Regarding patent references previously-associated with an element whose title had been broadened, the title broadening is proper. A justification is that elements that require a species necessarily require any logical genus of such species. For example, a patent reference that is associated with (i.e. requires) "comprising argon" must necessarily require "comprising an inert gas."

In cases where an element title is narrowed or otherwise not clearly broadened, the user may wish to review all patent references previously associated with such element. This review may be necessary to ensure that the desired element title revision is proper with regard to all previously associated patent references.

In some embodiments, the software program is configured to enable the user to revise a previously applied description or definition of an element of a workspace. To carry out this operation, referring to FIG. 4(a), in some embodiments, the user first selects an element from the "Element Hierarchy" window 346. Next, using the "Element Input" window 342, the user selects "Edit existing element" 362. Next, the user may enter text into the "Description" text box 472 to overwrite a previously-stored description, or add a description to an existing element. Once the revision to the element description is complete, the user may select the "Save Changes" button 366 to store such information.

A user may wish to modify a description for reasons similar to those for modifying an element title. As described above, descriptions are associated with elements to provide further clarification of the scope of an element, and/or provide an example of such element. Specific instances when a user may wish to modify a description include discovering that application of an element may be ambiguous. For example, a user creates an element "specific volume no less than 2." The user may subsequently realize that specific volume may vary depending on atmospheric conditions, and thus application of this element may be ambiguous. After reviewing all patent references associated with this element, the user determines it proper to add a description to this element, "measured at standard pressure and temperature." As another example, a user may determine, after an element optionally including a description is created, that the element is best understood with reference to an example. The ability to redefine the element may be necessary in these cases. As with revising an element title, revision of an element description does not affect the underlying associations between the element and previously stored patent references (by virtue of their respective patent reference identifications).

In some embodiments, the software program enables a user to delete an element from a workspace. A user may wish to delete an element, for example, if the element fails to gain traction in forming associations with patent references. Alternatively, a user may wish to delete an element from a workspace if the element is simply problematic or erroneous, and cannot be easily fixed by means of rename or redefine operations.

In some embodiments, referring again to FIG. 4(b), a user may delete an element by first selecting the element to be eliminated, e.g. element 454. Next, by using a "right-click" operation of a conventional mouse or integrated keypad, the user simply selected the "Delete" entry.

Figure 13:
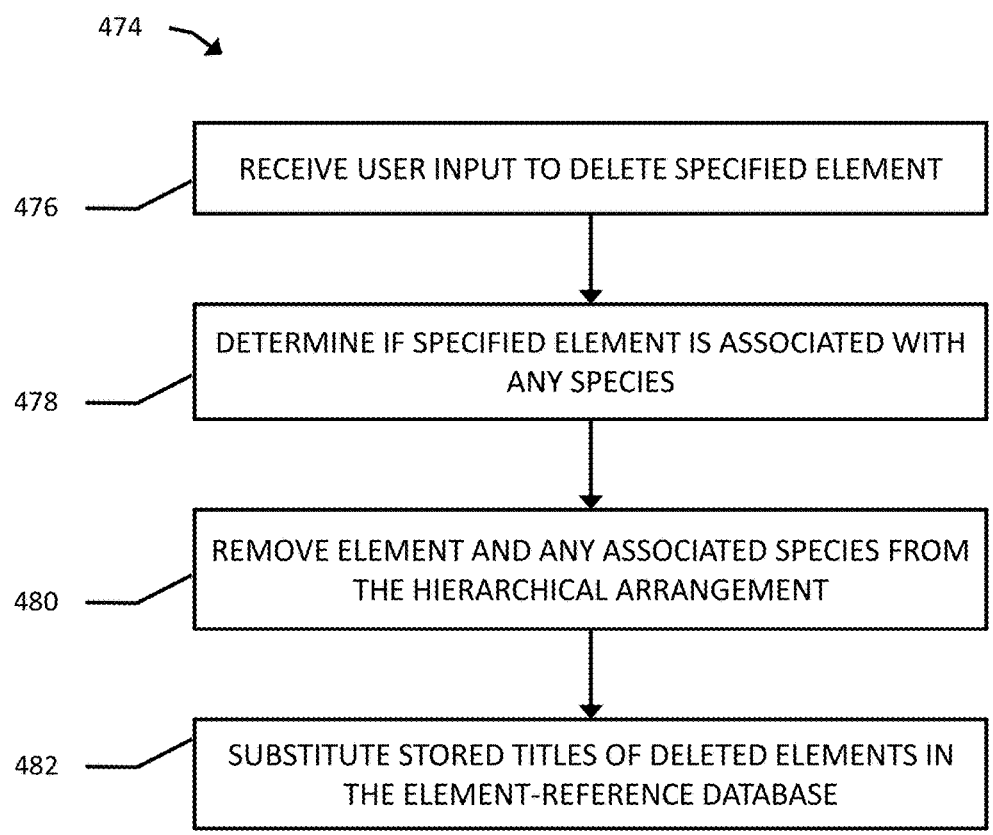
FIG. 13 is a flowchart of a software-incorporated process according to the present invention.

In some embodiments, referring to FIG. 13, the software program is configured to carry out a delete operation according to the process 474 shown in FIG. 13. First, in step 476, the program receives information to delete a specific element. Next, in step 478, the program determines if the element constitutes a genus of one or more species elements.

If the element does not constitute a genus of one or more species, then, in step 480, the element is removed from the hierarchy display 452 in the "Element Hierarchy" window 346. In addition, in step 482, the software program is configured to refer to the stored database of associations between elements and patent references. Specifically, in this database, the software program is configured to replace instances of the title of the deleted element. Preferably, in some embodiments, instances of deleted elements, e.g. element A, are displayed in a manner as to indicate that the element has been deleted. For example, if a user deletes "element A," such element subsequently appears as "[DELETED] element A." Retaining this information in the patent reference database enables a user to recall the edit history of that particular patent reference. This enables a user to more efficiently improve a workspace over time. In alternative embodiments, instances of a deleted element, in the database of associations between elements and patent references, are altogether removed as if they had never been applied. In such embodiments, however, an additional step of detecting instances where the removed element is required only in conjunction with at least one additional element is preferably carried out. Once detected, in a subsequent step, each such constraint (i.e. the relationship between the deleted element and any other element that is required only in conjunction with the deleted element), in its entirety, is removed.

Referring again to FIG. 13, in step 478, if the software program detects that the deleted element is a genus of one or more species elements, the process proceeds to step 480.

In step 480, preferably, species of elements, which the user indicated to be deleted, are also deleted, in the manner described above. Alternatively, or in addition, the detection of species elements results in the display of a warning message to the user that species of the element indicated to be deleted will also be deleted. In alternative embodiments, the detection of species elements results in a warning message informing the user that the element indicated to be deleted is related to species elements and cannot be deleted until such species elements are otherwise dealt with. In this embodiment, the user is required to either delete or relocate such species elements prior to deleting a genus element of such species elements. In yet other alternative embodiments, deleting a genus element that is related to one or more species elements results in the species elements remaining in the same relative hierarchical position, but directly related to any direct parent of the deleted genus element. In some embodiments, the software program is configured to enable the user to select multiple elements and delete such elements in a single delete operation.

In some embodiments, the software program is configured to enable a user to duplicate an element in a workspace. Specifically, referring to FIG. 4(*b*), a user may select an element, e.g. element 454, in the "Element Hierarchy" window 346. Once selected, the user may right-click a conventional mouse or integrated keypad (or select from a drop-down menu under the edit tab 446) to display a "Duplicate" (or "Copy") tab. As used herein, a duplication operation is synonymous with a copy operation. Once selected, the software program is preferably configured to carry out the process 484 shown in FIG. 14.

Figure 14:
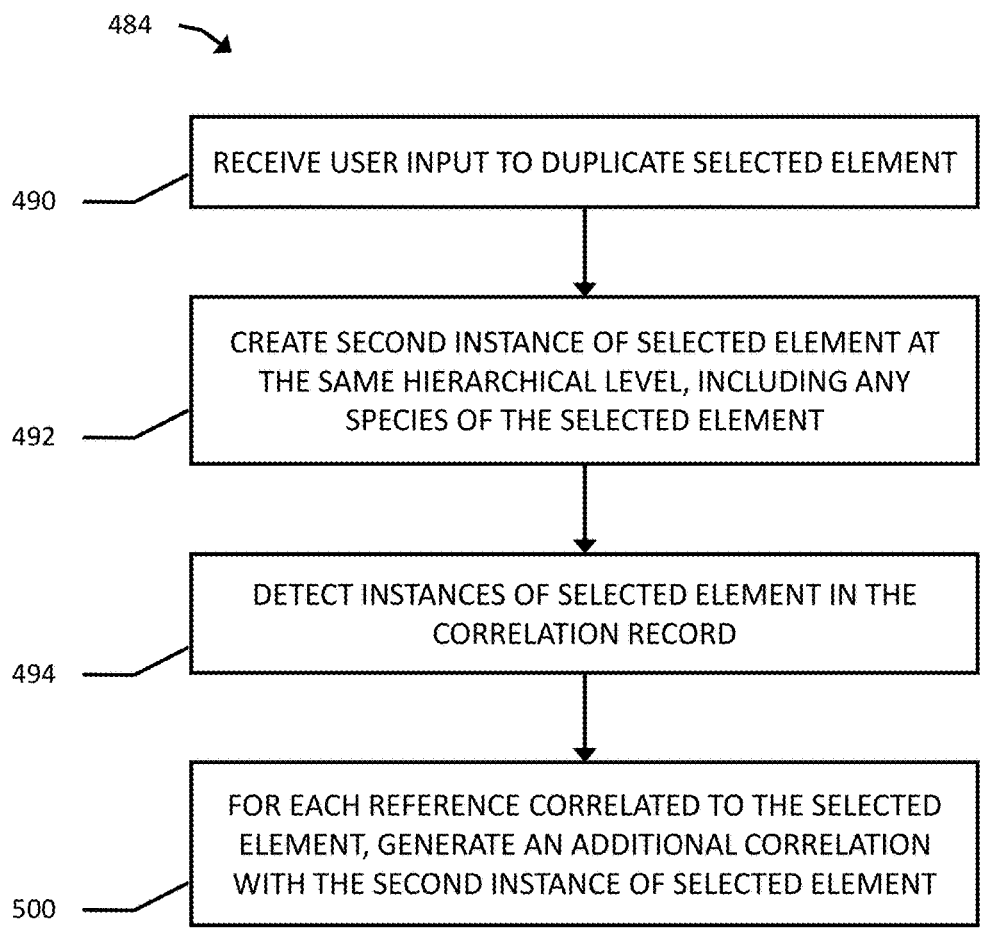
FIG. 14 is a flowchart of a software-incorporated process according to the present invention.
Figure 15:
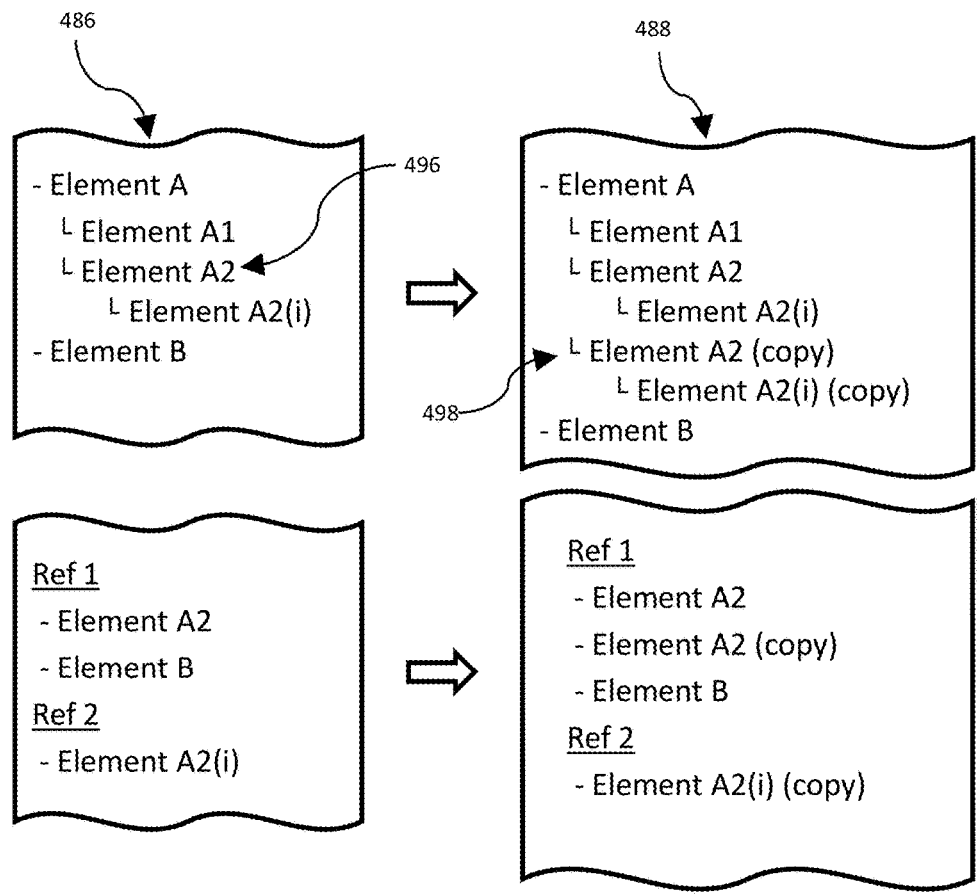
FIG. 15 is a schematic of data structures of a workspace shown in a first state before undergoing a process and a second state subsequent the process.

FIG. 14 is a flowchart showing how the software program configures the computing device 100 to carry out a duplication operation. FIG. 15 illustrates an exemplary data structure of a workspace in a first state 486 before the duplication operation 484 and a second state 488 after the duplication operation 484. In step 490, the computing device 100 receives input from a user of an element to be duplicated. In the case of the example shown in FIG. 15, the user selected element "Element A2," resulting in such element being the selected element 496. Next, in step 492, a second instance of the element selected to be duplicated is created in the same position in the hierarchical arrangement as the selected element. Although bearing a similar element title, the second element is associated with a unique element identification in the backend database records. Referring again to the example of FIG. 15, in the second state 488, a second instance of the selected element 496 is created in "Element 2(Copy)," being the second instance 498. Next, in step 494, the software program is configured to scan through the database of element and patent reference associations to detect instances of associations with the selected element. For each patent reference bearing association with the first references, a second association is generated and stored with the second element identification in step 500. In cases where the first element is associated with the patent reference only in conjunction with one or more other elements, the same logic constraint is duplicated for the second element. Referring to FIG. 15, instances "Element A2 (Copy)" and its species "Element A2(*i*) (Copy)" were created in the element hierarchy (top right image) based on the user's indication to duplicate original element "Element A2." Also, based on carrying out the duplication operation 484, Ref1 is newly associated with "Element A2 (Copy)" and Ref2 is newly associated with "Element A2(*i*) (Copy)." Ref1 and Ref2 also retain their original associations with "Element A2" and "Element A2(*i*)," respectively.

A user may desire to carry out the duplication operation, e.g., when a previously created element is subsequently determined to be split into two, distinct elements. For example, a user may have originally created an element "specific gravity between 2 and 4." Subsequently, the user may have come to believe that the workspace may be more efficient if such element is split into the individual elements "specific gravity greater than 2" and "specific gravity less than 4." For example, it may be the case that some patent references could be associated with one of the split elements, but not the original element directed to the specific gravity range. The duplication operation permits the user to carry out this revision.

Referring again to the computer-implemented method shown in FIG. 14, in step 492 the software program is configured to detect if the selected element is a genus of any species elements. If not, preferably, the duplication operation is complete. If species elements are detected, then, in step 492, each species element is duplicated and such duplicated species is oriented as a species of the second element in like manner to each original species element. For example, as shown in FIG. 15, the user selected for duplication "Element A2" 496. In this case, the software program would detect that "Element A2(*i*)" is a species element of the selected "Element A2" element 496. Thus, as shown in the second state 488 data structure schematic, new instances are generated for both "Element A2" and "Element A2(*i*)" and are located in similar hierarchical position as their corresponding original elements. In alternative embodiments, any species of the selected element are not duplicated in an operation to duplicate the genus element.

Figure 16:
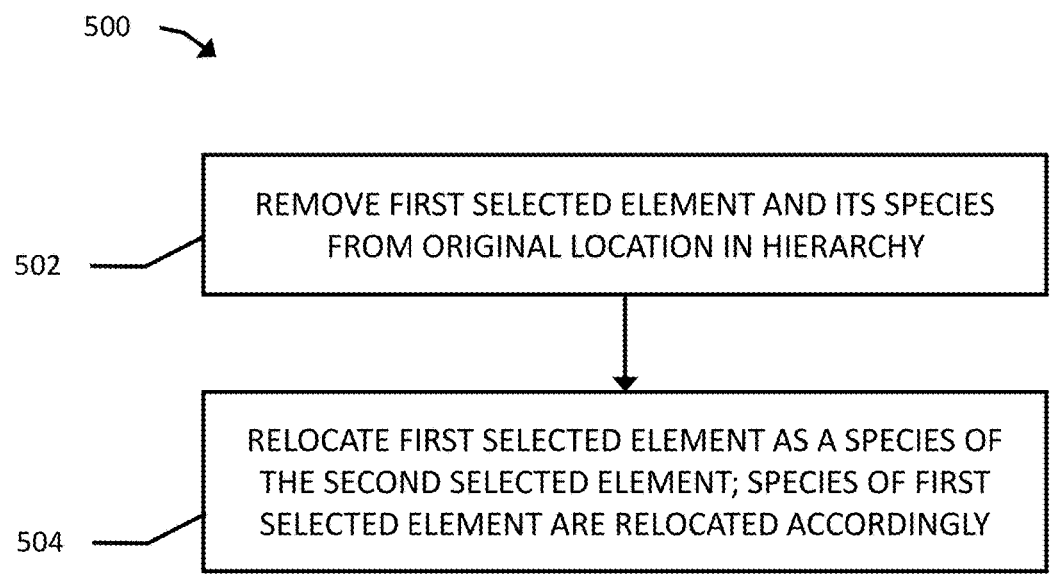
FIG. 16 is a flowchart of a software-incorporated process according to the present invention.

In some embodiments, referring to FIG. 16, the software program enables a user to change the relative position of an element in a workspace. In some embodiments, this relocation is carried out by the presence of a "cut" operation and a "paste" operation.

Preferably, in some embodiments, the software program is configured such that a user may select an element and, using a right-click operation of a conventional mouse or integrated keypad, or a drop-down menu of the "Edit" tab 446 on the menu bar 340 as shown in FIG. 4(*b*), the user may opt to "cut" the element. Based on the user's selection to "cut" an element, the software program is configured to temporarily store this information.

Following the "cut" operation, a user may "paste" the element in another location, by selecting a second element and selecting "paste" from a set of right-click options or from a drop-down menu under the "Edit" tab 446 of the menu bar 340. Referring to FIG. 16, the "paste" operation is carried out as follows. First, in step 502, the selected element is removed from its original location in the hierarchical arrangement of the workspace. Next, in step 504, the removed first element is relocated as a species of the second element. In the database of stored associations between elements of the workspace and patent references, no changes take place. Any instance of a relocated element (and element identification) is preferably unchanged. In some embodiments, preferably, the software program is configured to determine whether the first selected element is a genus of one or more species elements. If so, preferably, each species elements is relocated to remain a species of the first element. However, in some embodiments, the detection of the presence of species elements of the first selected element results in the display of a warning message indicating, to the user, that the "paste" operation cannot be carried out due to the presence of the one or more species elements. In this case, the user may be required to otherwise handle species elements prior to relocating a genus element. A user may wish to relocate an element if, for example, an element more clearly belongs in a different location.

Figure 17:
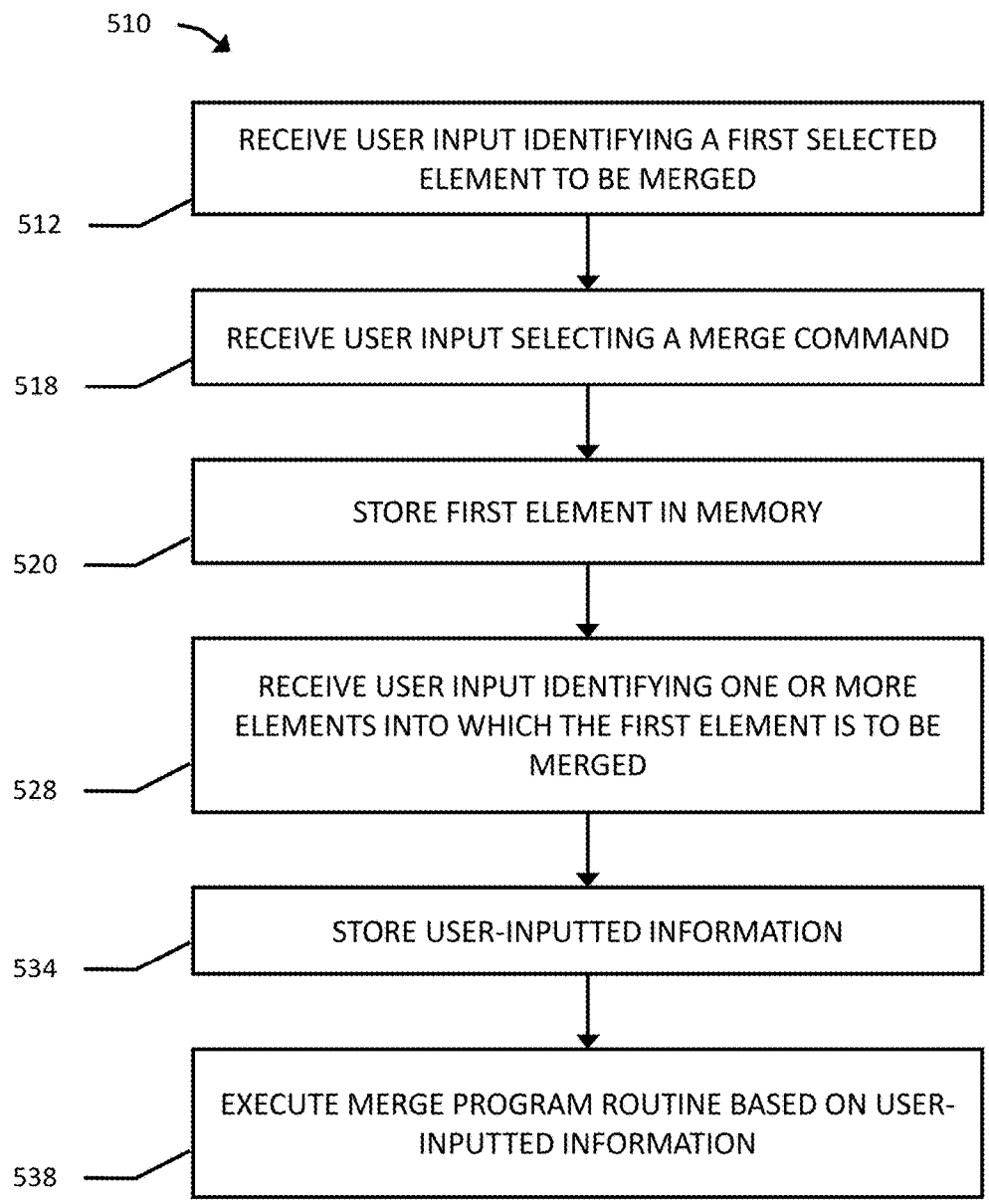
FIG. 17 is a flowchart of a software-incorporated process according to the present invention.

In some embodiments, preferably, the software program enables the user to merge a first element into a second element. Specifically, this function may be carried out in accordance with the process 510 shown in FIG. 17, but is not limited thereto.

First, in step 512, the user selects a first element, e.g. element 514, from the "Element Hierarchy" window 346 as shown in FIG. 4(*b*). Next, in step 518, the user selects the "merge into" command, as shown in FIG. 4(*b*). In step 520, the first element 514 is stored in the memory device 118. Once the "merge into" command is selected, in step 518, a pop-up window 522 is automatically displayed that prompts the user to select one or more elements into which to merge the first selected element (see FIG. 4(*c*)). The pop-up window 522 preferably includes, in a sub-window 524, a duplicate interactive display of the hierarchic arrangement of elements of the active workspace. The user is preferably enabled to scroll through, expand, and/or collapse such hierarchical workspace representation 526 in similar manner as the hierarchy arrangement display 452 of the "Element Hierarchy" 346 window of FIG. 4(*b*).

In step 528, the user selects one or more elements of the displayed hierarchy arrangement 526. Preferably, multiple elements may be selectable, e.g., by the user holding down the "CTRL" button of a conventional computer keyboard. In step 530, once the user has selected all desired second element (or elements) into which to merge the first selected element, the user may select the "OK" button 532, which results in the storage of such information in step 534. If the user desires to abort this operation, the user is enabled by the software program, by selecting the "Cancel" button 536, to close the pop-up window 522 resulting in no storage of merge information. Next, in step 538, the software program automatically carries out the "merge into" function based on the information received from the user and stored in the memory device 118, as described above.

Figure 18A:
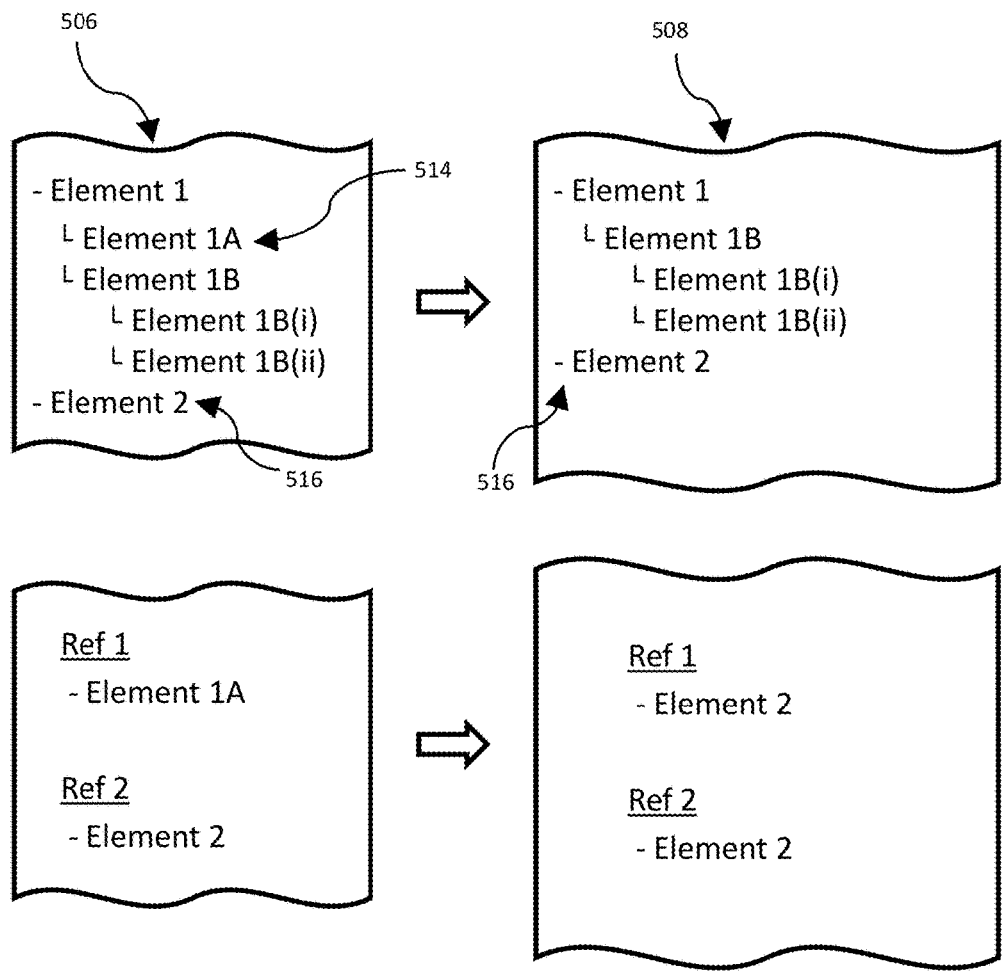
FIG. 18(a) is an exemplary schematic of data structures of a workspace shown in a first state, before undergoing a merge process, and a second state, subsequent the merge process.
Figure 18B:
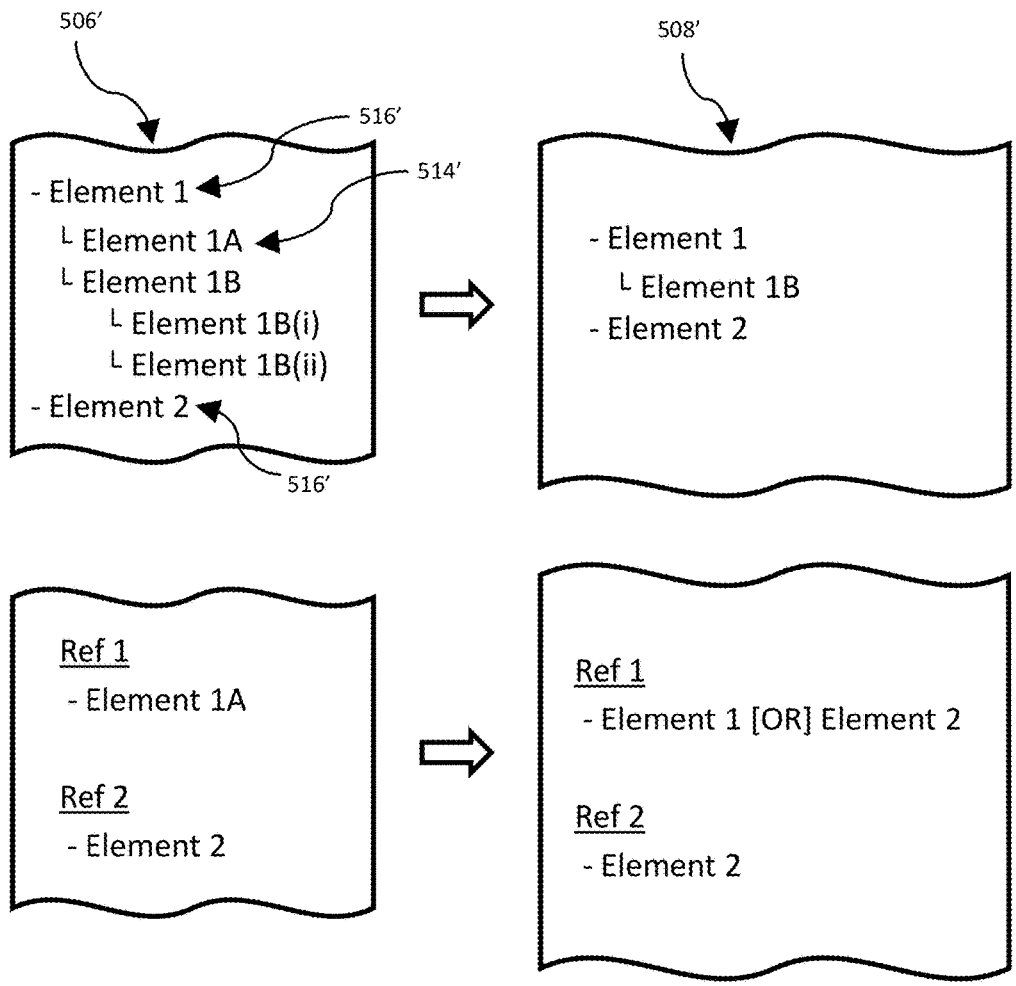
FIG. 18(b) is a second exemplary schematic of data structures of a workspace shown in a first state, before undergoing a merge process, and a second state, subsequent the merge process.
Figure 18C:
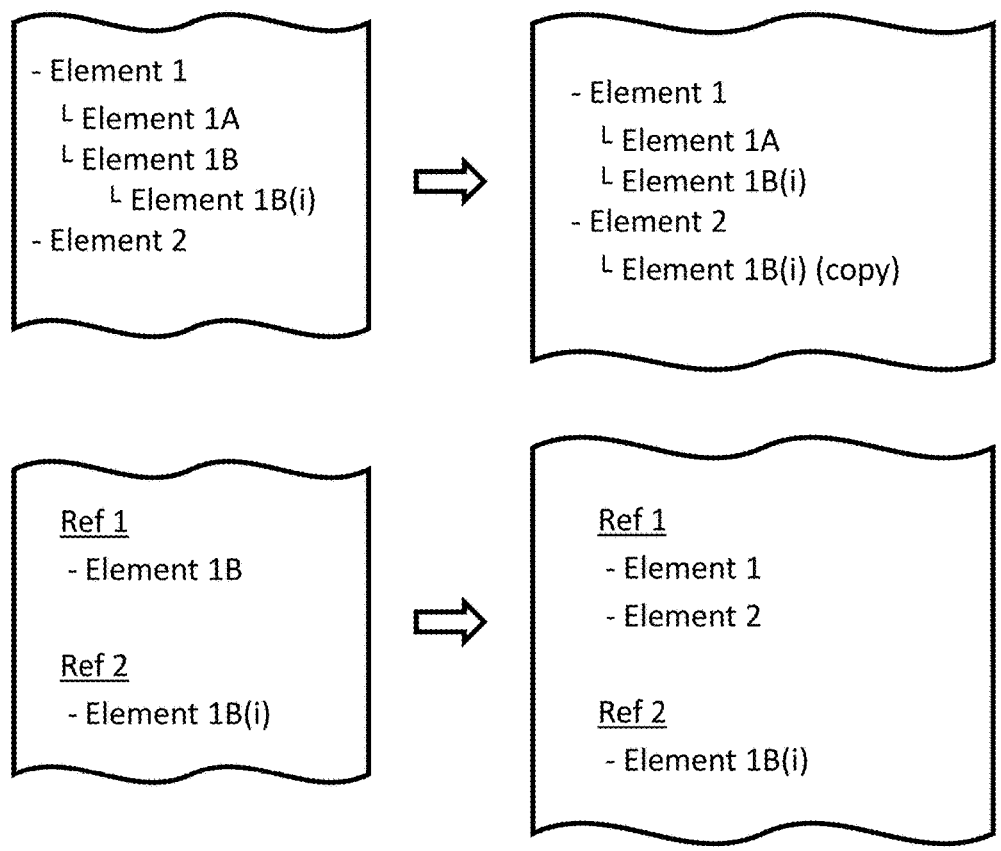
FIG. 18(c) is a third exemplary schematic of data structures of a workspace shown in a first state, before undergoing a merge process, and a second state, subsequent the merge process.

Preferably, the software program is configured to carry out the merge function, in step 538, as follows (with regard to the following three scenarios). Examples of each scenario are shown in FIGS. 18(*a*), 18(*b*), and 18(*c*), respectively.

In a first case, a user indicates merge of a single first element (with no associated species elements) into a single second element. This scenario is exemplified in FIG. 18(*a*). FIG. 18(*a*) shows a representation of information stored in a workspace in a first state 506 (prior to the merge function), and the like representation of information in a workspace in a second state 508, subsequent to the merge function. In this example, the user had selected "Element 1A" as a first element 514. Also, according to this example, the user had selected "Element 2" as the second element 516. Based on this information, the software program preferably removes the first element from its location in the hierarchy arrangement of the workspace. This is illustrated in the example shown in FIG. 18(*a*) by the absence of "Element 1A" from the hierarchical arrangement in the second state 508. Next, in the database of associations between elements and patent references, instances of the first element and the first element identification are respectively replaced with the second element and the second element identification. This is illustrated in FIG. 18(*a*) by the replacement of "Element1A" with "Element 2" in the second state 308.

In a second case, a user indicates merge of a single first element (with no associated species) into multiple second elements. This scenario is exemplified in FIG. 18(*b*). FIG. 18(*b*) shows a representation of information stored in a workspace in a first state 506' (prior to the merge function), and the like representation of information in a workspace in a second state 508', subsequent to the merge function. In this example, the user had selected "Element 1A" as a first element 514'. Also, according to this example, the user had selected both "Element 1" and "Element 2" as second elements 516'. In this case, based on this user input information, the first element is duplicated (in the manner described above with regard to the duplication operation) n−1 times, where n equals the number of second elements. Next, in the database of associations between elements and patent references, instances of the first element are replaced with the first second element. Instances of the duplication of the first element are replaced with the second element, and so on until each second element selected by the user had been replaced with the first element or a duplicate thereof. This is illustrated in the example shown in FIG. 18(*b*) by the absence of "Element 1A" from the hierarchical arrangement in the second state 508. Also, as a result, patent references originally having associations with the first element now have like associations with each of the second elements. This is illustrated in FIG. 18(*b*) by the replacement of "Element1A" with both "Element 1" and "Element 2" in the second state 308 for Reference 1. This indicates that, for a reference entity embodying either "Element 1" or "Element 2," Reference 1 may be eliminated by a user selecting those elements in the search GUI.

In a third case, a user indicates merge of a single first element, being a genus of one or more species elements, into one or more second elements. FIG. 18(*c*) exemplifies this scenario when a user wishes to merge the first element into multiple second elements, although this process could similarly be applied to a single second (destination) element. FIG. 18(*c*) shows a representation of information stored in a workspace in a first state 506" (prior to the merge function), and the like representation of information in a workspace in a second state 508", subsequent to the merge function. In this example, the user had selected "Element 1A" as a first element 514". Also, according to this example, the user had selected both "Element 1" and "Element 2" as second elements 516". In this case, based on this user input, the first element and all related species are each duplicated (in the manner described above with regard to the duplication operation) n−1 times, where n equals the number of second elements Next, the species are "cut" and "pasted" as species of each second element. This is depicted in the example in FIG. 18(*c*) in that "Element 1B(*i*)," in the second state 508", has been duplicated to be positioned both as a species of "Element 1" and "Element 2." Then, the first selected element and duplications thereof are merged into respective second elements. As a result, patent references originally having associations with the first element now have like associations with each of the second elements. This is depicted in the example shown in FIG. 18(*c*) in that Reference 1 is associated with "Element 1B" in the first state 506" and associated with "Element 1" and "Element 2" in the second state 508".

In some embodiments, other manners of handling species of merged elements are selectable. For example, in some embodiments, the user may select whether to: (a) retain species of merged elements as described above; (b) to delete the species of a merged element; or (c) to separately merge each species into the merged first element prior to the merge of the first element into the second element. In some embodiments, only one, or less than all, of processes (a), (b), and (c) are enabled by the software program. Preferably, in such embodiments, at least process (a) is so enabled. In embodiments in which process (b) is enabled, preferable a warning message is appropriately displayed warning the user that elements are to be deleted, resulting in the loss of operability of some stored information. Also, preferably, the software program is configured to not permit a user to merge a genus element into a species element thereof. Preferably, a user's attempt to do this will result in an error message indicating that such operation is not permissible.

A user may desire to perform a merge operation, for example, to remove a redundancy in the hierarchical arrangement of elements of a workspace. A user may specifically desire to merge an element into plural elements, for example, to retain associations of merged elements with a direct genus of the merged element. For example, a hierarchical arrangement includes a first element "specific gravity no less than 5," and a second element of the same name, but located as a species of a third element that is a genus element of second element and titled "comprising a period 5 element." In this case, a user may desire to combine these similarly-named elements as a single element. However, there is a possibility that patent references associated with the second element may have been so associated in part for their requirement of comprising a period 5 element. Thus, if the user merges the second element into the first element, the implied association of such patent references with "comprising period 5 elements" would be lost. Thus, in this case, the user may desire to merge the second element into both the first element and the third element ("comprising a period 5 element").

While specific implementations of merge functions have been described herein with regard to particular method steps, the present invention contemplates that other steps may be utilized to achieve the same or similar results with respect to merging elements into other elements in the hierarchical structure described herein, all of which are within the scope of the invention. For example, in some implementations, it may not be necessary to create a certain number of copies of a first element before merging it into one or more second elements. An equivalent function can be achieved, for example, by iterative or serial methods instead.

In some embodiments, preferably the software enables the user (by way of selectable commands e.g. in the "edit" tab 446 of the menu bar 340) to undo previously carried out edit operations, e.g. those described above (including rename, redefine, duplicate, cut, past, and merge into). Further, preferably, the software program enables the user to "redo" a previously "undone" operation.

The foregoing description exemplifies various manners in which a user may generate a workspace. Preferably, a workspace comprises a data structure of elements, patent reference identifications, and correlation records. Correlation records may include information regarding the manner in which such elements relate to such patent reference identifications. Embodiments of the invention include correlation records that correlate specific patent claims to elements in the hierarchy. Different patent claims of the same patent may therefore be correlated to different elements. Further, different claims of the same patent may include one or more of the same elements and one or more different elements. The ability to correlate specific claims with a plurality of elements in a hierarchy yields unexpected and highly efficient results when performing a subsequent analysis in accordance with the search method described herein. Further, as described above, the software program enables the graphical display of the workspace as both a graphical display of hierarchically arranged elements and an interactive log of patent reference identifications.

Also, as described above, once a workspace is generated by a user and stored, various derivative operations or modules are preferably enabled by the software that utilize a generated workspace. Such derivative operations also accomplish a practical task related to intellectual property management. In some embodiments, the software program includes modules, and is thus able to permit users to carry out tasks related to any combination of: (a) freedom to operate or patent clearance analysis; (b) patent portfolio monitoring; (c) patent invalidity and/or patentability; and (d) patent marking. These derivative operations will be described in further detail below.

In some embodiments, a user may access a freedom to operate analysis module. In general, the freedom to operate analysis module operates by enabling a user to aggregate an initial pool of patent references and, subsequently, use information in a workspace to filter patent references deemed to not be relevant from the initial pool of patent references, and output a resulting set of patents.

Figure 19:
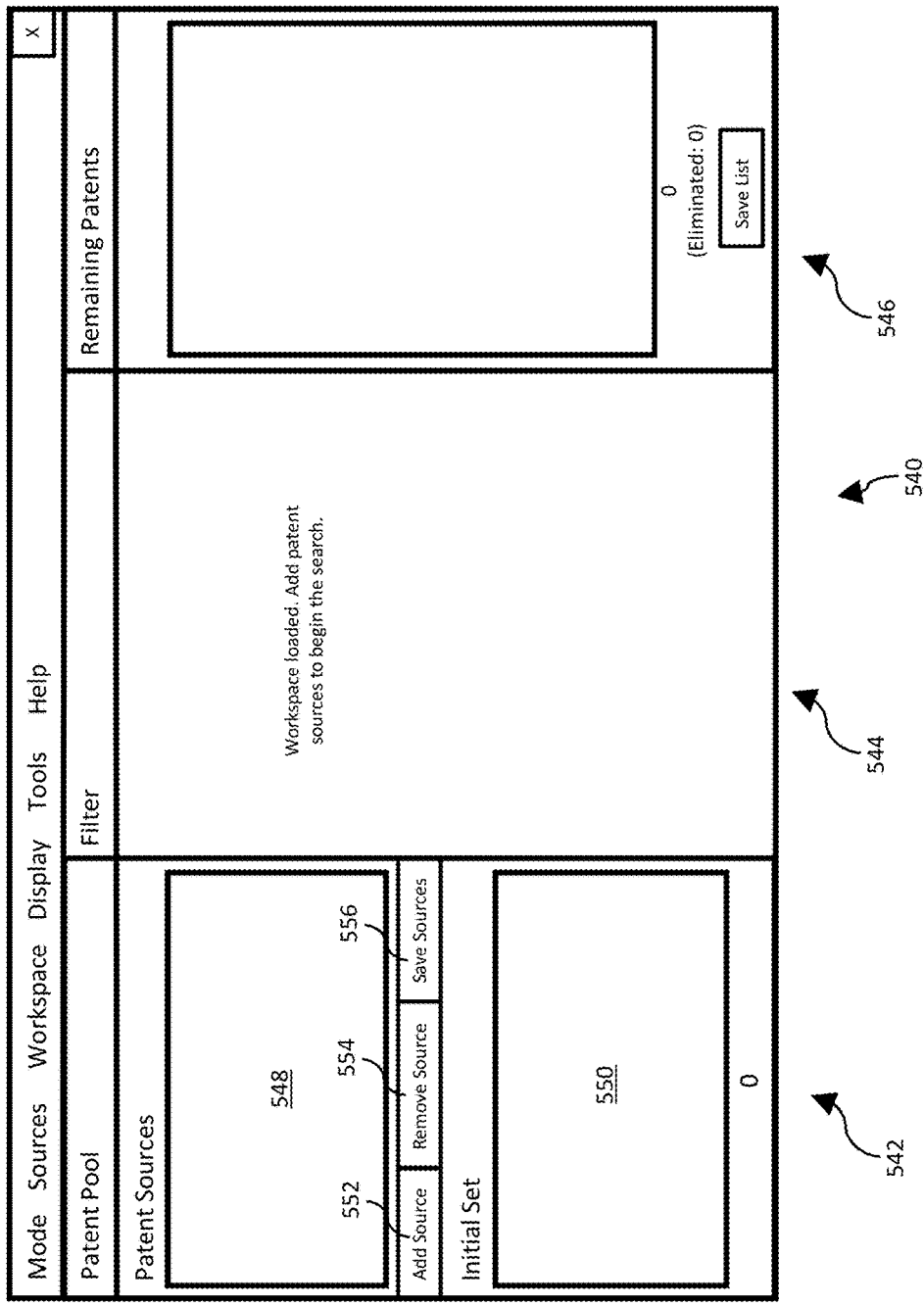
FIG. 19 is a view of a GUI in a first state according to the present invention.

Specifically, referring to FIG. 4, the user may switch from the "Build Workspace" module 310 to a "Freedom-to-operate" module 312 (or vice versa) by selecting the "Freedom-to-operate analysis" tab as may be listed in a drop-down list of the menu bar 340 of the GUI 326, as shown in FIG. 4. Once such tab is selected by a user, a third GUI 540 is displayed as shown in FIG. 19.

GUI 540 includes a first pane 542 entitled "Patent pool," a second pane 544 entitled "Filter," and a third pane 546 entitled "Remaining patents." By using this GUI 540, a user may generate an initial pool of patent references. From the initial pool of patent references, the user may use information from a previously-generated workspace to filter, from the initial pool, patent references not believed to be relevant to a search reference entity (e.g. a product or process for which freedom-to-operate analysis is being carried out).

Figure 21:
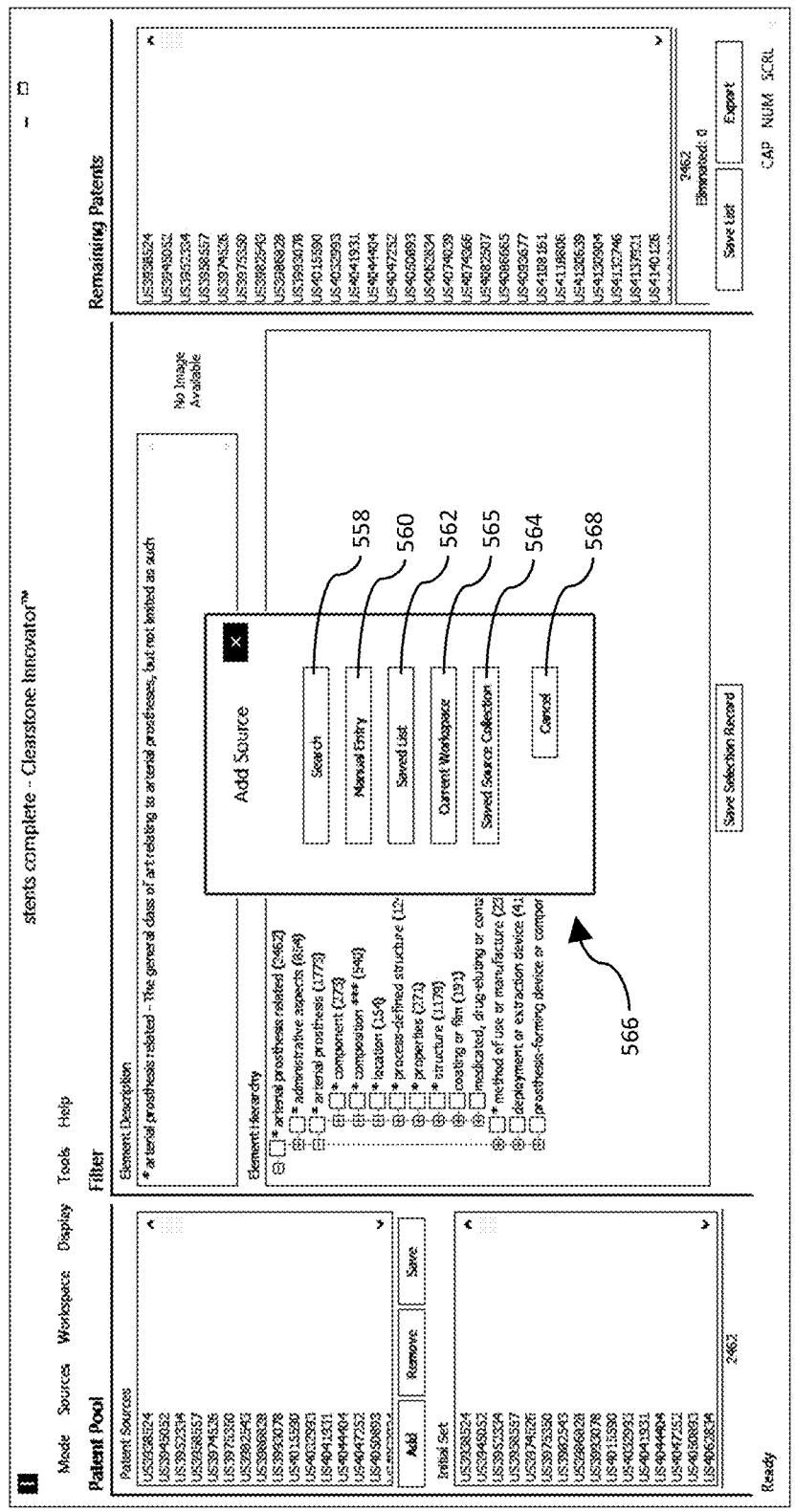
FIG. 21 is a view of the GUI of FIG. 19 in another state of operation.

Referring again to FIG. 19, the first pane 542 is directed to enabling the user to generate an initial pool of patent references. As shown, the first pane 542 includes a "Patent sources" window 548 and an "Initial Set" window 550. Using the "Patent sources" window 548, a user may aggregate various collections of patent references, and in different manners, to generate an initial pool of patent references for consideration. For example, when the user selects the "Add Source" button 552, the software program enables a user to include patent references in any, several, or all of a variety of manners represented by displayed text buttons. For example, as shown in FIG. 21, a pop-up "Add source" window 566 is caused to be displayed. The displayed set of options may correspond to one or more of: (a) access to a public or private patent reference database of a specified jurisdiction (e.g. the U.S. Patent and Trademark Office, the Japanese Patent Office, and/or the European Patent Office), e.g. the "Search U.S. Patents" button 558; (b) manual entry of patent reference identifications, using the button 560; (c) access to a saved list of patent references using button 562; (d) access to a saved list of patent reference collections that may have been aggregated by a user in a prior project, e.g. button 564; and (e) a list of all patent reference identifications that have been annotated and stored in the workspace that is presently active, e.g., button 565.

Figure 22:
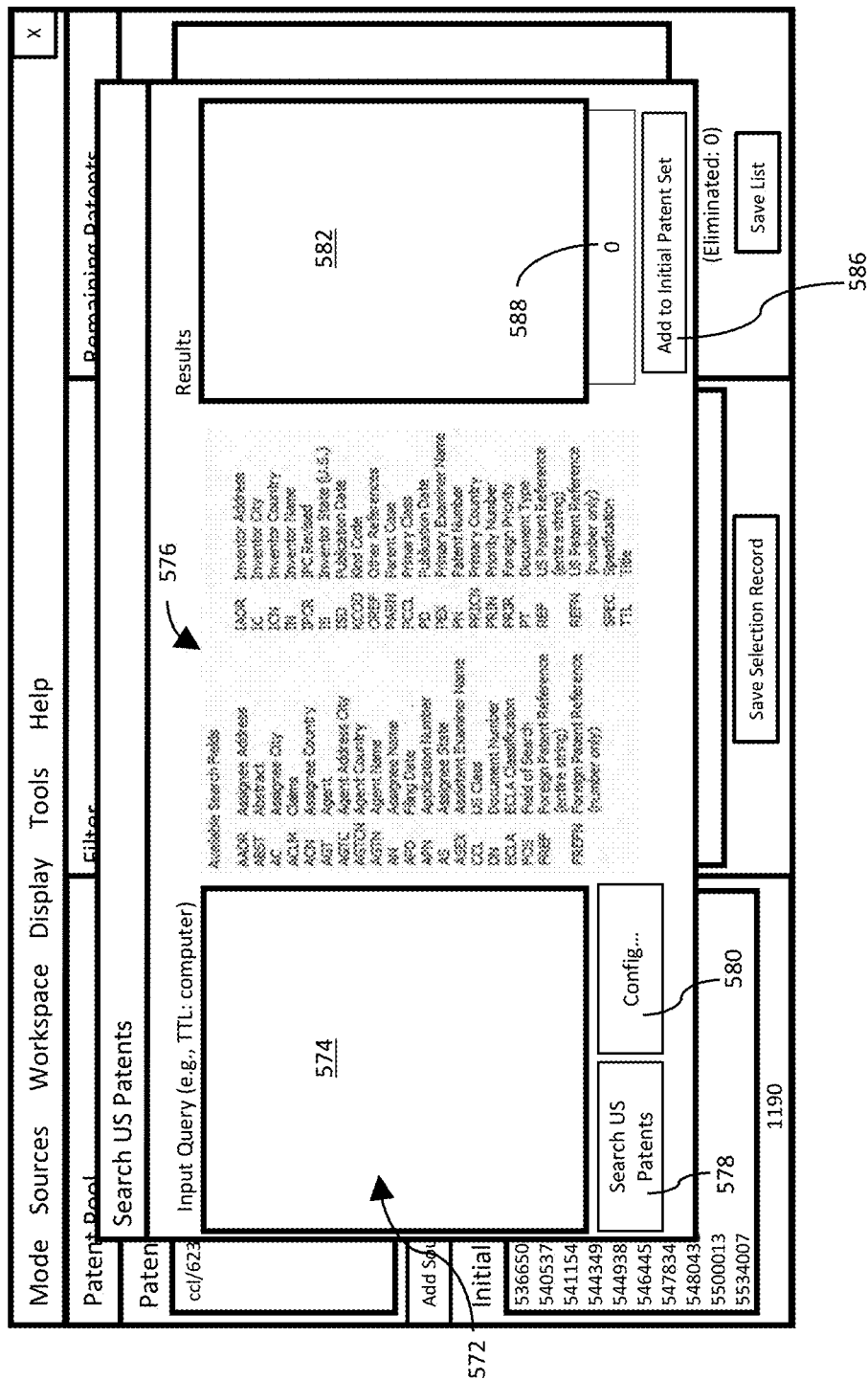
FIG. 22 is a view of the GUI of FIG. 19 in another state of operation.

In some embodiments, referring to FIG. 21, when a user selected the "access public patent database" or "Search US Patents" button 558, a pop-up window, e.g. the "Search U.S. Patents" sub-window 570, is caused to open (see FIG. 22). The pop-up window 570 preferably includes a first "Input Query" sub-window 572 for enabling a user to submit a search query with regard to searching a public database (e.g. the United States Patent and Trademark Office patent and published application public database). The "Input Query" sub-window 572 includes a text box 574 for enabling a user to enter a search query. Preferably, the software program is configured, in this case, to process queries directed to text searching all, or specified common fields, of patent references of the public database. Additionally, preferably, the software program is configured, in this case, to enable a user to use conventional Boolean operators, such as "and," "andnot," and "or" to further assist a user in obtaining tailored search results. In some embodiments, as shown, an "Available Search Fields" sub-window 576 displays to the user a listing of valid field codes, and their corresponding fields, to further assist the user in obtaining tailored search results.

Once a user enters into the text box 574 a desired query string, the user may select the "Search U.S. Patents" (or in other examples, another public patent database) button 578. At such time, the software program is configured to enable processing of the user's submitted query string in relation to patent references of the indicated public database.

Once the query string is processed in relation to the desired public patent reference database, matching patent references (by display of associated identifications) are displayed in the "Results" sub-window 582. The number of results is displayed by the reference count 588. Once such final results are displayed, the user may select the "Add to initial patent set" button 586. If selected, the resulting patent references will be added to the user's initial set, and displayed in the "Initial Set" window 550 of the GUI 540 (see FIG. 19) in addition to any search queries or other collections of patent references that the user may have previously added. Preferably, the software is configured to automatically detect and eliminate any duplicate patent reference entries, which may have resulted from the user's aggregation of different search collections.

Figure 23:
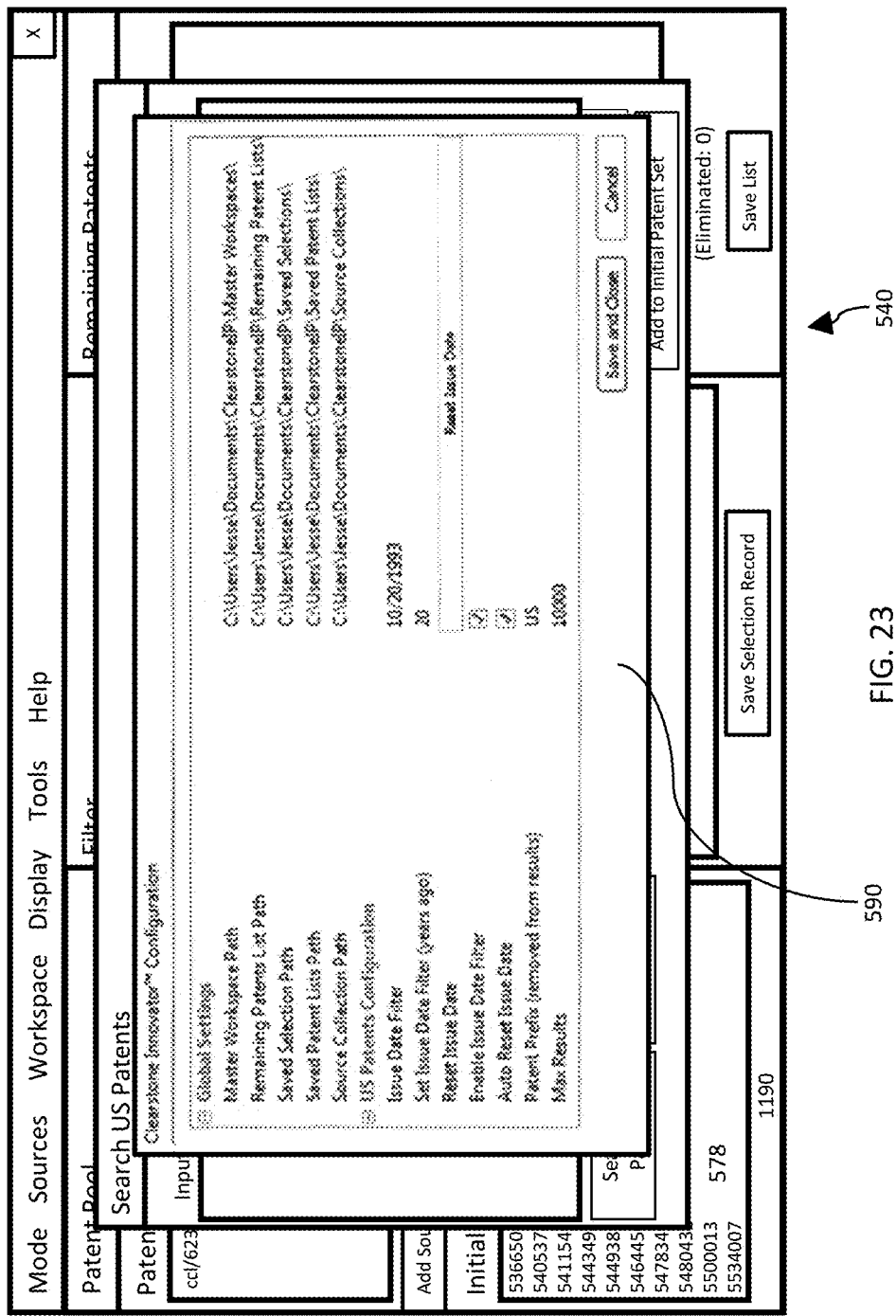
FIG. 23 is a view of the GUI of FIG. 19 in another state of operation.

In some embodiments, referring again to FIG. 22, the user may select the "Configuration" button 580, which results in display of the pop-up window 590 as shown in FIG. 23, and which enables the user to globally set properties of the database searching operation. For example, the user may limit, for all subsequent searches, resulting patent references to those having issue dates on or after a specified date. Alternatively, or in addition, this interface may enable the user to limit patent references by limiting the number of past years under consideration. Alternatively, or in addition, the user may limit the number of resulting patents of a query to a specified amount.

Figure 24:
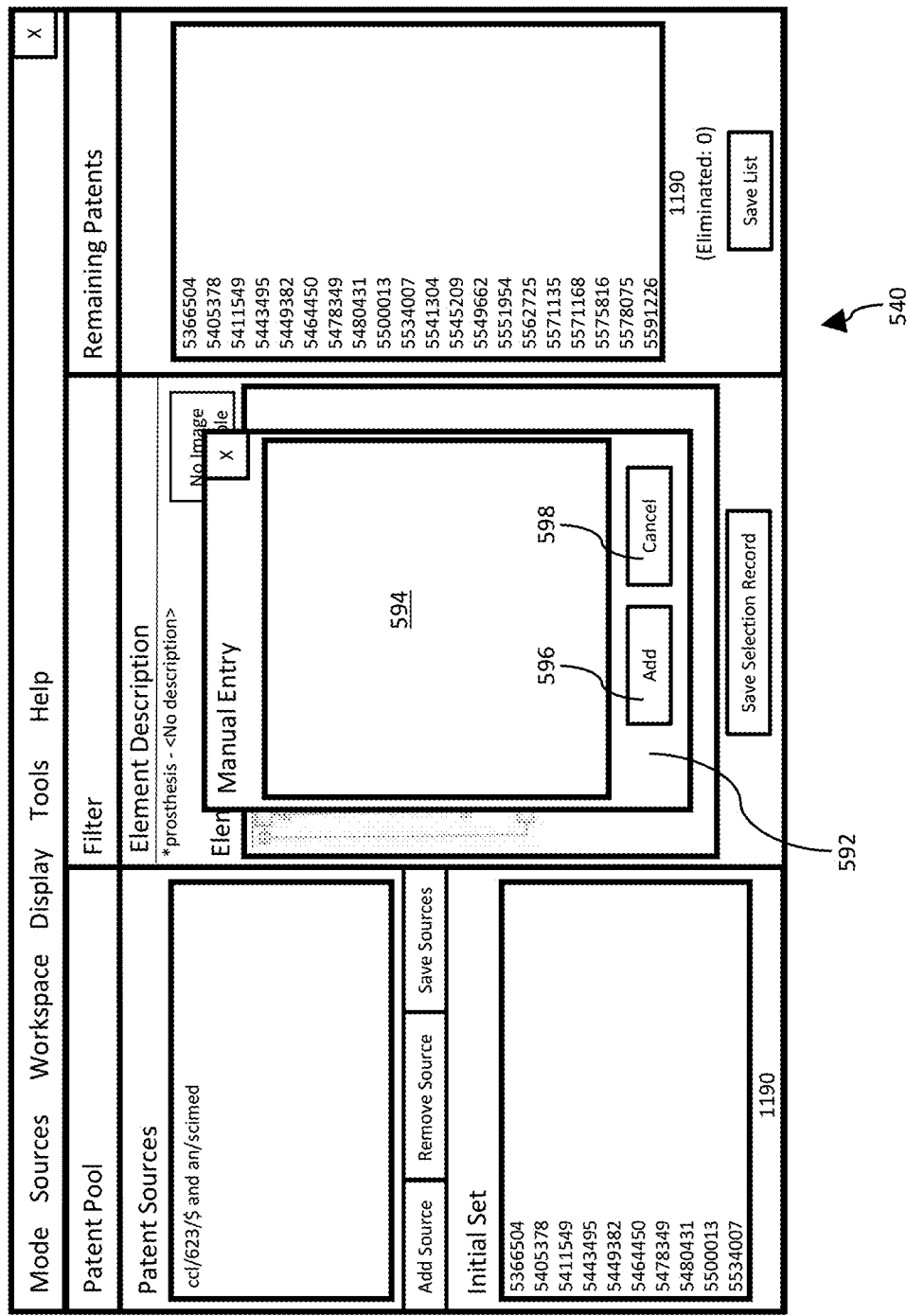
FIG. 24 is a view of the GUI of FIG. 19 in another state of operation.

Referring again to FIG. 21, in addition to querying a public patent reference database (e.g. the U.S. Patent and Trademark Office database of patent references and published applications), the user may manually add patent references for inclusion in the initial set. By selecting the "Manual Patent Entry" button 560 as displayed on the pop-up window 566, a "Manual Entry" window 592 automatically pops up (see FIG. 24). The "Manual Entry" window 592 includes a text box 594 configured to enable a user to type in patent reference identifications using a conventional keyboard. Preferably, the software program, in this case, permits the user to type in multiple patent reference identifications, e.g. by using the "ENTER" button on a conventional keyboard. Alternatively, or in addition, the software program enables one or more patent reference identifications to be "cut" and "pasted" from another location into the text box 594. Once the user has completed manual entry of patent reference identifications, the user may select the "Add" button 596 to add such references to the initial set. As described above with reference to the querying option, the software program is configured to automatically detect and remove any duplicate entry of a patent reference identification. Alternatively, the user may select the "Cancel" button 598, whereupon no such manual entry information will be stored and added to the initial patent set.

Third, the software program is configured to permit the user to load patent references from a saved data file, and add such references to the initial patent set. Once the user selects the "Open saved list of patents" button 562, the software program prompts the user to select, from stored medium an existing data file. Once selected, such references are added to the initial set. And again, like above, duplicate patent reference identifications, if any, are eliminated.

Fourth, a user may alternatively or additionally select "Current Workspace" 565 in order to add to the initial set a list of all patent reference identifications that have been annotated and stored in the workspace that is presently active. If this option is selected, the software program may query or otherwise extract from the open workspace all references that have been previously annotated and correlated to elements, and add them to the initial set. Adding patent identifications using this option will therefore yield the maximum number of patent reference identifications that can be eliminated in a given workspace.

Finally, by selecting the "Open source collection" button 564, the user may add to the initial set a previously stored initial set source collection. A source collection, as used herein, refers to information including all sources used to generate an initial pool of patent references (e.g. all search queries, data files, etc.) and the actual resulting patent references. The sources used and patent references that may result from the sources depends on the state of the sources.

For example, if a source collection includes a stored database query, the results of the query may change depending on the time at which the query is run. Thus, preferably the software program is enabled to resolve this variable. In some embodiments, loading a prior source collection results only in loading of the same actually retrieved patent references. Preferably, however, the software program is configured to update the source collection to reflect the current state of stored information accessible to the user. For example, preferably any queries that refer to public accessible patent reference databases are re-run at the latter instance. Also, if the source collection includes any patent references loaded from a data file, the loaded patent references are to reflect the current state of such data file. Even more preferably, however, the software program enables the user to select the manner in which prior source collection information is to be added to a current initial patent pool. Thus, selection of the "Open source collection" button 564 from the GUI 540 results in the display of a "Generate source collection dynamically?" window (not shown) or the like, wherein the user may ultimately select the manner of incorporating information regarding a previously saved source collection.

Referring again to FIG. 20, as the user incorporates various sources in generating an initial pool of patent references, the "Patent Sources" window 548 displays each included source, preferably automatically updating to reflect additions of sources or the removal of sources, e.g. source list 600. Also, the "Initial Set" window 550 displays the accumulated patent reference identifications. Preferably, the list of patent references as displayed in the "Initial Set" window 550 also automatically updates as the user makes changes to the sources. Also, preferably, the total number of patent references of the initial set is displayed for the user's reference at location 602. In some embodiments, patent reference identifications may instead be represented by a numeric indicator or count that corresponds with the number of patent reference identifications existing in respective categories (e.g., categories representing an initial set of patent references, the number of patent reference identifications that have been eliminated by virtue of a user selecting elements in the element hierarchy, and/or the number of patent reference identifications remaining from the initial set after elimination of patent reference identifications). These numerical indicators may be displayed in other locations, such as in a separate pane or region.

At any time, the user may select one or all reference identifications of the "Initial Set" window 550 and copy such reference identifications to be pasted in another application, e.g. a known spreadsheet application such as Microsoft® Excel. Similarly, at any time, a user may copy one or more sources from the displayed list of patent sources in the "Patent Sources" window 548. In some embodiments, the software program provides the option for a user to download or export a spreadsheet or list document containing a chosen list of patent references. Such spreadsheet or document may additionally contain bibliographic, status, or legal data corresponding to each of the listed patent references.

Either subsequent to entry of one or more patent sources (using the "Patent Pool" pane 542, or before entry of any patent sources, a user may load a workspace in the "Filter" pane 544. To load a workspace, the user may select the "Workspace" tab on the menu bar 616 (see FIG. 20). From a drop down menu, the user may select "Open workspace," whereupon the user may select a previously-generated workspace from a specified file location.

Figure 25:
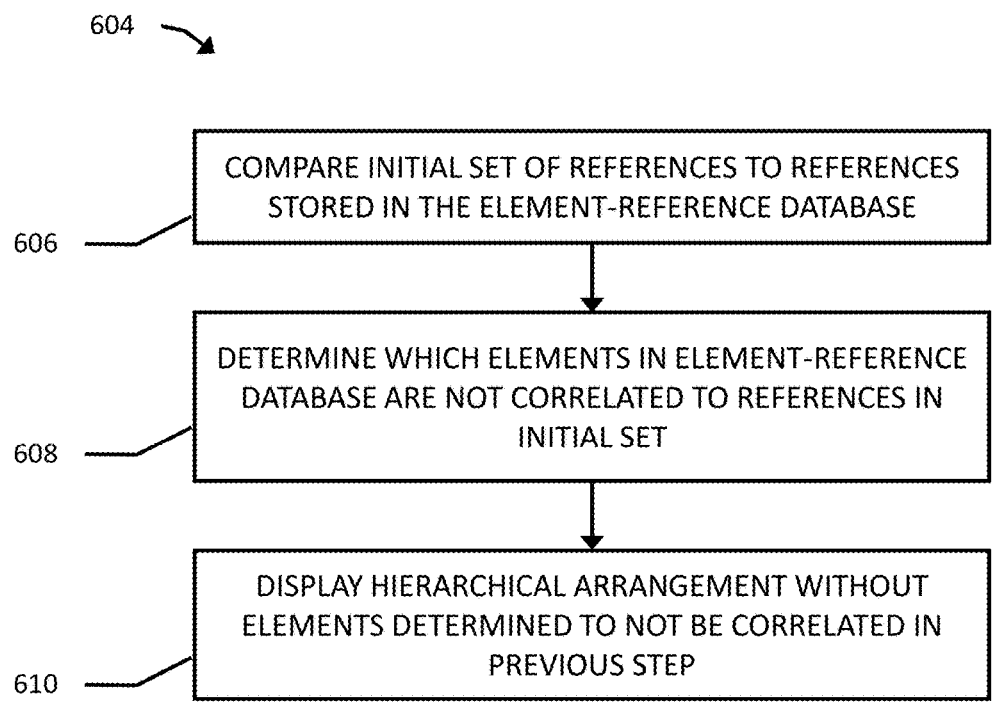
FIG. 25 is a flowchart of a software-incorporated process according to the present invention.
Figure 26:
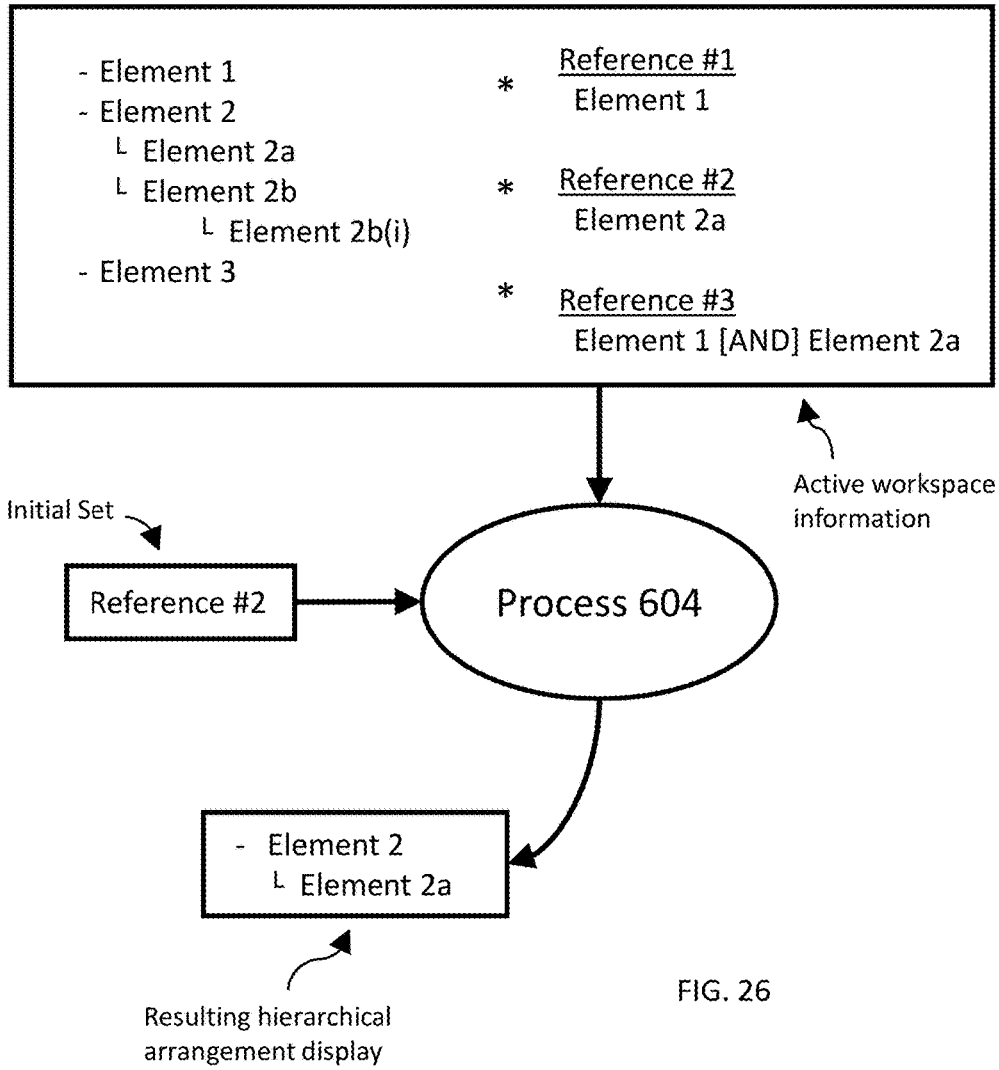
FIG. 26 is a schematic of an example using the process of FIG. 25.

Based on loading a workspace, the software program is preferably configured to automatically carry out a customization process 604 as shown in FIG. 25. As shown, the software program first compares the stored references of the workspace with the current set of references of the initial set in step 606. Next, the software program determines which of the elements of the workspace do not relate to such references of the initial set in step 608. Finally, the program causes display of the stored hierarchical arrangement of elements of the workspace excluding those elements which do not relate to any patent reference of the initial set in step 610. This process is exemplified in the schematic shown in FIG. 26. This process provides a more concise display of elements to the user by eliminating those elements that could not logically be relevant to the user's search reference entity based on the user's choice of initial set of patent references. Preferably the software is configured to automatically carry out the customization process 604 of FIG. 25 at each instance that the initial set of patents changes, whether by removal or addition, given that a workspace has been loaded by a user and is active. In the case that a workspace is loaded, but no patent references have been added to the Initial Set, the "Filter" pane 544 displays an alert, e.g., "Workspace loaded but no initial set generated." This indicates to the user that no elements are displayed because no patent references have been added to an initial set of patent references.

The user may optionally disable the customization process 604. For example, in some embodiments, the user may uncheck, from the "Display" tab on the menu bar 616, a "Show only relevant elements" option. As a result of unchecking this option, the entire hierarchical arrangement of the active workspace is available for the user to view, regardless of whether all elements have been associated with patents in the initial set.

Referring again to FIG. 20, the "Filter" pane 544 includes a first "Element Description" sub-window 614 and an "Element Hierarchy" sub-window 612. The "Element Hierarchy" sub-window 612, as described above, includes a display of the hierarchical arrangement of elements of an active workspace. The "Element Description" sub-window 614 displays a definition of a selected element, e.g. selected element 618, of the hierarchical arrangement of elements 620 of the "Element Hierarchy" sub-window 612. In some embodiments, preferably, the "Element Description" sub-window 614 further includes a location 622 for displaying an image associated with a selected element, if an image had so been stored in association with the selected element when generated. As in the "Workspace generating" module, the hierarchical display 620 in the "Element Hierarchy" window 612 is user-interactive. Specifically, a user may expand and collapse genera elements to reveal elements related to each genus element as a species.

The purpose of the "Filter" pane 544 is to provide a means for the user to eliminate, from the aggregated initial set of patent references, patent references that are deemed not be relevant to a reference entity. This manner of filtering patent references is possible based on the manner of associating patent references with elements in generating a workspace, as described above.

Figure 27:
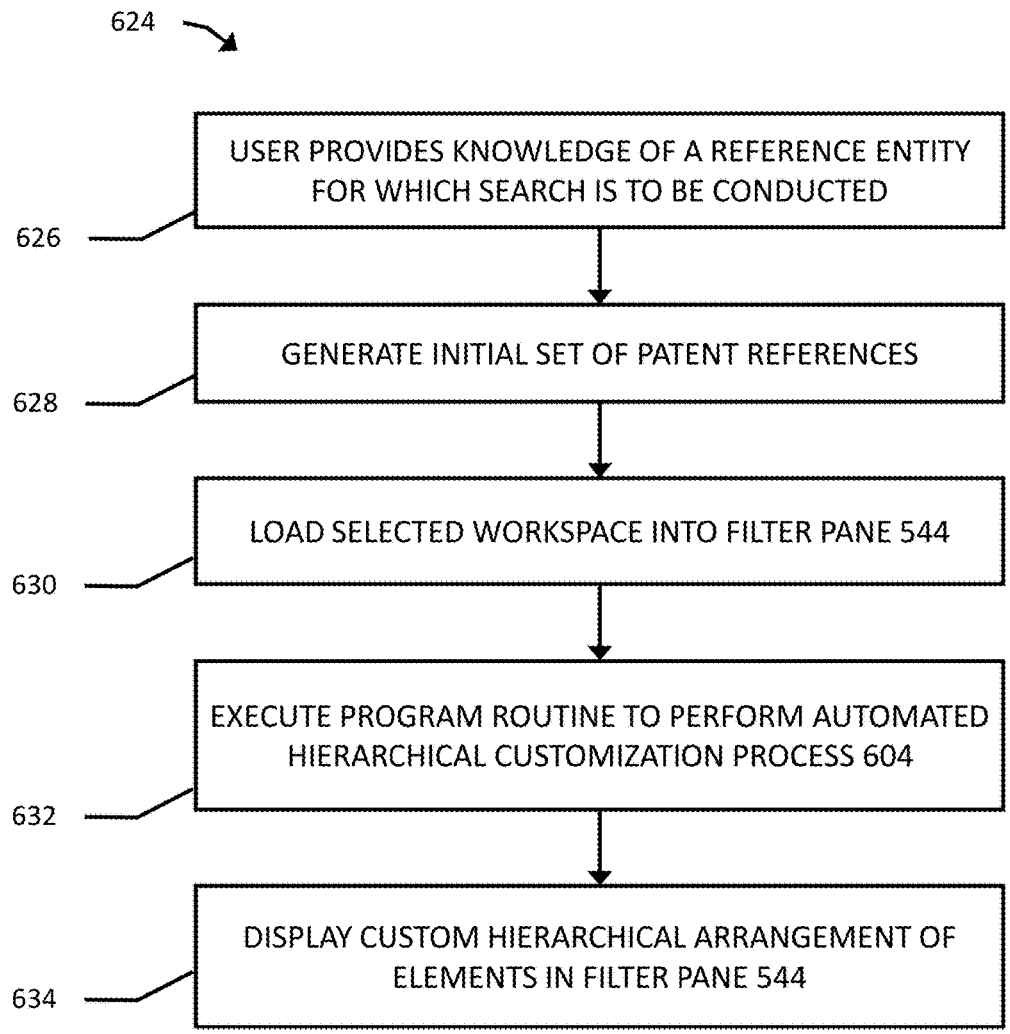
FIG. 27 is a flowchart of a process according to the present invention.

In an exemplary freedom-to-operate analysis, a user preferably carries out steps of a process shown in FIG. 27. Specifically, in step 626, a user provides or keeps in mind knowledge of a reference entity (e.g., a particular product, method, apparatus, system, composition, etc.) for which the analysis is to be conducted. Next, in step 628, in the manner described above, the user generates an initial pool of patent references from one or more sources. For example, the user may select a combination of classes and sub-classes in a query of a U.S. patent reference database. Alternatively, a user may enter a list of patent numbers. Next, in step 630, the user selects and loads into the "Filter" pane 544, a workspace that is relevant to the user's reference entity. The workspace includes information pertaining to a hierarchical arrangement of elements and information pertaining to relationships between such elements and a set of patent reference identifications. The user may alternatively reverse the order of steps 628 and 630. As described above, in step 632, the software program may automatically carry out an initial hierarchy customization operation. Specifically, in step 634, the software program causes the display of only elements of the workspace that correspond to patent references of the initial set of patent reference. Thus, elements of the hierarchical arrangement stored in conjunction with the active workspace that are not associated with any elements of the initial set are not shown in the display of the hierarchical arrangement of elements 620 in the "Filter" pane 544. Alternatively, a user may prefer that all elements in the workspace are displayed in the "Filter" regardless of whether or not they are associated with patents in the initial set, which is also contemplated by the present invention.

At this point, the GUI 544 is primed to enable a user to perform a deductive or eliminatory freedom-to-operate analysis. Referring again to FIG. 20, in association with each element is a check box, e.g. check box 636, that is user-selectable. In some embodiments, the user preferably reviews the elements of the hierarchical arrangement of elements in the "Element Hierarchy" window 612 and determines which of such elements are not embodied by the reference entity for which the search is being conducted. By selecting check boxes associated with elements so not embodied, the software program is configured to deduce, from the initial set of patent references, a final set of patent references (as described in further detail below). The final set of patent references is displayed in the "Remaining Patents" pane 546. In some embodiments, initially (i.e. when no check boxes of the hierarchical display have been selected), the "Remaining Patents" window 546 displays a list of patent references identical to the list of patent references of the "Initial Set" window 550 in the "Patent Pool" pane 542. In other embodiments, a separate pane designated for results may simply display the number of remaining patent references and/or the number of patent references that have been eliminated. A visual aid such as a pie chart, bar graph, progress bar, or the like may be displayed for the convenience of the user.

Also, preferably, the software program is configured such that patent references of the initial set that are not associated with any elements of the hierarchical arrangement of elements 620 are simply listed in a text box 638 of the "Remaining Patents" window 546. Because such patent references do not relate to any elements of the displayed hierarchical arrangement 620, such patent references cannot be eliminated from the "Remaining Patents" list 640 by virtue of deductive analysis using the "Filter" pane 544. Accordingly, if a user generating a workspace fails to memorialize all potential patent references of a specific field or class, the result in this search environment is the actual retrieval of the patent reference, as opposed to the non-retrieval of such patent reference. This fact underlies the reliability of this software program and distinguishes it, in outcome, from element-based search systems that operate in a positive manner (i.e. where selection connects retrieval, such as keyword searching). In some embodiments, patent references that are not associated with any elements in the "Filter" may be denoted with indication means in the "Remaining Patents" window, e.g., by displaying the patent or reference number in a different color or style of font.

The software program is preferably configured such that selection of a check box associated with an element ("the checked element") results in the carrying out of the following logic process. First, for all patent references of the initial patent set that independently require the checked element for infringement (e.g. all independent claims of the patent positively recite the checked element), such patent references are eliminated from the set of remaining patents as outputted and displayed in the "Remaining Patents" pane 546. Second, for patent references that require the checked element, but only if in conjunction with one or more elements of the hierarchical arrangement of elements (e.g. where a first independent claim of a patent requires the checked element while a second independent claim requires a different element not required by the first independent claim), such patent references are not eliminated from the "Remaining Patents" window 638, unless (or until) all other elements that are required by the other independent claims, in conjunction with the checked element, are also selected.

Figure 20:
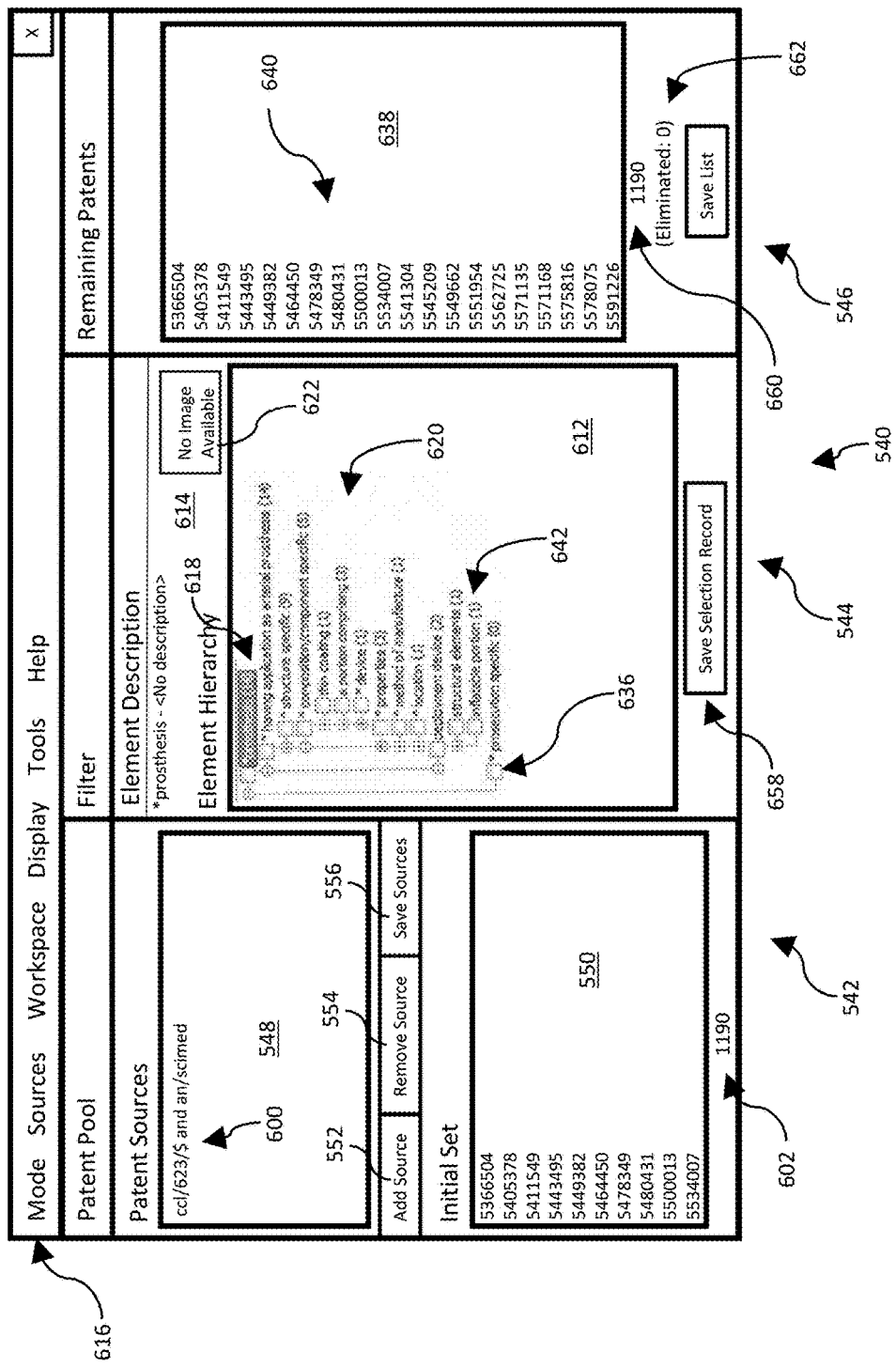
FIG. 20 is a view of the GUI of FIG. 19 in another state of operation.

As shown in FIG. 20, in some embodiments, an indication is provided in association with some, most, or all displayed elements of the number of patent references associated with such displayed element. In the embodiment shown in FIG. 20, the indication is a parenthesized numerical count. Preferably, the numerical count, e.g. numerical count 642 corresponds to a calculated number of patent references from the initial set that are associated with such element (and any associated species elements thereof) and that have not yet been eliminated from consideration. In other words, the numerical count, e.g. numerical count 642, represents the potential number of patent references that could be eliminated by selection of such element. In other embodiments, the numerical count associated with an element corresponds to the number of patent references that are independently associated with such element (i.e. associated such that the element alone is required for a reference entity to embody in order to infringe such patent) and any species elements thereof. In yet other embodiments, the reference count comprises a qualitative identifier that represents the number of potential or actual patent references able to be eliminated by selection of such element. For example, the reference count could include "High," "Low," and "Medium." Preferably, the reference count is dynamic. I.e., the software program is configured to re-run the computation of the reference count and update the display of the reference count accordingly.

Figure 28:
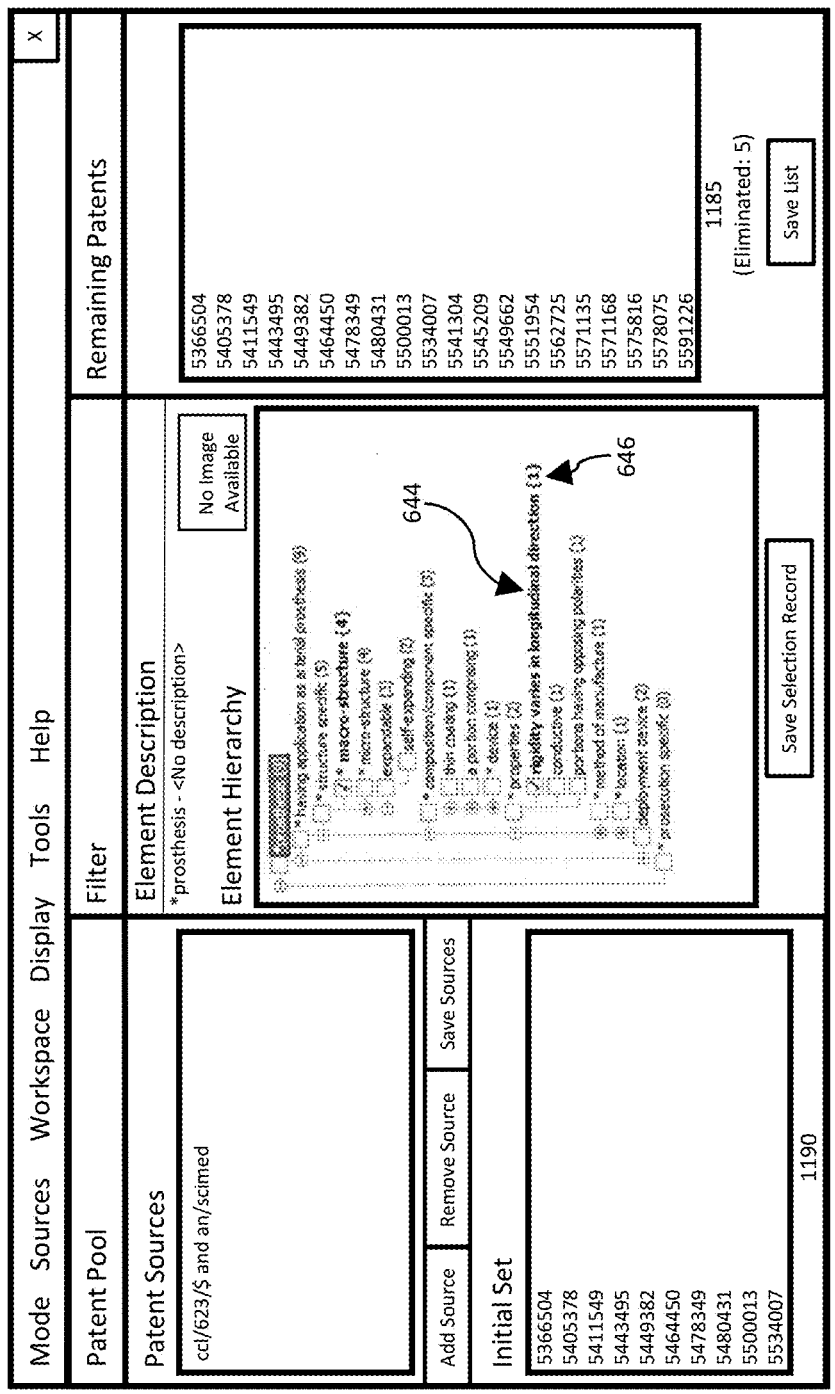
FIG. 28 is a view of the graphical interface of FIG. 19 in another state of operation.

Referring to FIGS. 20 and 28, preferably, once a check box associated with an element is selected (e.g. selected element 644 in FIG. 28), the element as displayed changes in font or other display characteristic. Preferably, such change in font or display characteristic remains effective until (and if) the user subsequently unselects such check box. Also, in some embodiments, preferably, the reference count, e.g. reference count 646, alternates to represent the number of patent references (of the initial set of patent references) that could potentially become relevant (i.e. no longer constituted in the "Remaining Patents" window 546). In this manner, the reference count 646 can represent the number of patents that have been removed (i.e., eliminated patents) that are associated with the checked or selected element in some way. Also, in some embodiments, as shown, once a user selects a check box associated with an element, a reference count associated with such element also changes in font or other display characteristic. Preferably, the reference count, in this alternate state, is also dynamic in like manner as described above.

Figure 29:
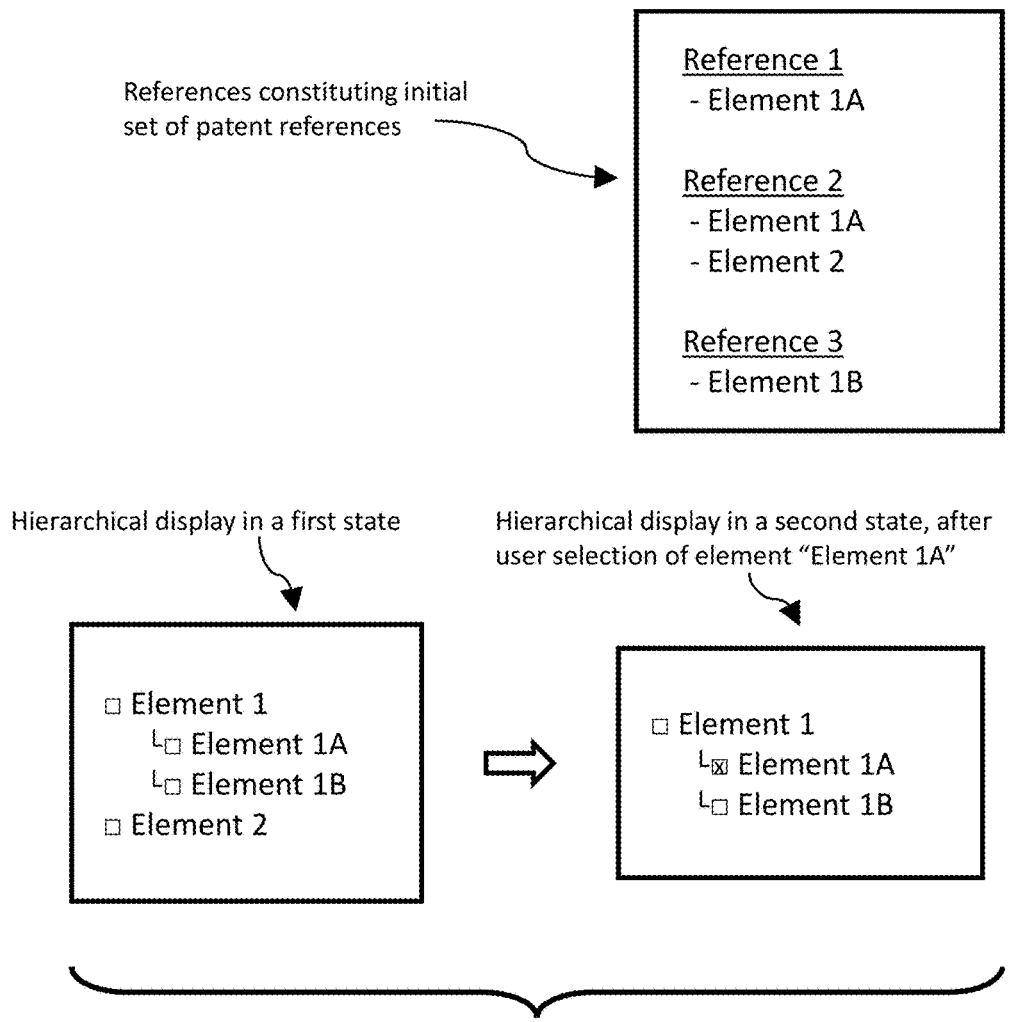
FIG. 29 is a schematic showing an exemplary use of the present invention.

Additionally, or alternatively, based on a user selection of an element, the software program is configured to carry out an automatic refresh process. Once a user selects an element from the "Element Hierarchy" window 612 of the "Filter" pane 544, the software program is configured to detect which patent references should be eliminated based on their stored element associations. Next, the software program is configured to determine, based on the eliminated patent references, which remaining unselected elements are no longer associated with any non-eliminated patents. In other words, the software program is configured to determine which unselected elements have become irrelevant by virtue of the selection of a different element. This may occur, e.g., where a first element is independently associated with a first patent reference and a second element is only associated (independently) with the first patent reference (and no other patent references). If the user selects the check box of the first element, naturally, the first patent reference would be eliminated from the final search results, as displayed in the "Remaining Patents" pane 546. Because the first patent reference had been eliminated, whether or not the user selected the check box of the second element is irrelevant as the second element is only associated with the first patent reference. Thus, in the course of carrying out the refresh process, in this case, the second element would be automatically eliminated from the display of the hierarchical arrangement as a result of the user's selection of the check box associated with the first element. An example of this operation is illustrated in FIG. 29.

In accordance with the above automated refresh process, preferably, selection of a check box of a genus element automatically results in the selection and/or elimination of any species of the genus element. This is because the selection of a check box of a genus element is an implicit selection of a check box of its species. In alternative embodiments, if a user selects a check box of a genus element, the species of the genus element remain for aesthetical or evaluative purposes. In some such embodiments, selection of a check box of a genus element automatically results in the selection of the check boxes of each species element associated with the genus element. Further, preferably, in such cases, the user is disabled from un-selection of a check box of a species element of a genus element whose check box had been previously selected.

Figure 30:
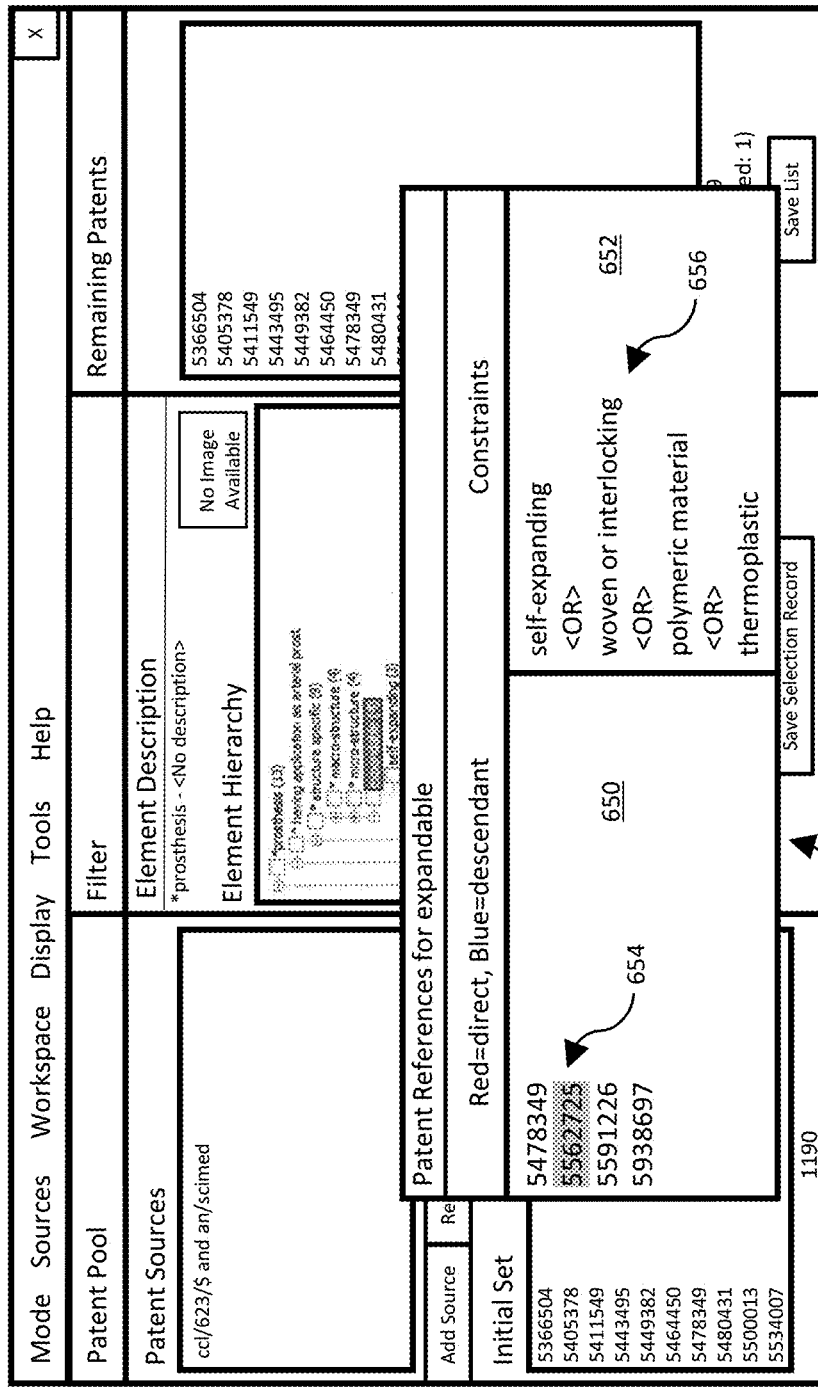
FIG. 30 is a view of the GUI of FIG. 19 in another state of operation.

In some embodiments, additional operations are enabled by the software program with regard to the "Filter" pane 544. The software program preferably enables the user, at any time while a workspace is active, to select an element and view all patent references that are associated with such element. Preferably, the user may access such operation by causing the display of a menu by performing a "right-click" of a conventional mouse or integrated keypad. Once the "View Patent References" item is selected from the drop-down menu, a pop-up window 648 is displayed as shown in FIG. 30. Preferably, the pop-up window 648 includes a "Patent References" sub-window 650 and, optionally, a "Constraints" sub-window 652. The software program is configured to display, in the "Patent References" window 650 patent references (of the initial set of patent references) that are associated with the selected element of the hierarchical arrangement display. Preferably, the display includes all patent references associated with the selected element (i.e. those that are independently associated and those that are associated only in conjunction with one or more additional elements). However, in alternative embodiments, the display is limited to only the patent references that are independently associated with the selected element. Further, preferably, the display also includes patent references that are not specifically associated with the selected element, but are associated with one or more species of the selected element (i.e. indirectly associated). In such cases, preferably, the indirectly associated patent references are displayed in a different manner than the patent references directly associated with the selected element. For example, in some embodiments, a first font color, e.g. red, is applied to directly-associated patent references, while a second font color, e.g. blue, is applied to indirectly-associated patent references. Alternatively, or in addition, font type, font size, and/or highlighting may be used to create this distinction.

Preferably, when a user selects a patent reference from the "Patent References" sub-window 650, e.g. reference 654, the record of elements with which the selected patent reference is associated is displayed in the "Constraints" sub-window 652, e.g. logical constraints 656. These operations increase the efficiency with which a user may access information stored in an active workspace. In other embodiments, the sub-window 652 is not provided.

In some embodiments, the software program is configured to enable the user, at any time while a workspace is active, to expand out all elements of the hierarchical arrangement of elements, i.e. to show all genera elements and their associated species elements. Similarly, the software program is configured, at any point while a workspace is active, to collapse the displayed hierarchical arrangement of elements.

In some embodiments, the user may save information relating to which elements were selected by the user in a deductive or eliminatory freedom-to-operate or other type of analysis. Specifically, referring to FIG. 20, the user may select the "Save Selection Record" button 658, and save, as a data file, the record of selected elements. This feature enables the user to conduct a subsequent freedom-to-operate analysis using a prior selection record as a basis to avoid duplicate work. Such may be significant where a subsequent product or service bears similarity to a prior product or service, or if a product is modified after a first freedom-to-operate analysis had been conducted. These processes will be described in further detail below.

Referring again to FIG. 20, as described above, the "Remaining Patents" pane 546 includes a display 638 of patent references of the initial set (and as displayed in the "Initial Set" window 550) that the user had not eliminated from consideration by virtue of selection of check boxes (e.g. check box 636) associated with the elements of the hierarchical arrangement of elements 620 displayed in the "Element Hierarchy" sub-window 612. In some embodiments, within the "Remaining Patents" text box 638, various patent references are displayed differently to reflect their differing characteristics. For example, preferably, a first font color, e.g. red, is applied to patent references displayed in the "Remaining Patents" text box 638 that are not associated with or do not relate to any elements of the hierarchical arrangement of elements in the workspace (i.e. that cannot logically be eliminated). Patent references that have been associated or do relate to elements of the hierarchical arrangement of elements 620 comprise a black font color. Of course other font characteristics (such as type and size) may be used in place of, or in addition to color.

In some embodiments, a reference count 660 is displayed in conjunction with the "Remaining Patents" window 638. The software program is configured to calculate the number of patents not eliminated (i.e. those patents listed in the "Remaining Patents" window 638) and display such number in the reference count 660. In similar manner, the software program is configured to calculate and display the number of references that have been eliminated from the initial set of patent references by virtue of the user selecting check boxes. This value is then displayed in an eliminated reference count 662. Preferably, the reference count 660 and the eliminated reference count 662 are updated dynamically, e.g. automatically based on a user's selection or un-selection of a check box associated with an element of the hierarchical arrangement of elements 620.

In some embodiments, the software program enables the user to save the list of remaining patents as a data file. Accordingly, such reference could be referred to in the future by the user for various purposes. Also, preferably, the software program is enabled to permit the user to retrieve a saved list of remaining patents to be used as a source for generating an initial set of references in a subsequent freedom-to-operate analysis, either alone or in conjunction with other sources. Alternatively, or in addition, a user may select one or more patent references of the list of remaining patents (as listed in the "Remaining Patents" window 638) and copy such reference to a "clipboard" (as enabled by the particular computer operating system or appropriate software) and/or be pasted in another location, such as a conventional word processing or spreadsheet application or in an application configured to retrieve patent documents.

In some embodiments, the methods and systems provided by the present invention allow for a user to view, retrieve, save, and/or download patent documents directly from the software program itself. The program may allow for a user to click or right-click on a patent reference number displayed in any pane, e.g., the "Remaining Patents" pane, which may generate a new window or pane to allow for viewing or downloading of the patent document itself. To accomplish this, the software program may be linked via network communications to an online patent database of patent images and biographical information to enable the efficient retrieval of patent documents. For example, in one implementation a user may right-click the patent reference number in the "Remaining Patents" pane 638 and select an option to "view patent," "download patent," or "save patent."

Alternatively or in addition, preferred portions of patent documents may also be directly retrievable from the software program interface. For example, a user may wish to view only the "claims" portion of a particular patent document in order to carry out instant infringement analysis. This may be accomplished by, for example, right-clicking the patent reference number in the "Remaining Patents" pane 638 and selecting an option to "view claims."

In other embodiments, the "Remaining Patents" pane 638 or another region associated with the software may contain a list of patent numbers that are formatted as hyperlinks. When a user clicks on the hyperlinked patent number, a new window, tab, or pop-up may open that displays the referenced patent. The hyperlink may be configured to contain a URL to a patent information provider that then transmits the content of the patent. For example, the patent number may be formatted as a hyperlink to the free and publicly available Google Patents website or any other patent information provider. This embodiment may have particular applicability when the software program of present invention is implemented as a web-based application accessible over an internet browser, such as Microsoft Internet Explorer, Google Chrome, Apple Safari, Firefox, or the like.

In some embodiments, the software program is configured to enable the user to separately memorialize (or store) information relating to the list of specifically selected elements by the user in conjunction with a workspace. For example, a workspace is loaded causing the display of a hierarchical arrangement of elements, e.g., as in FIG. 20. A user selects one or more of the check boxes of one or more corresponding elements of the hierarchical arrangement of elements 620, i.e. the "selected elements." Preferably, provided such an example, the software program enables the user to save such information pertaining to which of the elements of the hierarchical arrangement constitutes the "Selected elements." The user may store this information, e.g., by selecting the "Save selection record" button 658 below the "Element Hierarchy" window 612. Once this button 658 is selected, the software program is configured to generate and store data corresponding to a listing of selected elements and their respective identifications.

Figure 31:
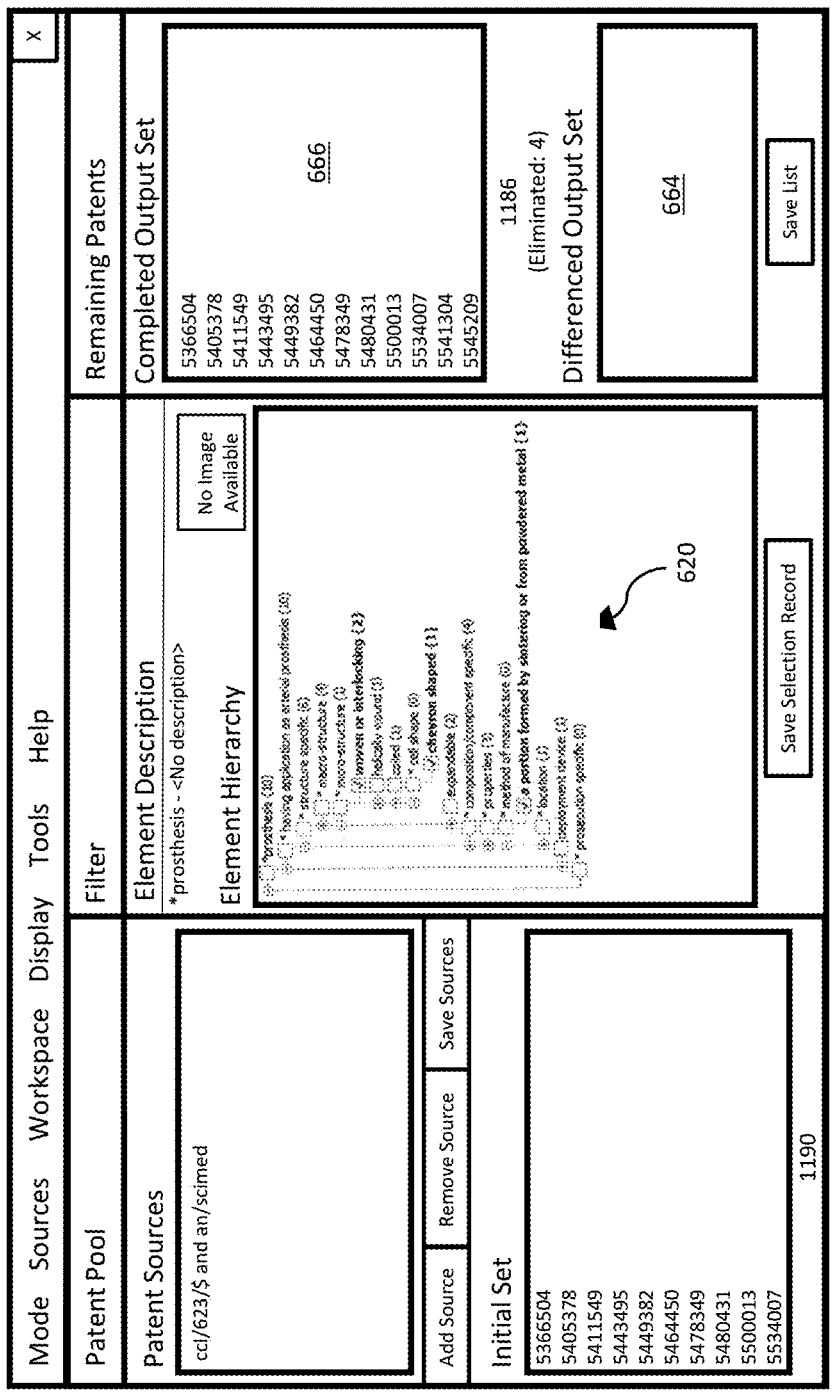
FIG. 31 is a view of the GUI of FIG. 19 in another state of operation.

Referring to FIG. 31, saved selection records may be later uploaded or opened by the user to be applied to an active workspace. A user may wish to upload a saved selection record for one of at least several reasons. First, after performing a first freedom-to-operate analysis on a first version of a product, that product may have been slightly modified, requiring renewed analysis. To carry out the renewed analysis, the user, having loaded a desired workspace, may also load the saved selection record from the first analysis and simply tweak the selection record without having to review the hierarchical arrangement of elements anew. Second, a user may wish to conduct a technology analysis. A "technology" analysis, as used herein, refers to a specific examination as to what patent references may be relevant to a product based only on the inclusion into the product of a specific technology or technical aspect. This search may be accomplished by applying a saved selection record into the hierarchical arrangement of elements of an active workspace, as will be described in further detail below.

In some embodiments, the process of loading a saved selection record into a hierarchical arrangement is as follows. Once a workspace is loaded in the "Filter" pane 544, a user is enabled to then select the "Open saved selection record" entry optionally from a drop-down menu on the menu bar 616. In some embodiments, the user is disabled from selecting such option if a workspace had not been loaded. Subsequently, the software program is configured to prompt the user to select a desired selection record from among a list of previously stored selection records. Once the user selects a desired selection record, the software program is configured to automatically carry out the following steps. First, the program detects which of the selected elements of the saved record are present in the user's active workspace by element identification number (i.e. preferably not by title). Next, selected elements of the saved record that do not relate to any elements of the user's active workspace are ignored, while the remaining selected elements are cached. Next, the program causes any displayed elements of the workspace matching selected elements of the saved record to be automatically checked. If the hierarchical arrangement of elements changes—e.g. the user is in a "Show only relevant elements" setting as described above, and the user adds additional patent references to the initial set of references after loading a saved selection record—then the software program is configured to detect whether any newly added elements correspond to selected elements of the saved record. If so, such elements are also automatically box-checked.

In some cases, the saved record of selected elements may include elements whose identifications exist in an active workspace. However, such elements may have titles and/or relative locations in the hierarchical arrangement that have been modified. In such cases, preferably, such modified titles and/or locations are ignored and such element is still automatically checked. Alternatively, or in addition, such a scenario is detected and a warning message is displayed to the user. Such a warning message may be specific to such modified element or elements, or may be an indication that particular elements have been modified or are new. The indication may be made by highlighting or otherwise altering the appearance of modified or new elements. Alternatively, a general warning may be displayed indicating that at least one element of the saved selection record has been modified in some respect from its form as saved. In yet other embodiments, the software program is configured to not check such elements at all. In still yet other embodiments, the presence of elements modified from the saved selection record results in the reversion of the active workspace to the workspace associated with the saved selection record in its state when such selection record had been saved. If the user had already checked elements in the active workspace prior to loading a saved selection record, such checked elements preferably remain checked. If such a checked element happened to coincide with an element of the saved selection record, such element remains checked.

In some embodiments, aspects regarding the display of elements of the hierarchical arrangement are affected by the loading of a saved selection record. Preferably, elements automatically checked due to correspondence with elements of the saved record become displayed with a first font characteristic different from a second font characteristic of remaining elements of the hierarchical arrangement. Also, preferably, elements modified from a base state, in which the hierarchical arrangement reflects the uploaded saved selection record information, are displayed with a different third font characteristic. Further, preferably, if the user is operating with the active workspace in the state of "Showing only relevant elements," any elements that newly emerge in the display (e.g. as a function of the de-selection of an element corresponding to an element of the saved selection record) is displayed with a different fourth characteristic, e.g. highlighted, italicized, etc. These changes in font aspect efficiently signal to the user where attention needs to be drawn with minimal searching through the hierarchical arrangement.

In some embodiments, when the user selects to upload a saved selection record to an active workspace, the "Remaining Patents" pane 546 also changes as a result. Specifically, in some embodiments, as shown in FIG. 31, a new "Differenced Output Set" sub-window 664 emerges. This window is configured to display the patent references remaining of the "Completed Output Set" window 666 that have become relevant solely due to a user's modification of selections in the hierarchical arrangement 620. Preferably, the "Differenced Output Set" information is updated dynamically, e.g. based on a user's selection or de-selection of an element of the hierarchical arrangement of elements 620.

As an example, to carry out a second freedom-to-operate analysis of a product modified from a state in which a first freedom-to-operate analysis had been performed, a user may perform the following process. First, the user may load into the "Patent Pool" pane 542 an initial set generally corresponding to the initial set of the previous analysis of the product. Specifically, the user may opt to load the actual saved source collection of the first analysis. The user may specify to load such source collection dynamically, such that any references to data file paths and/or queries of publicly available patent reference databases are updated. Subsequently, the user may opt to load the workspace file used in the first analysis. Once loaded, the user may load the saved selection record of the first analysis. Next, the user reviews the selected elements and deselects those elements that the user no longer believes are not embodied by the product as modified. After completion of such review, the user may review newly appearing elements in the hierarchical arrangement resulting from the un-checking of the elements corresponding to the saved selection record. When the user has completed analysis of the elements of the hierarchical arrangement 620, the user may review the results. Specifically, the user may refer to the "Differenced Output Set" window 664 for a quick view of the patent references of the initial set that had become an issue solely due to the variation in the product. Ultimately, the user may wish to review all patent references of the "Completed Output Set" window 666 to ensure all relevant patent references are considered in view of the variation in product.

Similarly, as described above, a user may utilize the "Open saved selection record" operation to perform a "technology search." In such a case, a user may perform the following method. A user may desire to determine which patent references become an issue due to the incorporating of a proposed new technology. In this case, for example, the user may first load a relevant workspace. Next, the user may load an appropriate initial set of patent references. Next, the user loads a saved selection record that corresponds to a base product not including the proposed technology. Next, the user unselects elements that can no longer be considered to be not embodied by the product in view of the proposed technology. Then the user selects elements that have appeared in the hierarchical arrangement based on the de-selection of any elements checked by virtue of loading the saved selection record. Finally, when the user has completed analyzing the elements of the hierarchical display of elements, the user may refer to the "Differenced output set" window 664 to quickly review patent references that may be at issue solely based on inclusion of the proposed technology. The user may also review the references listed in the "Completed output set" sub-window 666 for complete understanding of potential issues associated with inclusion of the proposed technology.

Any or all of the foregoing features, aspects, and functions of embodiments of the invention may be utilized in a web-based or mobile application. A web-based application is a software program or programs that run on a web browser or similar tool, such as Google Chrome™, Microsoft Internet Explorer™, Apple Safari™, or Mozilla Firefox™ for example. The web-based application may have programmatic elements that are executed remotely (e.g., at a host server), locally, or a combination of both. The present invention may similarly be configured as a mobile application that may be run on a mobile device, such as a smartphone, tablet computer, handheld computing device, or any other portable device. Mobile applications may likewise comprise remote programmatic elements (e.g., operating at a host server), may be entirely local to the device, or may be a combination of both.

FIGS. 32 through 46 depict embodiments of the invention configured as a web-based application running on the Google Chrome™ web browser. Unless otherwise explicitly stated or impossible as a matter of technical practicality, it is contemplated that any features, aspects, or functions described with respect to a web-based application may be equally applied to a desktop application, and vice versa. While only a searching interface is shown in FIGS. 32 through 46, it is fully contemplated and envisioned that an annotation interface is also implemented as a web-based application having the same or equivalent features and functionality as the annotation interface described with respect to FIGS. 4-18(c) without limitation.

Figure 32:
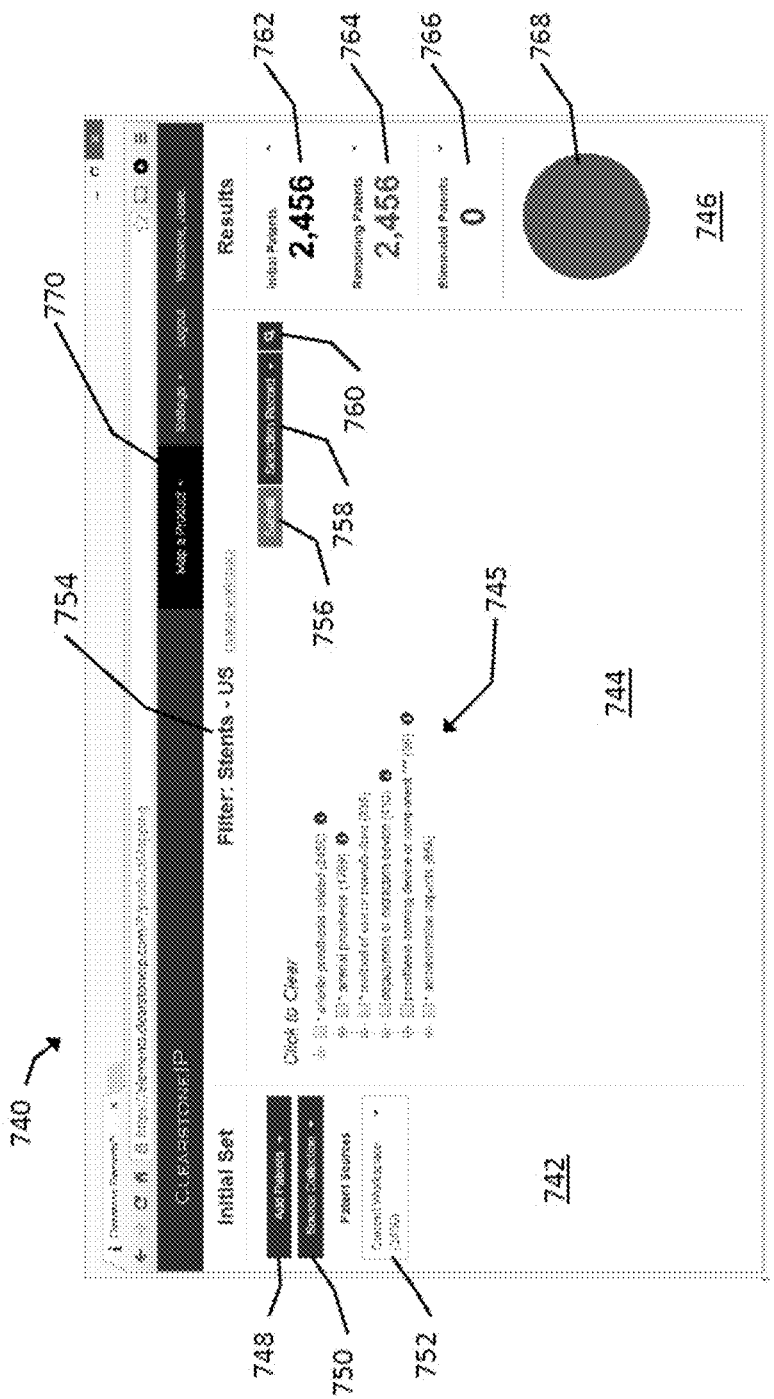
FIG. 32 is a view of a GUI in accordance with a web-based embodiment of the present invention.

With reference to FIG. 32, a web-based application for conducting patent searches is shown having a graphical user interface (GUI) 740. The GUI 740 generally comprises three frames including an initial set 742, a filter 744, and results 746. The basic operation of the interface is to eliminate patent references from an initial set based on claim elements chosen by a user. For example, if a user is performing an analysis to determine whether a particular product infringes any patents in the initial set 742, he may select elements displayed within a filter frame 744 that are not embodied by the particular product. This action will cause the application to remove, from the results 746, patents that require the selected element for infringement. After completing a review of the interactive element hierarchy 745 and selecting elements in this way, the user is typically left with a focused, manageable list of highly relevant patent numbers that should be subjected to further review. Studies have shown that an analysis performed in this way yields unexpected and drastically enhanced results in terms of speed, accuracy, reliability, and precision as compared to conventional methods.

The initial set frame 742 may include a menu button 748 configured to add patents to the initial set, as well as a menu button 750 configured to perform functions with respect to the collection of patent sources. A list of added patent sources 752 is also provided in the initial set frame 742. The "filter" or element hierarchy frame 744 contains the interactive hierarchical arrangement of elements 745 created during the annotation process, for example using the annotation interface described in FIGS. 4-18(c). The element hierarchy 745 is defined by a workspace that includes patent identifiers correlated with elements. The name or title 754 of the workspace may be displayed at the top of the frame, along with an option to "change workspace." The filter frame 744 may include buttons 756, 758, 760 corresponding to a submit function, a menu including functions related to the element selection record, and a find (word search) function, respectively, each of which will be described in further detail below. The results frame 746 may include regions displaying indicators 762, 764, 766 for dynamically reporting the quantities of patents in the initial set, the patents remaining, and the patents that were eliminated, respectively. A visual aid, such as a pie chart 768, progress bar, graph, or other image may be provided to further conceptualize the results of the search.

Figure 33:
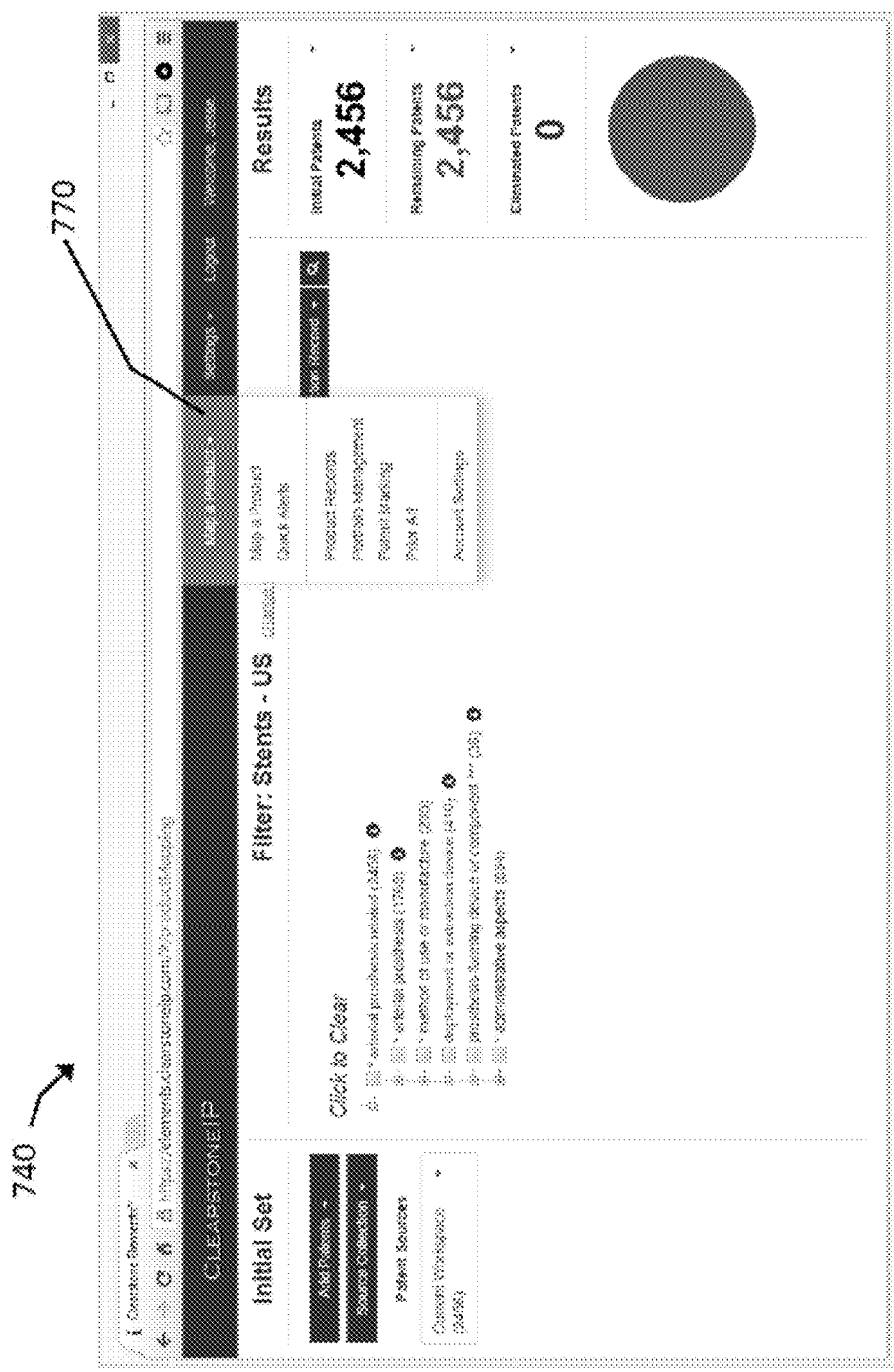
FIG. 33 is a view of the GUI of FIG. 32 in a state of operation.

A navigation field 770 may be provided so that a user may navigate to different modules or modes of the application. As shown in FIG. 33, when a user clicks on the navigation button 770, a dropdown menu is displayed that provides the options to map a product, set alerts, manage product records, manage a portfolio of patents, manage aspects of patent marking, perform prior art analyses, and go to account settings.

Figure 34:
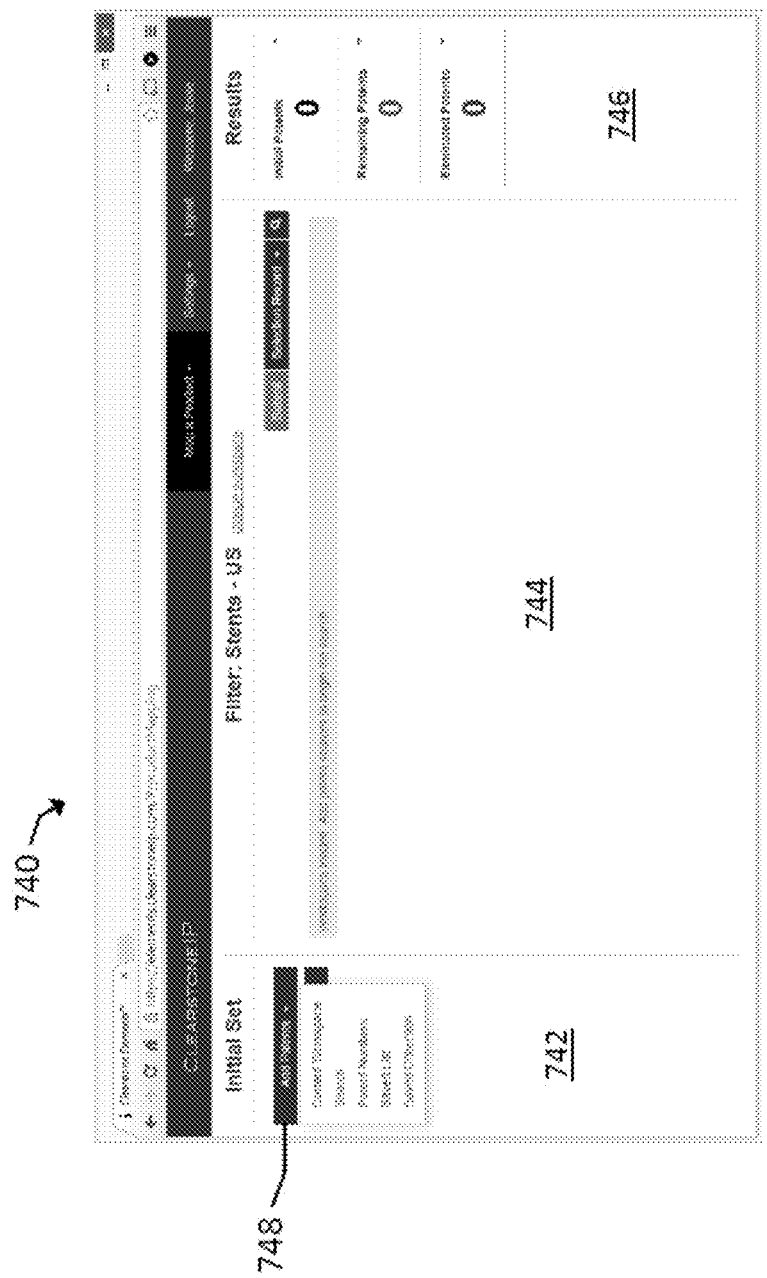
FIG. 34 is a view of the GUI of FIG. 32 in a further state of operation.
Figure 35:
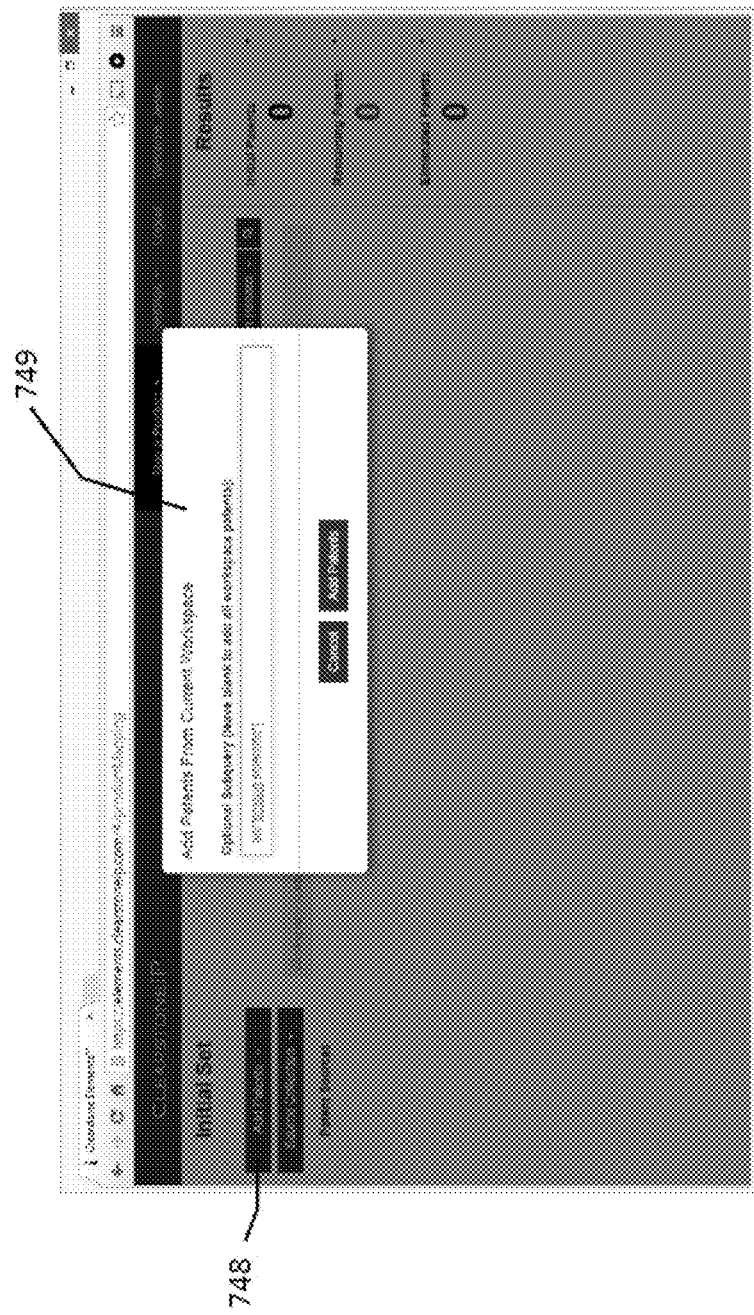
FIG. 35 is a view of the GUI of FIG. 32 in a further state of operation.
Figure 36:
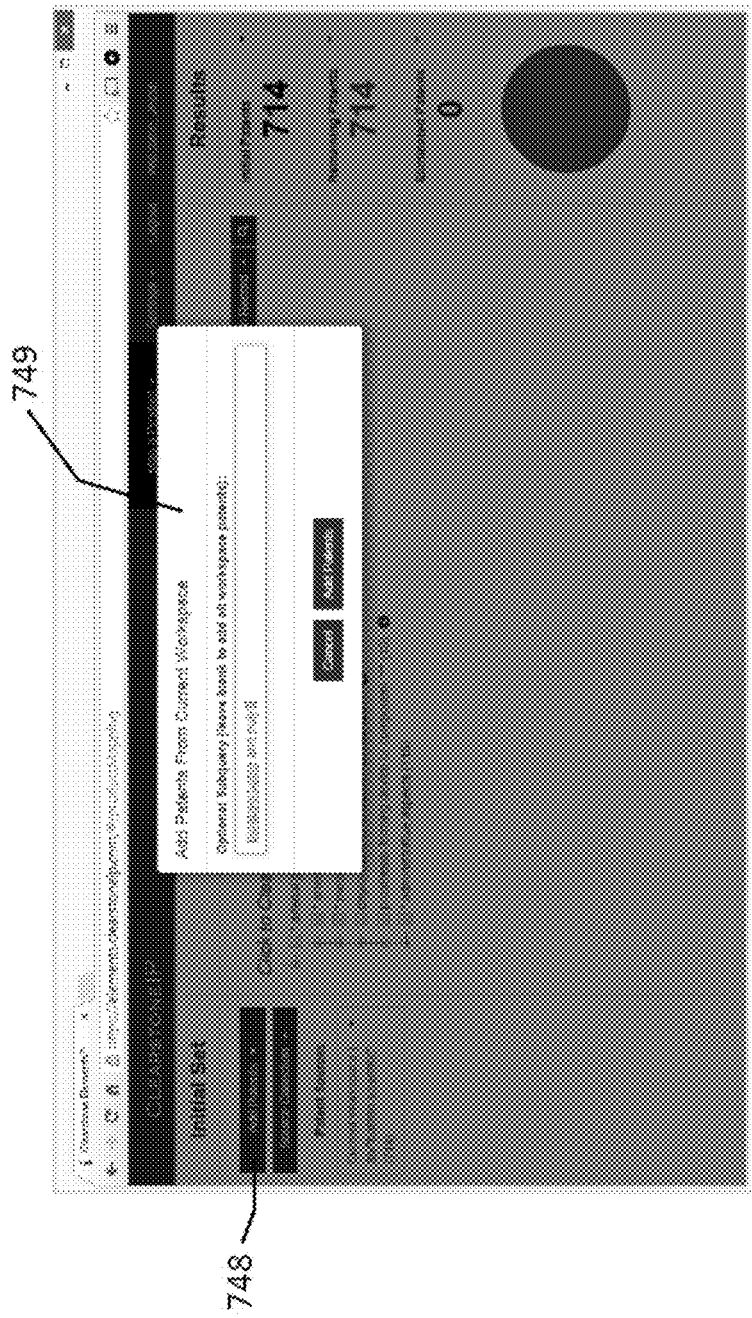
FIG. 36 is a view of the GUI of FIG. 32 in a further state of operation.
Figure 37:
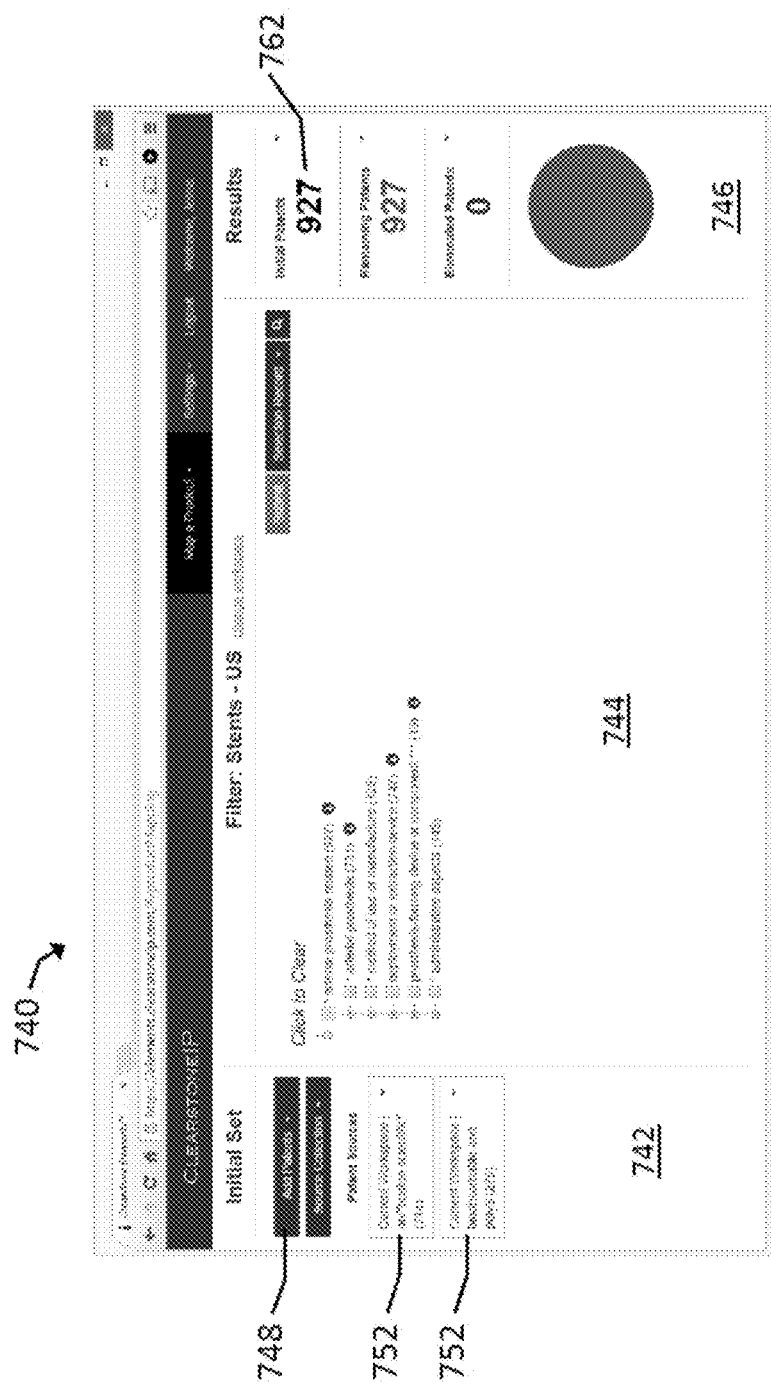
FIG. 37 is a view of the GUI of FIG. 32 in a further state of operation.

FIG. 34 shows a view of the web-based GUI 740 when a workspace is loaded but no patents have yet been added to the initial set. In this case, the workspace is named "Stents—US." To add patents, the user may select the drop-down menu 748 in the initial set frame 742. The add patents menu 748 displays the options of current workspace, search, patent numbers, saved list, and saved collection. Each of these options operates in a substantially similar manner as the corresponding actions described herein with reference to FIG. 21. As an added feature, if a user selects the option for "current workspace," an option may be provided to further filter the set of patents that would otherwise be added. For example, as shown in FIG. 35, a pop-up window 749 may be displayed that allows a user to enter a further search query to narrow down the patent list. In this example, the user has entered the query 'an/"boston scientific,"' which will result in the application retrieving all patents within the workspace "Stents—US" that indicate an assignee of Boston Scientific. Once this set of patents is added to the initial set 742, it will be represented as a patent source 752 along with the number of patents contained in the source (e.g., 714 patents here), as shown in FIG. 37. In FIG. 36, the user is adding the further search query of "bioabsorbable and poly$" into the window 749, which will narrow the field of patents to only those that contain these keywords. As shown in FIG. 7, a patent source 752 has been added to represent this search, along with an indication of the number of patents included in the source (e.g., 275 patents here). The patent source indicators 752 may further include a drop-down menu that provides the user with further options specific to the particular source including, for example, the options to list patents in the source, download the patent list, export patent bibliographic data, refresh the source (i.e., re-run a search query), or remove the patent source. The total number of patents in the initial set, including all added patent sources 752, is shown in the results frame 746 in the region "initial patents" 762. Note that the initial patents indicator 762 will be less than the sum of all patent sources 752 when there is overlap among the sources 752.

Figure 38:
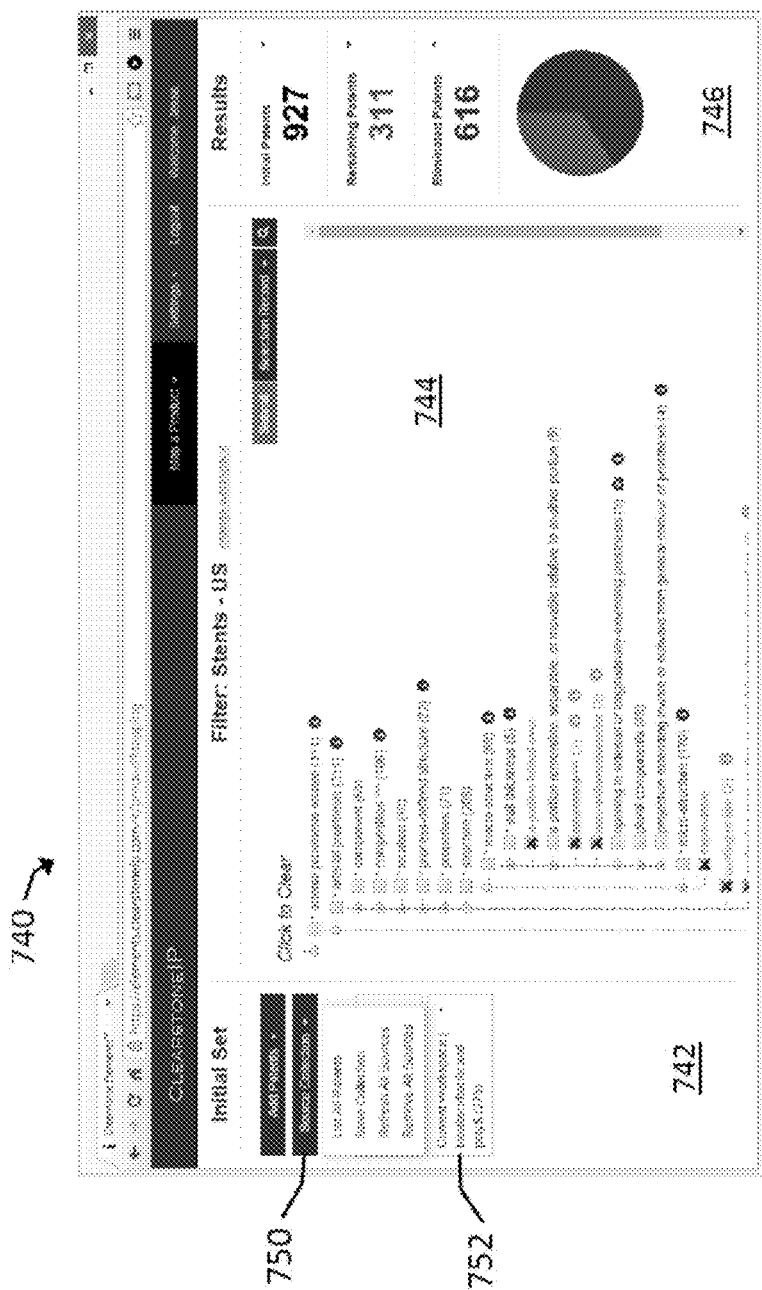
FIG. 38 is a view of the GUI of FIG. 32 in a further state of operation.

As shown in FIG. 38, the drop-down menu 750 provides options relative to the collection of sources 752 presently added to the initial set 742. Clicking on the button 750 will display the options of listing all patents in the initial set, saving the source collection, refreshing all sources (i.e., re-running all search queries), and removing all sources.

Figure 39:
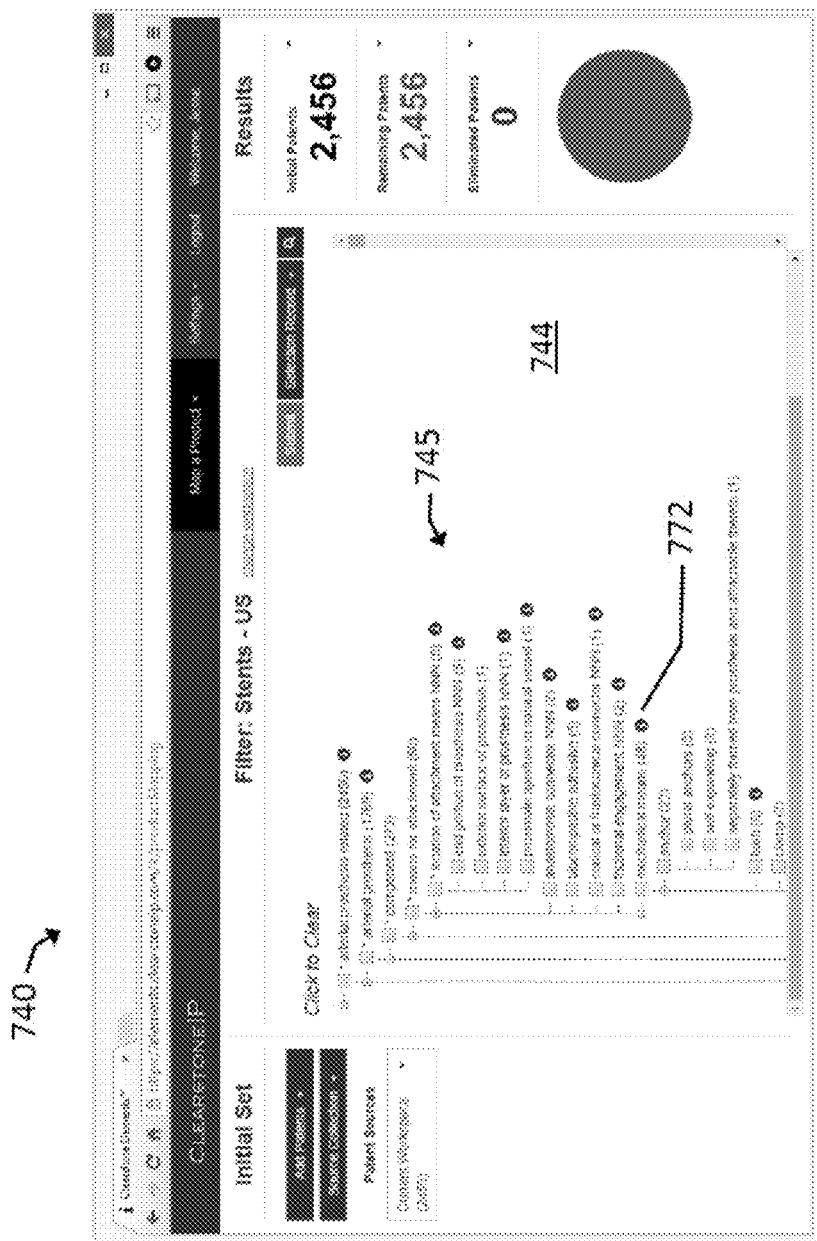
FIG. 39 is a view of the GUI of FIG. 32 in a further state of operation.

FIG. 39 depicts a view of the GUI 740 as a user begins an analysis. The filter frame 744 contains the element hierarchy 745, here shown in an expanded state. The user can expand and collapse individual elements by clicking the plus and minus signs, respectively, to the left of the element titles. The user can also expand or collapse the entire hierarchy by, for example, opening the right-click menu and selecting expand all or collapse all, respectively. The right-click menu may also contain user options to view patents associated with a particular element, expand all selected elements, and clear all element selections. Some or all elements, such as element 772, may have a description associated therewith. The user may view the element description by hovering over the element, which causes the description to be displayed. The description may alternatively be viewed by selecting an option in a right-click menu. The element may also have an image associated with it, which may likewise be displayed by hovering over the element or engaging the right-click menu.

Figure 40:
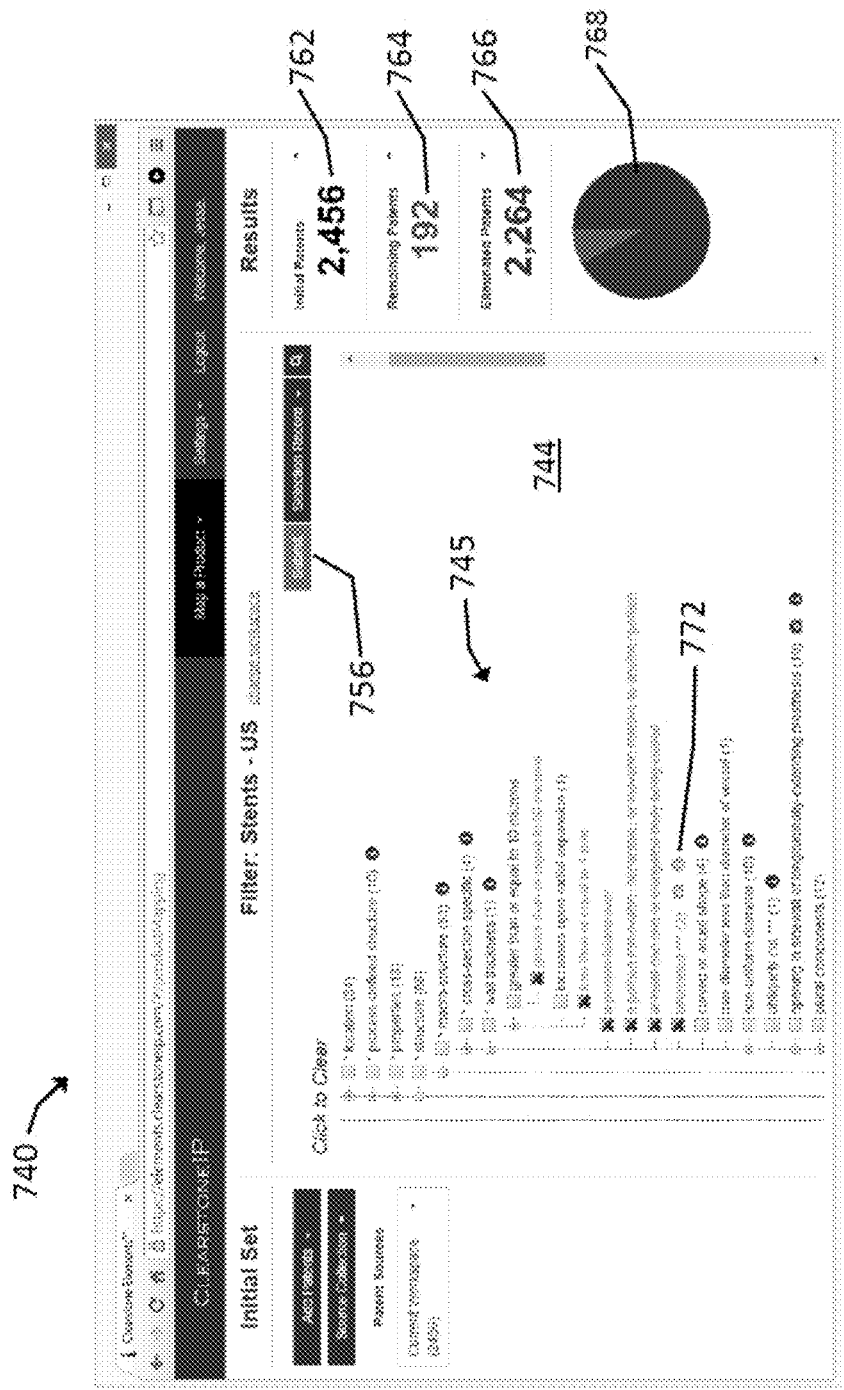
FIG. 40 is a view of the GUI of FIG. 32 in a further state of operation.

FIG. 40 shows a view of the GUI 740 after a number of elements have been selected in the element hierarchy 745. When a user selects an element, such as element 772, the selected element is indicated as having been selected. Selection indicators may include one or more of graying-out, striking through, and/or an "X" mark in a box, all of which are shown in FIG. 40. Additional indicators may also be used. As each element is selected, patents are automatically eliminated from the initial set (if logically appropriate based on the stored correlations), resulting in a decrease in the number of remaining patents 764 and an increase in the number of eliminated patents 766. The pie chart 768 may similarly reflect a change in the number of patents remaining and/or eliminated. In some embodiments, the application need not execute the elimination function after each time a user selects an element. Instead, the user may select two or more elements and then, when he wishes to execute the elimination function, he may click on the submit button 756 in order to eliminate all patents requiring the selected elements for infringement. This process could be useful in the event that the user's internet connection is slow.

Figure 41:
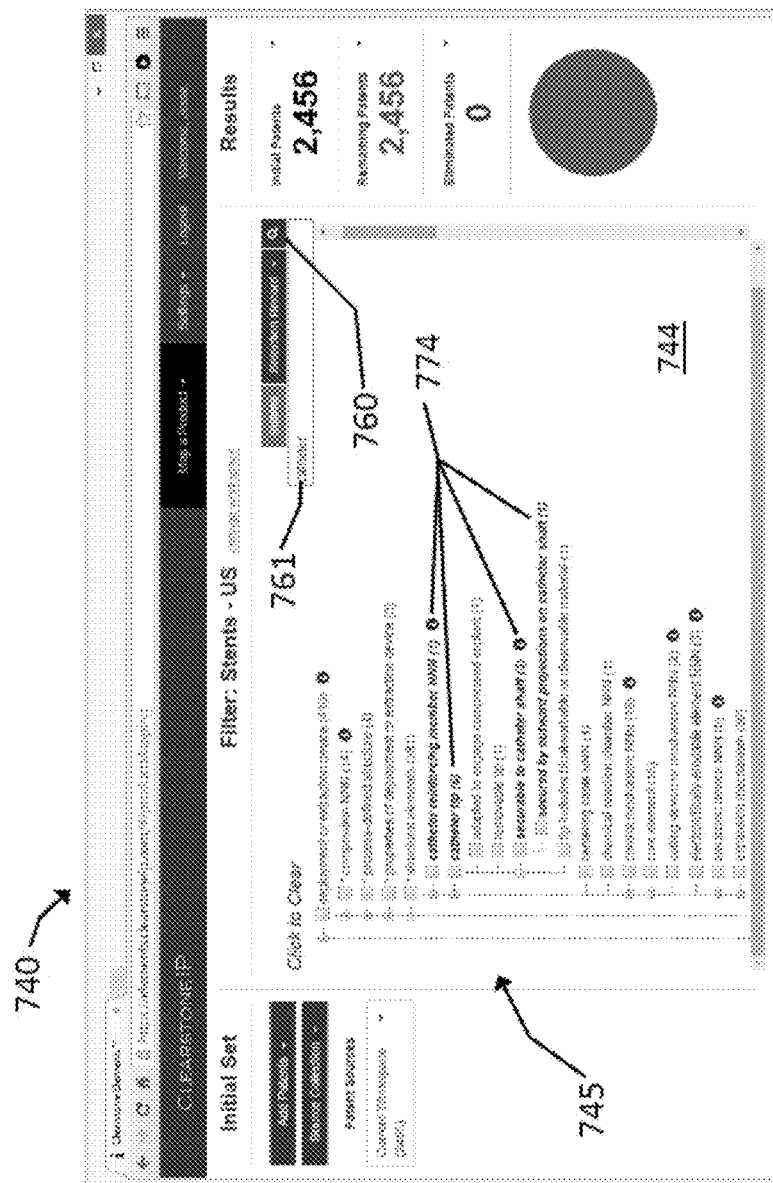
FIG. 41 is a view of the GUI of FIG. 32 in a further state of operation.

FIG. 41 illustrates the functionality of an element finder or word search function. If a user is interested in locating elements in the hierarchy 745 that pertain or describe a particular concept, he may click on a find function button 760. This may present a text field 761 or other text entry capability. The user may then enter a word or a part of a word into the text field 761. The application will then display and/or highlight all elements in the hierarchy 745 that contain the entered word or word portion. As shown in FIG. 41, the user has entered the word "catheter" in the text field 761, which resulted in the highlighting of four elements 774 that contain the word "catheter." The hierarchy 745 may contain additional elements that are highlighted, which can be viewed by scrolling further down the hierarchy 745. The elements containing the entered word are highlighted in this example by altering the font using italicized and bolded formatting, but any suitable form of drawing a distinction from other text may be used. Preferably, the find function is dynamic such that results in the element hierarchy 745 are immediately displayed as the user enters each letter of the term in text field 761.

Figure 42:
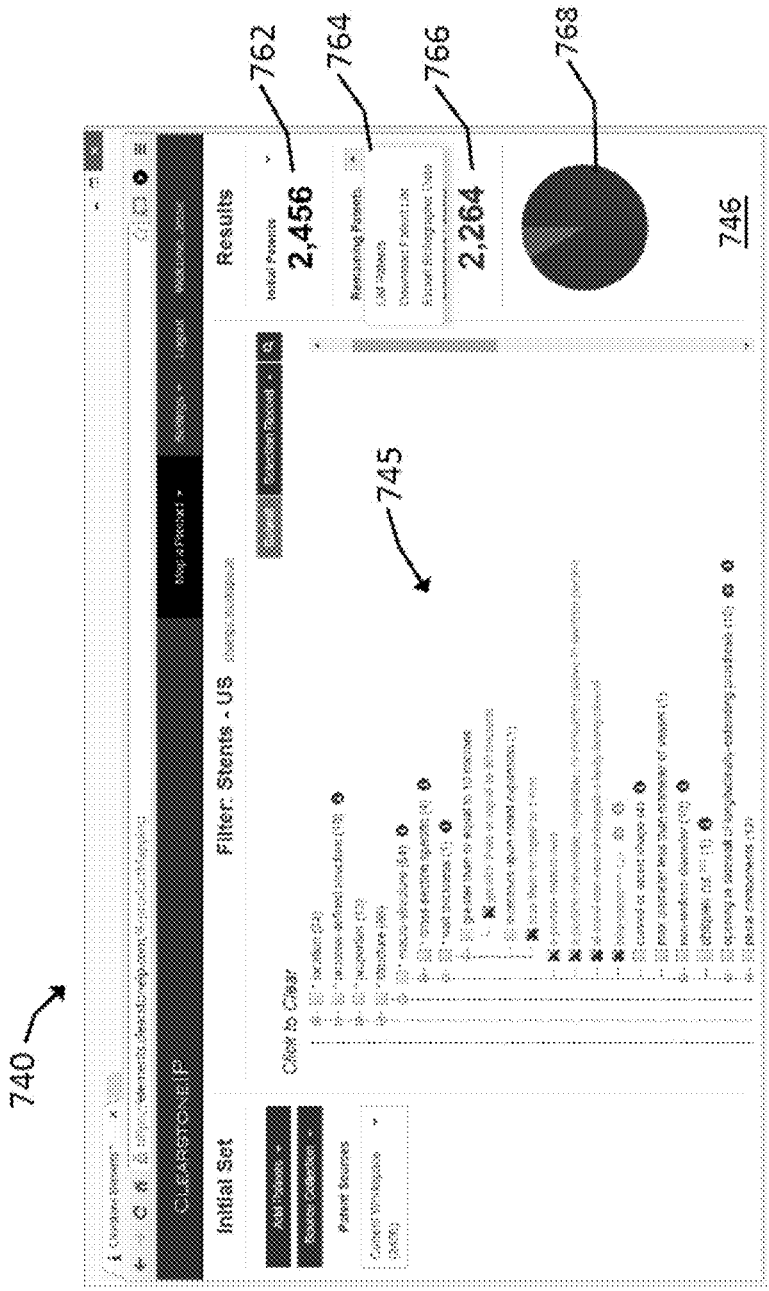
FIG. 42 is a view of the GUI of FIG. 32 in a further state of operation.

FIG. 42 illustrates additional functions that may be available in the results frame 746 of the web-based GUI 740. As noted above, quantitative indicators may provide a current count of patent references contained in the initial set 762, remaining patent references 764, and eliminated patent references 766. Each of these indicators may have a corresponding drop-down menu that provides options for viewing, downloading, or exporting information related to the patents contained in that particular set. The options may include, for example, the ability to list the patents, download a list of the patents (e.g., in a text or rich text file, or spreadsheet), or to export bibliographic data associated with the patents. The bibliographic data may include any or all data available from conventional patent databases, including, for example, filing date, issue date, publication date, title, inventors, abstract, classification, assignee information, priority dates, cited and/or citing references, etc. Although shown in FIG. 42 as applicable to the remaining patent list 764, such options are equally available with respect to the initial patents list 762 and the eliminated patents list 766.

Figure 43:
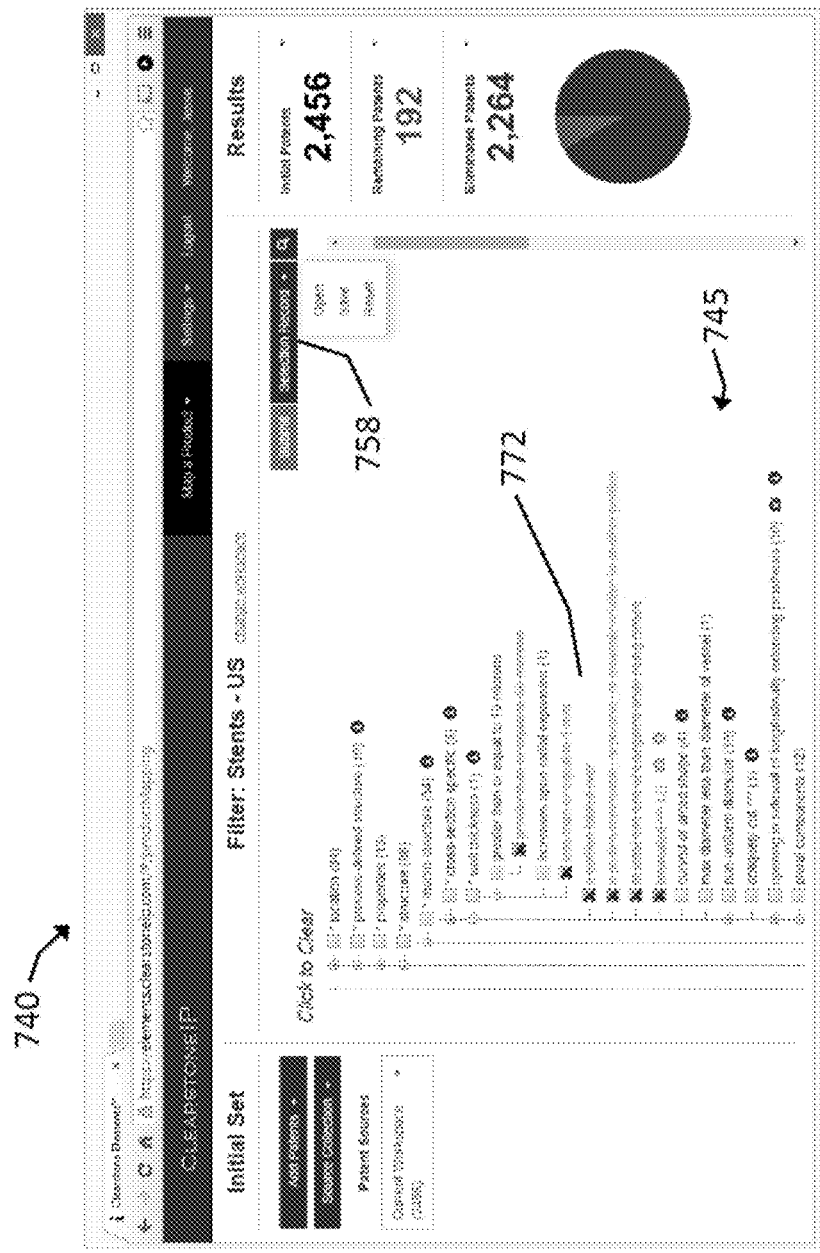
FIG. 43 is a view of the GUI of FIG. 32 in a further state of operation.
Figure 44:
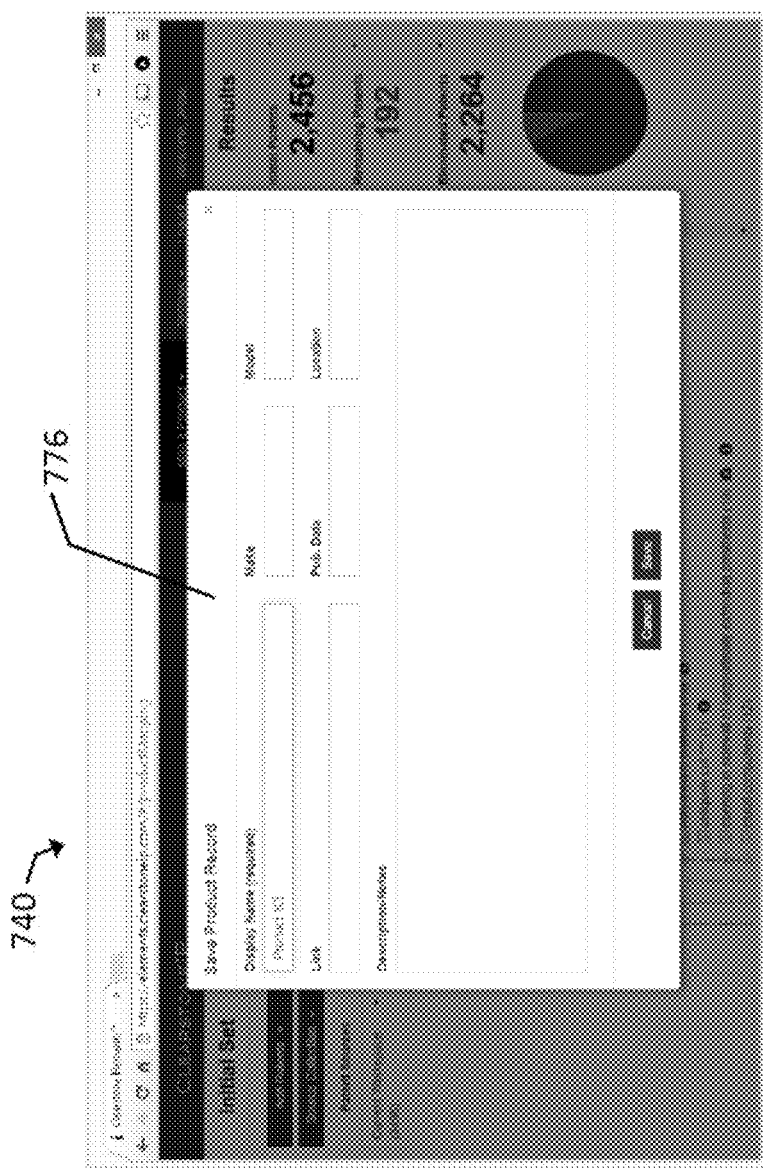
FIG. 44 is a view of the GUI of FIG. 32 in a further state of operation.

Once a user has completed an analysis of a particular product, method or concept undergoing search, the GUI 740 will reflect a number of selected elements 772 in the hierarchy 745. As discussed herein, these selected elements 772 typically represent elements that are not embodied by the product, method, or concept under analysis. The user may then save the record of element selections as shown in FIG. 43. Clicking on the selection record menu 758 results in the display of options including, for example, "open," "save," and "reset." Clicking "save" may bring up a window, such as window 776 shown in FIG. 44 and titled "Save Product Record." The save product window 776 allows a user to enter a variety of information related to the analysis that has been or is being performed. For example, the window 776 includes fields for a display name, make, model, link, publication date, location, description and/or notes. This information may be stored as metadata associated with the saved record of selected elements 772 of the hierarchy 745. The saved selection record may also save a record of the patents that are presently included in the remaining patents list 764 to provide a basis for later comparison. The user may complete the saving process by clicking "Save" in window 776.

The application may also be configured to save the entire state of the GUI 740 at any point in time as a sort of snapshot, or what may be called a "session save." In this case, a data record may be created that includes stored data representative of the current workspace 754, each of the patent sources 752, the selected elements 772, and/or the remaining patents 764. A further button (not shown) may be displayed in the GUI 740 to enable a user to save the session. Alternatively or in addition, the application may be configured to automatically save the session at frequent intervals of time so as to protect the user against loss of work or data. The user may open saved sessions by selecting an "open" function and being presented with a list of saved sessions, or entering the name of known saved sessions.

Returning to FIG. 43, after one or more element selection records have been saved, the user may revisit a saved selection record by clicking the selection record drop-down menu 758 and selecting "open." The application may present a list of saved selection records from which a user may choose, or the user may simply enter the name of a known saved selection record. The GUI 740 will then display the element hierarchy 745 including selected elements 772 corresponding with the opened selection record. The name or title of the saved selection record 782 may be displayed in the GUI 740 for reference. A saved selection record may be representative of an infringement analysis performed with respect to a specific product, system, apparatus, or method (referred to herein interchangeably as a "product"). In other words, selection records can in these cases represent a sort of product signature, with the selected elements representing features or aspects that a user has determined are not embodied by the product. Over time, however, products may undergo changes or modifications that require subsequent analysis. Instead of having to restart an entire infringement analysis in view of the product modifications, the present invention provides the user the ability to build on the previously saved analysis and make changes to the selection record as warranted by selecting and de-selecting elements in the hierarchy 745 consistent with changes to the product. Accordingly, it would be desirable to alert the user to changes to the element hierarchy that have occurred due to changes in a product being analyzed, as well as to specifically point out any patent documents that become of issue by virtue of such product modifications.

Figure 45:
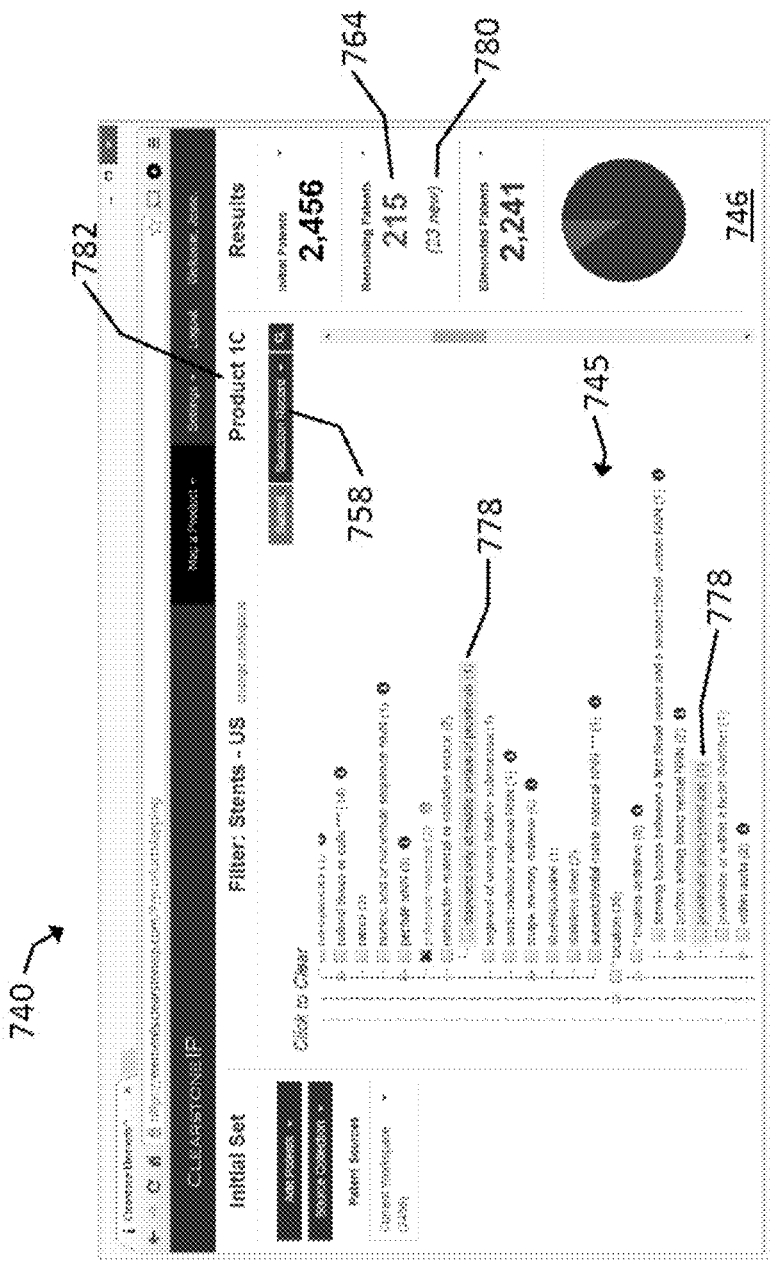
FIG. 45 is a view of the GUI of FIG. 32 in a further state of operation.

FIG. 45 illustrates some of the ways that a GUI 740 in accordance with embodiments of the invention may provide such information to the user. As a user continues to perform analysis on a previously saved selection record by selecting or de-selecting elements in the hierarchy, it may be possible that elements will appear that the user has not previously considered. These unconsidered elements 778 may be highlighted as shown in FIG. 45 or otherwise flagged to draw attention. These unconsidered elements may arise when a user de-selects an element, resulting in the addition of patent documents to the remaining patents list 764, and the addition of elements to the hierarchy 745 by virtue of being correlated to newly added patent documents. The reason that unconsidered elements may now be displayed is because, in some embodiments, such as the process 604 described herein and shown in FIG. 25, the application and GUI 740 are configured to display only elements that are associated or correlated with patents that are in the initial set, even though the workspace may include additional elements and patents. Thus, if a user selects an element, and that selection results in the elimination of all patents correlated to another, unselected element, then that other element will be hidden from view in the hierarchy 745. So the later de-selection of elements may conversely result in the re-appearance of previously hidden elements.

Another instance in which unconsidered elements 778 may appear in the element hierarchy 745 is when elements have been added to the workspace since the user saved the selection record 782, for example if additional patents have been annotated or if other changes resulted in the addition of elements. These unconsidered elements may also be displayed in a manner to draw attention to their presence, for example with highlighting.

Figure 46:
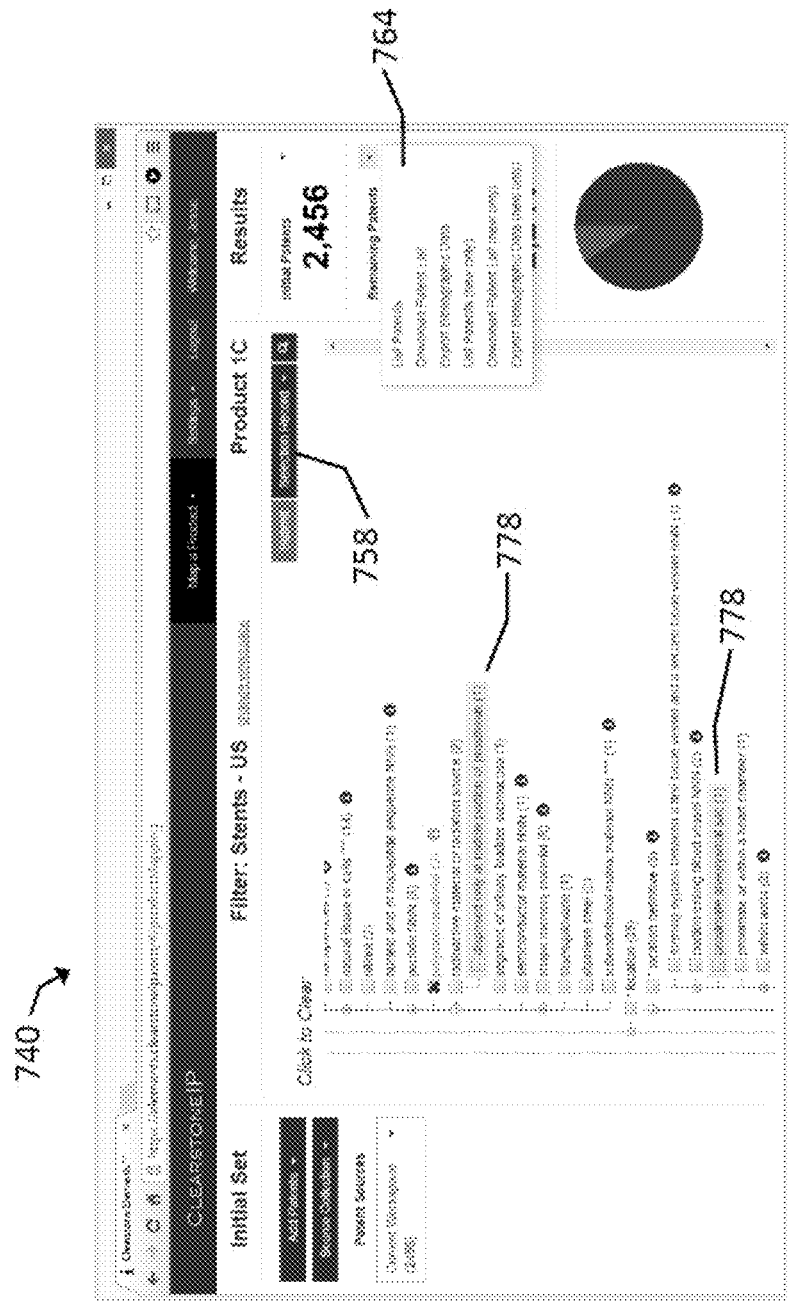
FIG. 46 is a view of the GUI of FIG. 32 in a further state of operation.

The application and GUI 740 may also perform the useful function of informing the user of the number of patent documents that have become of issue solely by virtue of changes to the product being analyzed. Again with reference to FIG. 45, after the user opens a previously saved selection record and subsequently selects and de-selects elements in the hierarchy 745, patents that were previously eliminated may return to the remaining patents because of de-selections of previously selected elements. Patents may also be added to the remaining patents list 764 as a result of being added to the workspace after the user originally saved the selection record. The application may continuously perform a comparison of the list of patents that were saved as part of the original selection record and the patents that are in the remaining patents list 764 while the user is performing the later analysis of the modified product. The number of "new" patents 780 (i.e., those patents in the remaining patents list 764 that were not in the remaining patent list when the original selection records was saved) may be indicated in the results frame 746. As shown in FIG. 46, a user may click on the drop-down menu associated with the remaining patents list 764 to view the new patents. As before, the user may have the options to list patents remaining, download the list, or expert bibliographic data. Now, when there are new patents, the user is additionally provided with the options to list, download, and export bibliographic data with respect to only the new patents. These functions and aspects provide a tremendous benefit to patent practitioners by providing a highly efficient manner of performing follow-up infringement-type analysis with regards to a modified or different product. It is further contemplated that these systems and methods are useful for numerous other types of analysis within the scope of the invention.

While various features have been described in conjunction with the examples outlined above, various alternatives, modifications, variations, and/or improvements of those features and/or examples may be possible. The particular order of method steps described herein is not intended to be limiting, as steps may be re-ordered or omitted while remaining within the spirit of the invention. Accordingly, the examples, as set forth above, are intended to be only illustrative. Various changes may be made without departing from the broad spirit and scope of the underlying principles.

What is claimed is:

1. A method of creating an interactive hierarchical arrangement of technical elements useful for conducting efficient patent infringement analysis, the hierarchical arrangement of technical elements adapted to be displayed on a user-engageable computer display in a manner that allows a user to select and de-select particular technical elements, the method comprising:

storing a record of a first element, the first element representing a first technical characteristic;

storing a record of a second element, the second element representing a second technical characteristic that is a species of the first technical characteristic, the second element being programmatically connected to the first element in a manner that preserves its relationship as a species of the first element;

storing a record of a third element, the third element representing a third technical characteristic; and annotating a first patent document and a second patent document, each of the first and second patent documents including at least one claim that recites an invention, wherein the step of annotating comprises:

correlating a first claim of the first patent document with the second element to establish a first stored correlation;

displaying, on the computer display, a representation of the first stored correlation, the representation visually indicating a direct association of the first claim of the first patent document with the second element and not the third element;

correlating a second claim of the first patent document with the third element to establish a second stored correlation;

displaying, on the computer display, a representation of the second stored correlation, the representation visually indicating a direct association of the second claim of the first patent document with the third element and not the second element;

correlating a first claim of the second patent document with the third element to establish a third stored correlation, and displaying, on the computer display, a representation of the third stored correlation, the representation visually indicating a direct association of the first claim of the second patent document with the third element;

wherein each of the correlating steps are performed on a claim-by-claim basis;

wherein the hierarchical arrangement of technical elements, when displayed on the user-engageable computer display, includes representations of the first element, the second element, and the third element, wherein the representation of the second element is located in a position relative to the representation of the first element that indicates that the second element is a species of the first element, and wherein the representation of the third element is located in a position relative to the representation of the first element that does not indicate that the third element is a species of the first element.

2. The method of claim 1, wherein the annotating step comprises entering a patent document identifier representing the first patent document.

3. The method of claim 1, wherein the representation of the second element is positioned below and indented relative to the representation of the first element.

4. The method of claim 1, further comprising:

storing a record of a fourth element, the fourth element representing a fourth technical characteristic;

storing a record of a fifth element, the fifth element representing a fifth technical characteristic; and annotating a third patent document, the third patent document including at least one claim that recites an invention, wherein the step of annotating comprises correlating a claim of the third patent document with both the fourth element and the fifth element to establish fourth and fifth stored correlations, respectively, wherein the fourth technical characteristic and the fifth technical characteristic are recited as alternative limitations in the correlated claim of the third patent document.

5. The method of claim 1, further comprising:
storing a record of a fourth element, the fourth element representing a fourth technical characteristic;
storing a record of a fifth element, the fifth element representing a fifth technical characteristic; and
annotating a third patent document, the third patent document including at least two claims that each recite an invention, wherein the step of annotating comprises:
correlating a first claim of the third patent document with the fourth element to establish a fourth correlation; and
correlating a second claim of the third patent with the fifth element to establish a fifth correlation,
wherein the first claim of the third patent is not correlated with the fifth element, and
wherein the second claim of the third patent is not correlated with the fourth element.

6. The method of claim 1, wherein the step of correlating the claim of the first patent document comprises:
entering the claim number of the claim of the first patent; and
selecting the second element from a displayed hierarchical arrangement.

7. The method of claim 1, wherein the records of elements and correlations are stored on a remote server, and wherein the hierarchical arrangement of elements is displayed by a web browser application.

8. A non-transitory machine-readable medium having instructions stored therein, which when executed by a data processing system, cause the data processing system to perform a method, the method comprising:
storing a record of a first element, the first element representing a first technical characteristic;
storing a record of a second element, the second element representing a second technical characteristic that is a species of the first technical characteristic, the second element being programmatically connected to the first element in a manner that preserves its relationship as a species of the first element;
storing a record of a third element, the third element representing a third technical characteristic;
receiving user inputs for annotating a first patent document and a second patent document, each of the first and second patent documents including at least one claim that recites an invention;
storing a first correlation, the first correlation associating a first claim of the first patent document with the second element;
displaying, on a user-engageable computer display, a representation of the first correlation, the representation visually indicating a direct association of the first claim of the first patent document with the second element and not the third element;
storing a second correlation, the second correlation associating a second claim of the first patent document with the third element;
displaying, on the computer display, a representation of the second correlation, the representation visually indicating a direct association of the second claim of the first patent document with the third element and not the second element;
storing a third correlation, the third correlation associating a claim of the second patent document with the third element;
displaying, on the computer display, a representation of the third correlation, the representation visually indicating a direct association of the claim of the second patent document with the third element,
wherein each of the correlation storing steps are performed on a claim-by-claim basis;
displaying a hierarchical arrangement of technical elements on a user-engageable computer display, wherein the hierarchical arrangement of technical elements includes representations of the first element, the second element, and the third element, wherein the representation of the second element is located in a position relative to the representation of the first element that indicates that the second element is a species of the first element, and wherein the representation of the third element is located in a position relative to the representation of the first element that does not indicate that the third element is a species of the first element.

9. The medium of claim 8, wherein the method performed by the data processing system further comprises storing a patent document identifier representing the first patent document.

10. The medium of claim 8, wherein the representation of the second element is positioned below and indented relative to the representation of the first element.

11. The medium of claim 8, wherein the method performed by the data processing system further comprises:
storing a record of a fourth element, the fourth element representing a fourth technical characteristic;
storing a record of a fifth element, the fifth element representing a fifth technical characteristic;
receiving user inputs for annotating a third patent document, the third patent document including at least one claim that recites an invention; and
storing a fourth correlation and a fifth correlation, the fourth correlation associating a particular claim of the third patent document with the fourth element, the fifth correlation associating the particular claim of the third patent document with the fifth element, wherein the fourth technical characteristic and the fifth technical characteristic are recited as alternative limitations in the particular claim of the third patent document.

12. The medium of claim 8, wherein the method performed by the data processing system further comprises:
storing a record of a fourth element, the fourth element representing a fourth technical characteristic;
storing a record of a fifth element, the fifth element representing a fifth technical characteristic; and
receiving user inputs for annotating a third patent document, the third patent document including at least two claims that each recite an invention;
storing a fourth correlation, the fourth correlation associating a first claim of the third patent document with the fourth element; and
storing a fifth correlation, the fifth correlation associating a second claim of the third patent with the fifth element,
wherein the first claim of the third patent is not correlated with the fifth element, and
wherein the second claim of the third patent is not correlated with the fourth element.

13. The medium of claim 8, wherein the method performed by the data processing system further comprises:
receiving a user input representing the claim number of the claim of the first patent;

displaying a hierarchical arrangement of elements; and
receiving a user selection of the second element from the displayed hierarchical arrangement.

14. The medium of claim 8, wherein the records of elements and correlations are stored on a remote server, and wherein the hierarchical arrangement of elements is displayed by a web browser application.

15. A processor-based system, comprising:
a memory storing one or more routines; and
a processing component configured to execute the one or more routines stored in the memory, wherein the one or more routines, when executed by the processing component, cause acts to be performed comprising:
receiving one or more first user inputs for annotating a first patent document, the first patent document including at least one claim that recites an invention;
storing a first correlation, the first correlation associating a first claim of the first patent document with a first stored element;
displaying, on a user-engageable computer display, a representation of the first correlation, the representation visually indicating a direct association of the first claim of the first patent document with the first stored element and not a second stored element;
storing a second correlation, the second correlation associating a second claim of the first patent document with a second stored element;
displaying, on the computer display, a representation of the stored correlation, the representation visually indicating a direct association of the second claim of the first patent document with the second stored element and not the first stored element,
wherein the second stored element is different from the first stored element, and
wherein each of the correlation storing steps are performed on a claim-by-claim basis;
displaying a hierarchical arrangement of representations of stored elements on a user-engageable computer display, the hierarchical arrangement including representations of the first and second stored elements;
displaying a results indication, the results indication indicating a quantity of patent documents;
receiving one or more second user inputs, each of the one or more second user inputs representing a user's selection of a representation of a stored element; and
excluding, from the results indication, patent documents that are correlated to stored elements represented by selected representations.

16. The system of claim 15, wherein the first patent document is caused to be excluded from the results indication if the user selects both a representation of the first stored element and a representation of the second stored element, and wherein the first patent document is not excluded from the results indication if the user selects only the representation of the first stored element or only the representation of the second stored element.

17. The system of claim 15, wherein the one or more routines, when executed by the processing component, further cause acts to be performed comprising:
receiving a user input representing the claim number of the claim of the first patent document;
displaying a hierarchical arrangement of elements; and
receiving a user selection of the first element from the displayed hierarchical arrangement.

18. The system of claim 15, wherein the stored elements and correlations are stored on a remote server, and wherein the hierarchical arrangement of elements is displayed by a web browser application.

19. The system of claim 15, wherein the one or more routines, when executed by the processing component, further cause acts to be performed comprising: storing a third correlation, the third correlation associating the further claim of the first patent document with a third stored element, wherein the third stored element is different from both the first stored element and the second stored element.

* * * * *